US012804563B2

(12) United States Patent
Lim et al.

(10) Patent No.: US 12,804,563 B2
(45) Date of Patent: Nov. 17, 2026

(54) METHOD AND DEVICE FOR PERFORMING POWER HEADROOM REPORTING IN WIRELESS COMMUNICATION SYSTEM SUPPORTING COOPERATIVE COMMUNICATION

(71) Applicant: Samsung Electronics Co., Ltd., Gyeonggi-do (KR)

(72) Inventors: Seongmok Lim, Gyeonggi-do (KR); Hyunseok Ryu, Gyeonggi-do (KR); Younsun Kim, Gyeonggi-do (KR); Sungjin Park, Gyeonggi-do (KR); Youngrok Jang, Gyeonggi-do (KR); Hyoungju Ji, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 193 days.

(21) Appl. No.: 18/552,767

(22) PCT Filed: Mar. 28, 2022

(86) PCT No.: PCT/KR2022/004328

§ 371 (c)(1),
(2) Date: Sep. 27, 2023

(87) PCT Pub. No.: WO2022/211416

PCT Pub. Date: Oct. 6, 2022

(65) Prior Publication Data

US 2024/0214954 A1 Jun. 27, 2024

(30) Foreign Application Priority Data

Mar. 31, 2021 (KR) ........................ 10-2021-0042379

(51) Int. Cl.
*H04W 52/40* (2009.01)
*H04W 52/36* (2009.01)

(52) U.S. Cl.
CPC ......... *H04W 52/40* (2013.01); *H04W 52/365* (2013.01)

(58) Field of Classification Search
CPC ... H04W 52/40; H04W 52/365; H04W 52/36; H04W 52/32; H04W 52/34; H04W 52/38
See application file for complete search history.

(56) References Cited

U.S. PATENT DOCUMENTS

2018/0324715 A1* 11/2018 Ryoo .................... H04W 72/20
2020/0100193 A1* 3/2020 Cheng ................. H04W 52/146
(Continued)

FOREIGN PATENT DOCUMENTS

EP 4175393 5/2023
KR 10-2018-0122912 11/2018
(Continued)

OTHER PUBLICATIONS

PCT/ISA/210 Search Report dated Jul. 13, 2022 issued on PCT/KR2022/004328, pp. 5.

(Continued)

*Primary Examiner* — John J Lee
(74) *Attorney, Agent, or Firm* — The Farrell Law Firm, P.C.

(57) ABSTRACT

The present disclosure relates to a 5G or 6G communication system for supporting higher data transmission rates. According to an embodiment of the present disclosure, a method for a terminal performing power headroom reporting in a wireless communication system using multiple transmission and reception points (TRPs) comprises the steps of: receiving configuration information for the power headroom reporting from a base station; if the power headroom reporting is triggered, generating power headroom information for the multiple TRPs on the basis of the configuration infor-
(Continued)

mation; and transmitting, to the base station, the power headroom information for the multiple TRPs.

12 Claims, 26 Drawing Sheets

(56) References Cited

U.S. PATENT DOCUMENTS

2020/0186304 A1 * 6/2020 Khoshnevisan ...... H04W 76/15
2021/0235389 A1 7/2021 Yao et al.

FOREIGN PATENT DOCUMENTS

KR 10-2022-0104573 7/2022
WO WO 2020/030038 2/2020

OTHER PUBLICATIONS

PCT/ISA/237 Written Opinion dated Jul. 13, 2022 issued on PCT/KR2022/004328, pp. 4.
Motorola Mobility, Lenovo, "On non-CA NR UL power control", 3GPP TSG RAN WG1 #91 R1-1720928 Reno, NV, USA, Nov. 27-Dec. 1, 2017, pp. 12.
Huawei, HiSilicon, "Consideration on PHR", 3GPP TSG-RAN WG2 Meeting NR#2 R2-1707002 Qingdao, China, Jun. 27-29, 2017, pp. 6.
Apple Inc., "On Multi-TRP Reliability Enhancement", R1-2101351, 3GPP TSG-RAN WG1 Meeting #104-e, Jan. 25-Feb. 5, 2021, 12 pages.
European Search Report dated Aug. 21, 2024 issued in counterpart application No. 22781535.4-1206, 9 pages.
Korean Office Action dated May 15, 2026 issued in counterpart application No. 10-2021-0042379, 14 pages.

* cited by examiner

METHOD AND DEVICE FOR PERFORMING POWER HEADROOM REPORTING IN WIRELESS COMMUNICATION SYSTEM SUPPORTING COOPERATIVE COMMUNICATION

CROSS-REFERENCE TO RELATED APPLICATIONS

This application is a U.S. National Phase Entry of PCT International Application No. PCT/KR2022/004328 which was filed on Mar. 28, 2022, and claims priority to Korean Patent Application No. 10-2021-0042379, which was filed on Mar. 31, 2021, the entire disclosure of each of which is incorporated herein by reference.

TECHNICAL FIELD

The disclosure relates to the operation of a UE and a base station in a wireless communication system. Specifically, the disclosure relates to a method and device for performing power headroom reporting in a wireless communication system.

BACKGROUND ART 5G mobile communication technology defines a wide frequency band to enable fast transmission speed and new services and may be implemented in frequencies below 6 GHz ('sub 6 GHz'), such as 3.5 GHZ, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

DETAILED DESCRIPTION OF THE INVENTION

Technical Problem

The disclosure provides a method and device for efficiently performing power headroom reporting in a wireless communication system supporting cooperative communication.

The disclosure provides a method and device for performing power headroom reporting in a wireless communication system using multiple transmission and reception points (TRPs).

The disclosure provides a method and device for triggering power headroom reporting considering multiple TRPs in a wireless communication system using multiple TRPs.

The disclosure provides a method and device for determining the TRP where a power headroom is reported in a wireless communication system using multiple TRPs.

Technical Solution

According to an embodiment of the disclosure, a method by a user equipment (UE) performing power headroom reporting in a wireless communication system using multiple transmission and reception points (TRPs) comprises receiving configuration information for power headroom reporting from a base station, generating power headroom information about the multiple TRPs based on the configuration information when power headroom reporting is triggered, and transmitting the power headroom information about the multiple TRPs to the base station.

Further, according to an embodiment of the disclosure, a UE performing power headroom reporting in a wireless communication system using multiple TRPs comprises a transceiver and a processor configured to receive configuration information for power headroom reporting from a base station through the transceiver, generate power headroom information about the multiple TRPs based on the configuration information when power headroom reporting is triggered, and transmit the power headroom information about the multiple TRPs to the base station through the transceiver.

Further, according to an embodiment of the disclosure, a base station in a wireless communication system using multiple TRPs comprises a transceiver and a processor configured to transmit configuration information for power headroom reporting through the transceiver and receive power headroom information about the multiple TRPs from a UE based on the configuration information. The power headroom information is based on a pathloss for each TRP.

MODE FOR CARRYING OUT THE INVENTION

Figure 1:
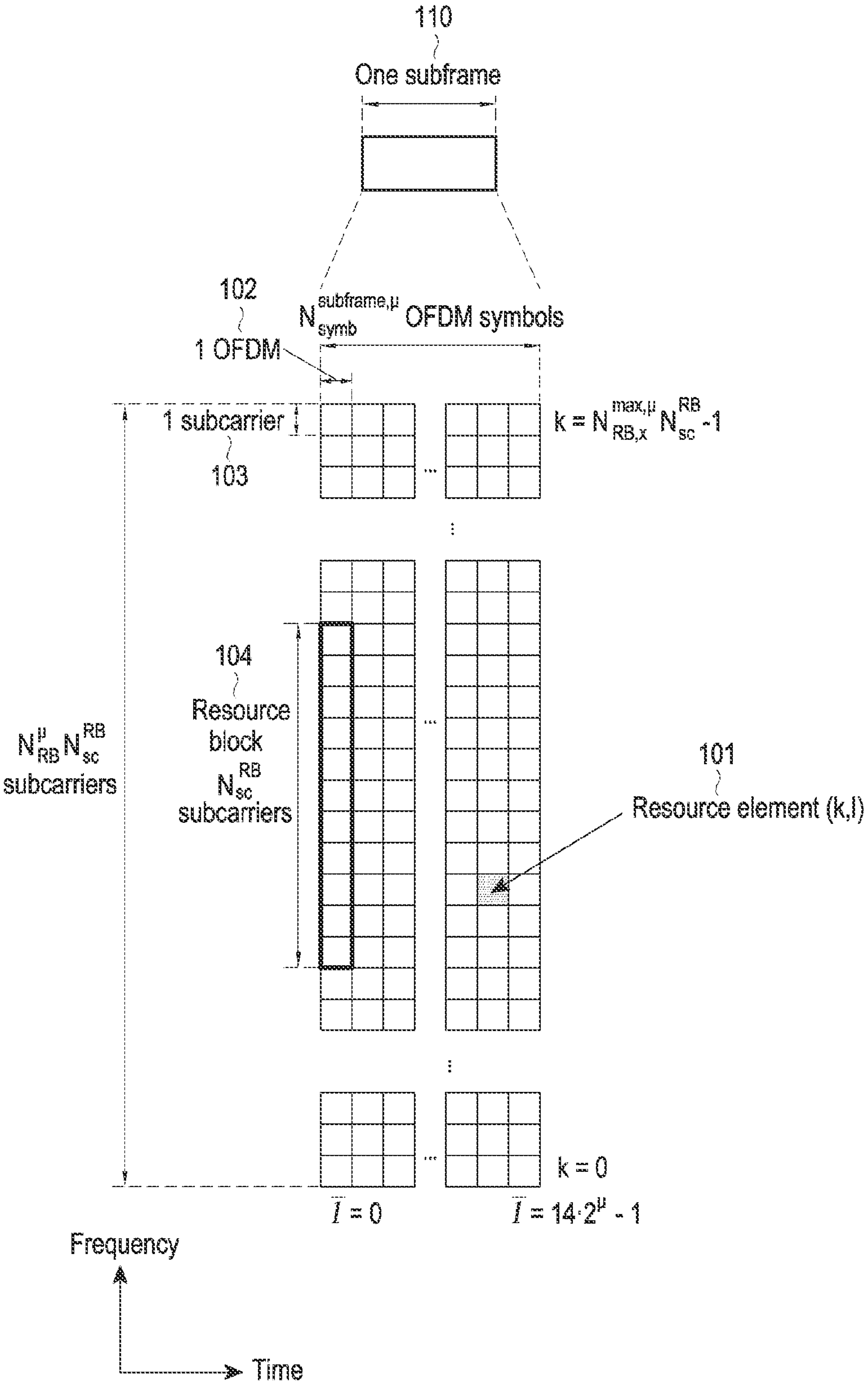
FIG. 1 is a view illustrating a basic structure of a time-frequency domain in a wireless communication system according to an embodiment of the disclosure.

Hereinafter, embodiments of the disclosure are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station may be an entity allocating resource to terminal and may be at least one of gNode B (gNB), eNode B (eNB), Node B, base station (BS), wireless access unit, base station controller, or node over network. The base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link. The terminal may include UE (user equipment), MS (mobile station), cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Although LTE or LTE-A systems may be described below as an example, the embodiments may be applied to other communication systems having a similar technical background or channel pattern. For example, 5G wireless communication technology (5G, new radio, NR) developed after LTE-A may be included therein, and 5G below may be a concept including legacy LTE, LTE-A and other similar services. Further, the embodiments may be modified in such a range as not to significantly depart from the scope of the present invention under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra mobile broadband (UMB), and institute of electrical and electronics engineers (IEEE) 802.16e communication standards.

As a representative example of such broadband wireless communication system, the LTE system adopts orthogonal frequency division multiplexing (OFDM) for downlink and single carrier frequency division multiple access (SC-FDMA) for uplink. Uplink means a wireless link where the user equipment (UE) (or mobile station (MS) transmits data or control signals to the base station (BS, or eNode B), and download means a wireless link where the base station transmits data or control signals to the UE. Such multiple access scheme may typically allocate and operate time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (MMTC), and ultra reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of 10-5 or less. Thus, for URLLC-supportive services, the 5G communication system may be required to provide a shorter transmit time interval (TTI) than those for other services while securing reliable communication links by allocating a broad resource in the frequency band.

The three 5G services, i.e., eMBB, URLLC, and mMTC, may be multiplexed in one system and be transmitted. In this case, the services may adopt different TX/RX schemes and TX/RX parameters to meet their different requirements. Of course, 5G is not limited to the above-described three services.

For ease of description, some of the terms or names defined in the 3rd generation partnership project (3GPP) standards (standards for 5G, new radio (NR), long-term evolution (LTE), or similar systems) may be used. However, the disclosure is not limited by such terms and names and may be likewise applicable to systems conforming to other standards. As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

[NR Time-Frequency Resource]

The frame structure of the 5G system is described below in more detail with reference to the drawings.

In FIG. 1, the horizontal axis refers to the time domain, and the vertical axis refers to the frequency domain. A basic unit of a resource in the time and frequency domain is a resource element (RE) 101, which may be defined by one orthogonal frequency division multiplexing (OFDM) symbol 102 on the time axis, and by one subcarrier 103 on the frequency axis. In the frequency domain.

$$N_{SC}^{RB}$$

(e.g., 12) consecutive REs may constitute one resource block (RB) 104. In FIG. 1, $$N_{sym}^{subframe,\mu}$$

is the number of OFDM symbols per subframe 110 for subcarrier spacing setting (μ). For a more detailed description of the resource structure used in the 5G system, refer to TS 38.211 section 4 standard.

Figure 2:
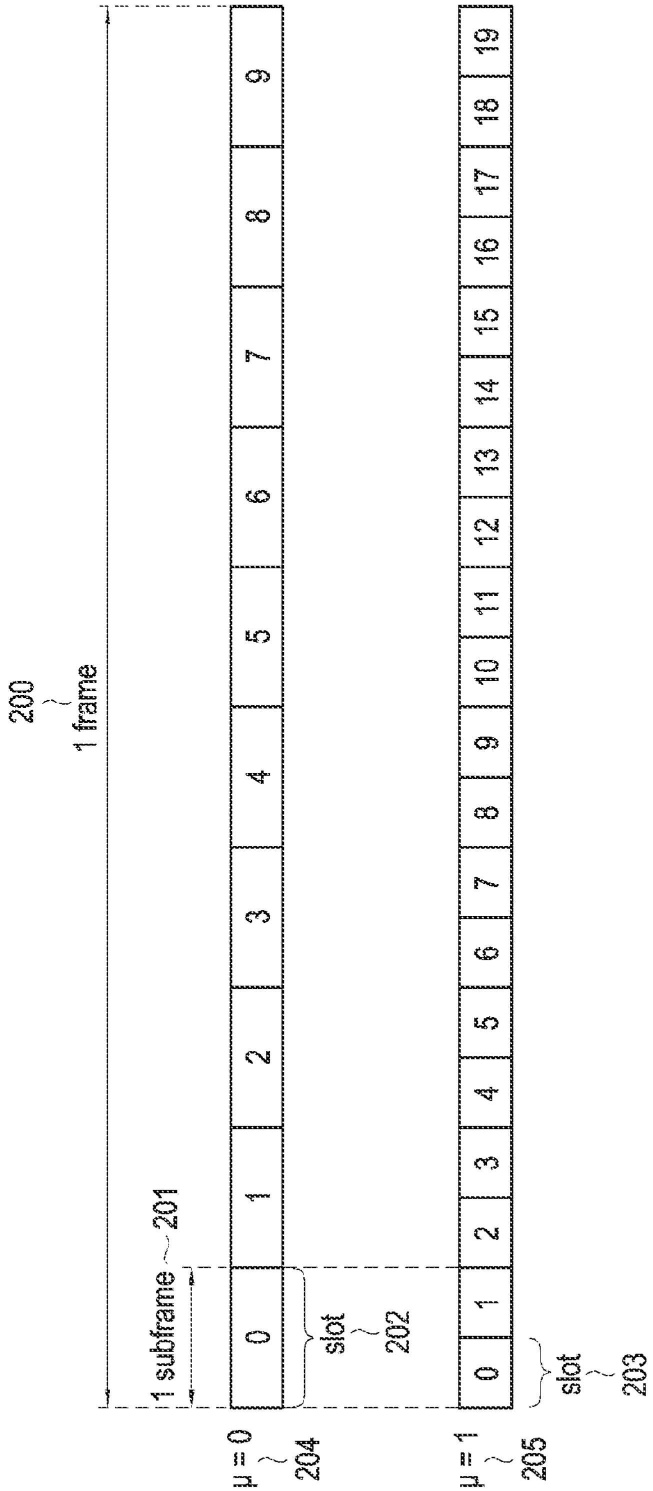
FIG. 2 is a view illustrating the structures of a frame, a subframe, and a slot in a wireless communication system according to an embodiment of the disclosure.

FIG. 2 is a view illustrating the structures of a frame, a subframe, and a slot in a wireless communication system according to an embodiment of the disclosure.

FIG. 2 illustrates example structures of a frame 200, a subframe 201, and a slot 202. One frame 200 may be defined as 10 ms. One subframe 201 may be defined as 1 ms, and thus, one frame 200 may consist of a total of 10 subframes 201. One slot 202 or 203 may be defined as 14 OFDM symbols (that is, the number $$(N_{symb}^{slot})$$

of symbols per slot=14). One subframe 201 may be composed of one or more slots 202 and 203, and the number of slots 202 and 203 per subframe 201 may differ depending on μ (204 or 205), which is a set value for the subcarrier spacing. FIG. 2 illustrates an example in which the subcarrier spacing setting value μ=0 (204) and an example in which the subcarrier spacing setting value μ=1 (205). When μ=0 (204), one subframe 201 may consist of one slot 202, and when μ=1 (205), one subframe 201 may consist of two slots (203). In other words, according to the set subcarrier spacing value μ, the number $$(N_{slot}^{subframe,\mu})$$

of slots per subframe may vary, and accordingly, the number $$(N_{slot}^{frame,\mu})$$

of slots per frame may differ. According to each subcarrier spacing μ, $$N_{slot}^{subframe,\mu} \text{ and } N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

A configuration of a bandwidth part (BWP) in a 5G communication system is described below in detail with reference to the drawings.

Figure 3:
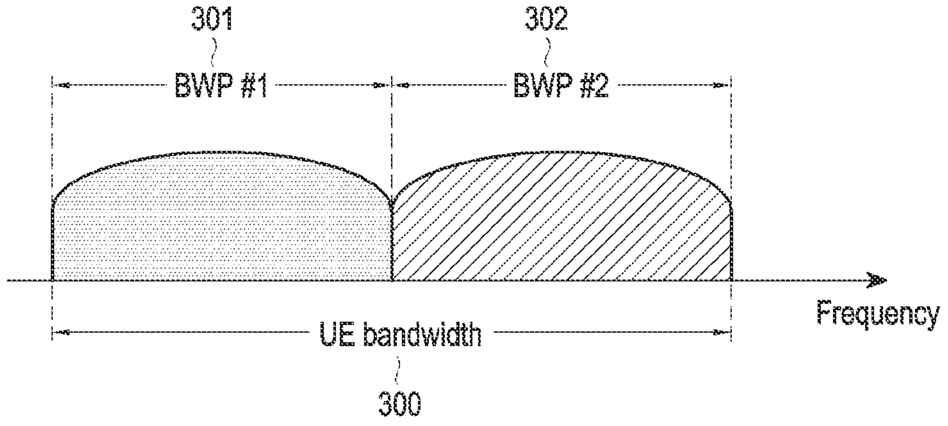
FIG. 3 is a view illustrating an example of a bandwidth part configuration in a wireless communication system according to an embodiment of the disclosure.

FIG. 3 is a view illustrating an example of a bandwidth part configuration in a wireless communication system according to an embodiment of the disclosure.

FIG. 3 illustrates an example in which a UE bandwidth 300 is divided into two bandwidth parts, e.g., bandwidth part #1 (BWP #1) 301 and bandwidth part #2 (BWP #2) 302. The base station may configure one or more bandwidth parts in the UE and may configure the following information for each bandwidth part.

TABLE 2

```
BWP ::=                          SEQUENCE {
  bwp-Id                           BWP-Id,
  (bandwidth part identity)
  locationAndBandwidth               INTEGER (1..65536),
  (bandwidth part location)
  subcarrierSpacing                ENUMERATED {n0, n1, n2, n3, n4,
                                   n5},
  (subcarrier spacing)
  cyclicPrefix                     ENUMERATED { extended }
  (cyclic prefix)
}
```

In Table 2, "locationAndBandwidth" denotes the location and bandwidth in the frequency domain of the bandwidth part, "subcarrierSpacing" denotes the subcarrier spacing to be used in the bandwidth part, and "cyclicPrefix" denotes whether the extended cyclic prefix (CP) is used for the bandwidth part.

However, without being limited thereto, other various BWP-related parameters than the above-described configuration information may be configured in the UE. The base station may transfer the information to the UE through higher layer signaling, e.g., radio resource control (RRC) signaling. At least one bandwidth part among one or more configured bandwidth parts may be activated. Whether to activate the configured bandwidth part may be transferred from the base station to the UE semi-statically through RRC signaling or dynamically through downlink control information (DCI).

According to an embodiment, before radio resource control (RRC) connected, the UE may be configured with an initial bandwidth part (BWP) for initial access by the base station via a master information block (MIB). More specifically, the UE may receive configuration information for a search space and control resource set (CORESET) in which physical downlink control channel (PDCCH) may be transmitted to receive system information (remaining system information, RMSI or system information block 1 which may correspond to SIB1) necessary for initial access through the MIB in the initial access phase. Each of the control resource set and search space configured with the MIB may be regarded as identity (ID) 0. The control resource set and the search space configured through the MIB may be referred to as a common control resource set and a common search space, respectively. The base station may provide the UE with configuration information, such as frequency allocation information, time allocation information, and numerology for control region #0, via the MIB. Further, the base station may provide the UE with configuration information for occasion and monitoring period for control region #0, i.e., configuration information for search space #0, via the MIB. The UE may regard the frequency range set as control resource set #0 obtained from the MIB, as the initial BWP for initial access. In this case, the identity (ID) of the initial BWP may be regarded as 0. The control resource set may be referred to as a control region or a control resource region.

The configuration of the bandwidth part supported in 5G described above may be used for various purposes.

According to an embodiment, when the bandwidth supported by the UE is smaller than the system bandwidth, this may be supported through the bandwidth part configuration. For example, as the base station configures the UE with the frequency position of the bandwidth part, the UE may transmit/receive data in a specific frequency position in the system bandwidth.

According to an embodiment, for the purpose of supporting different numerologies, the base station may configure the UE with a plurality of bandwidth parts. For example, to support data transmission/reception using a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when data is transmitted/received at a specific subcarrier spacing, the bandwidth part configured as the corresponding subcarrier spacing may be activated.

According to an embodiment, for the purpose of reducing power consumption of the UE, the base station may configure the UE with bandwidth parts having different sizes of bandwidths. For example, when the UE supports a bandwidth exceeding a very large bandwidth, e.g., a bandwidth of 100 MHz, and transmits/receives data always using the bandwidth, significant power consumption may occur. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth to the UE, e.g., a bandwidth part of 20 Mhz, in the UE. In a no-traffic situation, the UE may perform monitoring in the 20 MHz bandwidth and, if data occurs, the UE may transmit/receive data in the 100 MHz bandwidth according to an instruction from the base station.

In a method for configuring a bandwidth part, UEs before RRC connected may receive configuration information for an initial bandwidth via a master information block (MIB) in the initial access phase. More specifically, the UE may be configured with a control resource set (CORESET) for the downlink control channel where the downlink control information (DCI) scheduling the system information block (SIB) may be transmitted from the MIB of the physical broadcast channel (PBCH). The bandwidth of the control resource set configured by the MIB may be regarded as the initial BWP, and the UE may receive the physical downlink shared channel (PDSCH), which transmits the SIB, via the configured initial BWP. The initial BWP may be utilized for other system information (OSI), paging, and random access as well as for receiving SIB.

[Bandwidth Part (BWP) Change]

If the UE is configured with one or more BWPs, the base station may indicate, to the UE, a change (or switching or transition) in BWP using the BWP indicator in the DCI. As an example, when the currently activated bandwidth part of the UE is bandwidth part #1 301 in FIG. 3, the base station may indicate, to the UE, bandwidth part #2 302 with the bandwidth part indicator in the DCI, and the UE may change the bandwidth part to bandwidth part #2 302, indicated with the bandwidth part indicator in the received DCI.

As described above, since DCI-based bandwidth part changing may be indicated by the DCI scheduling PDSCH or PUSCH, the UE, if receiving a bandwidth part change request, is supposed to be able to receive or transmit the PDSCH or PUSCH, scheduled by the DCI, in the changed bandwidth part without trouble. To that end, the standard specified requirements for delay time $T_{BWP}$ required upon changing bandwidth part, which may be defined as follows.

TABLE 3

| μ | NR Slot length (ms) | BWP switch delay $T_{BWP}$ (slots) Type 1[Note 1] | Type 2[Note 1] |
|---|---|---|---|
| 0 | 1 | 1 | 3 |
| 1 | 0.5 | 2 | 5 |
| 2 | 0.25 | 3 | 9 |
| 3 | 0.125 | 6 | 18 |

*Note* 1:

Depends on UE capability.

Note 2:

If the BWP switch involves changing of SCS, the BWP switch delay is determined by the larger one between the SCS before BWP switch and the SCS after BWP switch.

The requirement for delay of bandwidth part change supports type 1 or type 2 according to the capability of the UE. The UE may report a supportable bandwidth part delay time type to the base station.

If the UE receives, in slot n, DCI including a bandwidth part change indicator according to the above-described requirements for bandwidth part change delay time, the UE may complete a change to the new bandwidth part, indicated by the bandwidth part change indicator, at a time not later than slot n+$T_{BWP}$, and may perform transmission/reception on the data channel scheduled by the DCI in the changed, new bandwidth part. Upon scheduling data channel in the new bandwidth part, the base station may determine time domain resource allocation for data channel considering the UE's bandwidth part change delay time $T_{BWP}$. In other words, when scheduling a data channel with the new bandwidth part, in a method for determining a time domain resource allocation for the data channel, the base station may schedule a corresponding data channel after the bandwidth part change delay time. Thus, the UE may not expect that the DCI indicating the bandwidth part change indicates a slot offset (K0 or K2) smaller than the bandwidth part change delay time ($T_{BWP}$).

If the UE has received the DCI (e.g., DCI format 1_1 or 0_1) indicating the bandwidth part change, the UE may perform no transmission or reception during the time period from the third symbol of the slot in which the PDCCH including the DCI has been received to the start point of the slot indicated by the slot offset (K0 or K2) value indicated by the time domain resource allocation indicator field in the DCI. For example, if the UE receives the DCI indicating a bandwidth part change in slot n, and the slot offset value indicated by the DCI is K, the UE may perform no transmission or reception from the third symbol of slot n to a symbol before slot n+K (i.e., the last symbol of slot n+K−1).

[SS/PBCH Block]

Next, the synchronization signal (SS)/PBCH block in 5G is described.

The SS/PBCH block may mean a physical layer channel block composed of primary SS (PSS), secondary SS (SSS), and PBCH. Details are as follows.

- PSS: A signal that serves as a reference for downlink time/frequency synchronization and provides part of the information for cell ID
- SSS: serves as a reference for downlink time/frequency synchronization, and provides the rest of the information for cell ID, which PSS does not provide. Additionally, it may serve as a reference signal for demodulation of PBCH.
- PBCH: provides essential system information necessary for the UE to transmit and receive data channel and control channel. The essential system information may include search space-related control information indicating radio resource mapping information for a control channel and scheduling control information for a separate data channel for transmitting system information.
- SS/PBCH block: The SS/PBCH block is composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control resource set (CORESET) #0 (which may correspond to a control resource set having a control resource set index of 0). The UE may perform monitoring on control resource set #0, assuming that the selected SS/PBCH block and the demodulation reference signal (DMRS) transmitted in control resource set #0 are quasi-co-located (QCLed). The UE may receive system information as downlink control information transmitted in control resource set #0. The UE may obtain configuration information related to random access channel (RACH) required for initial access from the received system information. The UE may transmit the physical RACH (PRACH) to the base station considering the selected SS/PBCH index, and the base station receiving the PRACH may obtain information for the SS/PBCH block index selected by the UE. The base station may know which block the UE has selected from the SS/PBCH blocks and monitors control resource set #0 related thereto.

[PDCCH: DCI Related]

Next, downlink control information (DCI) in the 5G system is described in detail.

Scheduling information for uplink data (or physical uplink shared channel (PUSCH) or downlink data (or physical downlink data channel (PDSCH) in the 5G system is transmitted from the base station through DCI to the UE. The UE may monitor the DCI format for fallback and the DCI format for non-fallback for PUSCH or PDSCH. The fallback DCI format may be composed of fixed fields predefined between the base station and the UE, and the non-fallback DCI format may include configurable fields.

DCI may be transmitted through the PDCCH, which is a physical downlink control channel, via channel coding and modulation. A cyclic redundancy check (CRC) is added to the DCI message payload, and the CRC is scrambled with the radio network temporary identifier (RNTI) that is the identity of the UE. Different RNTIs may be used for the purposes of the DCI message, e.g., UE-specific data transmission, power control command, or random access response. In other words, the RNTI is not explicitly transmitted, but the RNTI is included in the CRC calculation process and transmitted. Upon receiving the DCI message transmitted on the PDCCH, the UE identifies the CRC using the allocated RNTI, and when the CRC is correct, the UE may be aware that the message has been transmitted to the UE.

For example, DCI scheduling a PDSCH for system information (SI) may be scrambled to SI-RNTI. The DCI scheduling a PDSCH for a random access response (RAR) message may be scrambled to RA-RNTI. DCI scheduling a PDSCH for a paging message may be scrambled with P-RNTI. The DCI providing a slot format indicator (SFI) may be scrambled to SFI-RNTI. The DCI providing transmit power control (TPC) may be scrambled to TPC-RNTI. The DCI for scheduling a UE-specific PDSCH or PUSCH may be scrambled with cell RNTI (C-RNTI).

DCI format 0_0 may be used as fallback DCI for scheduling PUSCH, and in this case, CRC may be scrambled to C-RNTI. DCI format 0_0 in which CRC is scrambled to C-RNTI may include, e.g., the following information.

TABLE 4

| |
|---|
| Identifier for DCI formats (DCI format Identifier) - [1] bit |
| Frequency domain resource assignment - |
| $[\lceil \log_2(N_{RB}^{UL,BWP}(N_{RB}^{UL,BWP}+1)/2)\rceil]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| TPC command for scheduled PUSCH (transmit power control command for scheduled PUSCH) - [2] bits |
| UL/SUL indicator (UL/supplementary UL indicator) - 0 or 1 bit |

DCI format 0_1 may be used as non-fallback DCI for scheduling PUSCH, and in this case, CRC may be scrambled to C-RNTI. DCI format 0_1 in which CRC is scrambled to C-RNTI may include, e.g., the information shown in Table 5a and Table 5b below.

TABLE 5a

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P\rceil$ bits |
| For resource allocation type 1, $\lceil \log_2(N_{RB}^{UL,BWP}(N_{RB}^{UL,BWP}+1)/2)\rceil$ bits |
| Time domain resource assignment - 1, 2, 3, or 4 bits |
| VRB-to-PRB mapping (virtual resource block-to-physical resource block mapping) - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index - 1 or 2 bits |
| 1 bit for semi-static HARQ-ACK codebook; |
| 2 bits for dynamic HARQ-ACK codebook with single HARQ-ACK codebook(when· · dynamic HARQ-ACK codebook is used with single HARQ-ACK codebook). |
| 2nd downlink assignment index- 0 or 2 bits |
| 2 bits for dynamic HARQ-ACK codebock with two - HARQ-ACK sub-codebooks(when dynamic HARQ-ACK codebook is used with two HARQ-ACK sub-codebooks); |

TABLE 5b

| |
|---|
| SRS resource indicator - $\left\lceil \log_2\left(\sum_{k=1}^{L_{max}}\binom{N_{SRS}}{k}\right)\right\rceil$ or $\lceil \log_2(N_{SRS})\rceil$ bits |
| $\left\lceil \log_2\left(\sum_{k=1}^{L_{max}}\binom{N_{SRS}}{k}\right)\right\rceil$ bits for non-codebook based PUSCH transmission; |
| $\lceil \log_2(N_{SRS})\rceil$ bits for codebook based PUSCH transmission (when PUSCH transmission is based codebook). |
| Precoding information and number of layers - up to 6 bits |
| Antenna ports - up to 5 bits |
| SRS request - 2 bits |
| CSI request (channel state information request) - 0, 1, 2, 3, 4, 5, or 6 bits |
| CBG transmission information (code block group transmission information) - 0, 2, 4, 6, or 8 bits |
| PTRS-DMRS association (phase tracking reference signal-demodulation reference signal association) - 0 or 2 bits. |
| beta_offset indicator - 0 or 2 bits |
| DMRS sequence initialization (demodulation reference signal sequence initialization) - 0 or 1 bit |

DCI format 1_0 may be used as fallback DCI for scheduling PDSCH, and in this case, CRC may be scrambled to C-RNTI. DCI format 1_0 in which CRC is scrambled to C-RNTI may include, e.g., the following information.

TABLE 6

| |
|---|
| Identifier for DCI formats - [1] bit |
| Frequency domain resource assignment - |
| $[\lceil \log_2(N_{RB}^{DL,BWP}(N_{RB}^{DL,BWP}+1)/2)\rceil]$ bits |

TABLE 6-continued

| |
|---|
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| PUCCH resource indicator (physical uplink control channel, PUCCH resource indicator - 3 bits |
| PDSCH-to-HARQ feedback timing indicator- [3] bits |

DCI format 1_1 may be used as non-fallback DCI for scheduling PDSCH, and in this case, CRC may be scrambled to C-RNTI. DCI format 1_1 in which CRC is scrambled to C-RNTI may include, e.g., the following information.

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P \rceil$ bits |
| For resource allocation type 1, $\lceil \log_2(N_{RB}^{DL,BWP}(N_{RB}^{SL,BWP}+1)/2) \rceil$ bits |
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator (physical resource block bundling size indicator) - 0 or 1 bit |
| Rate matching indicator - 0, 1, or 2 bits |
| ZP CSI-RS trigger (zero power channel state information-reference signal trigger) - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information (code block group flushing out information) - 0 or 1 bit |
| DMRS sequence initialization - 1 bit |

[PDCCH: CORESET, REG, CCE, Search Space]

A downlink control channel in the 5G communication system is described below in greater detail with reference to the drawings.

Figure 4:
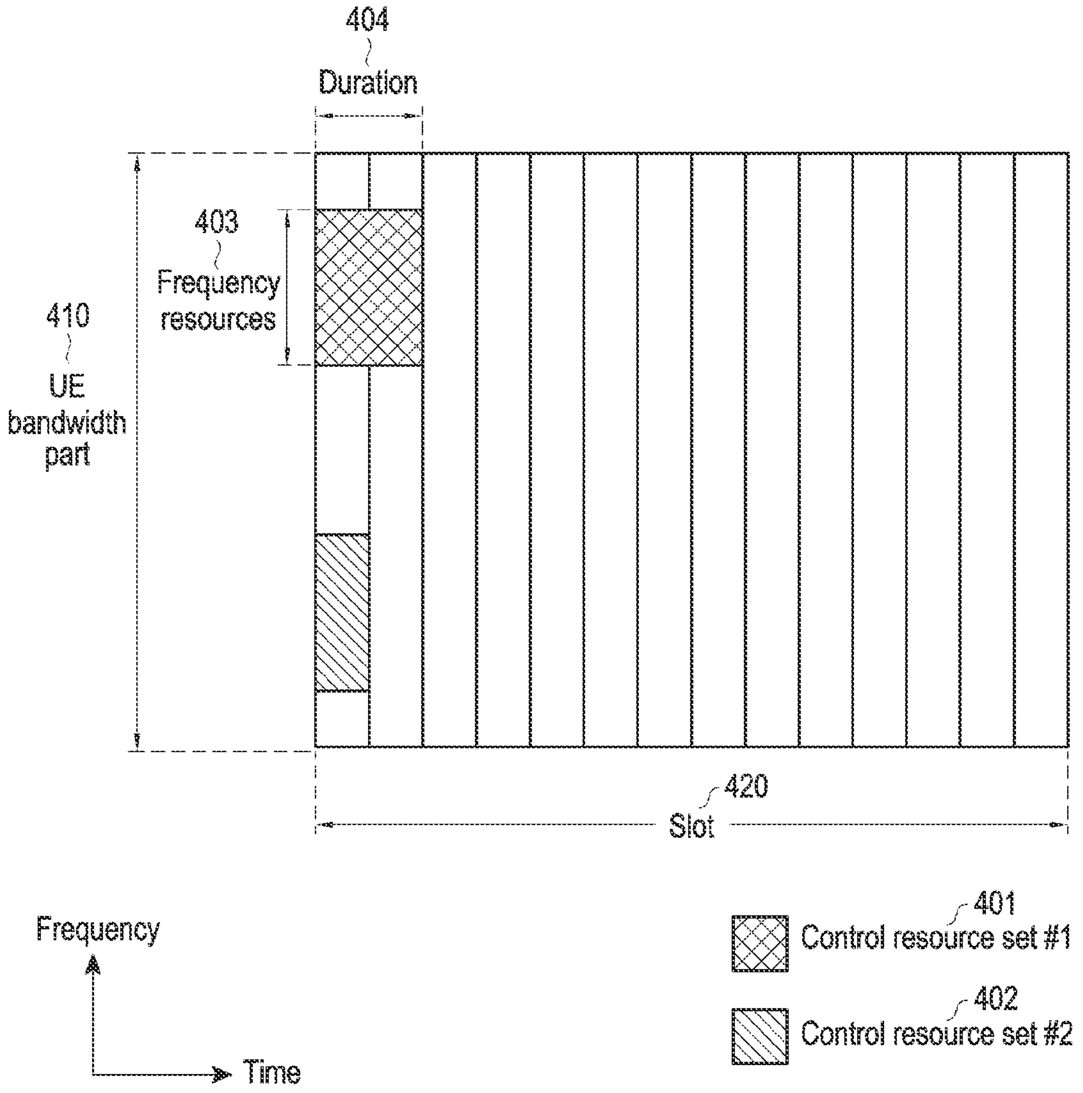
FIG. 4 is a view illustrating an example of a control resource set configuration of a downlink control channel in a wireless communication system according to an embodiment of the disclosure.

FIG. 4 is a view illustrating an example of a control resource set (CORESET) where the download control channel is transmitted in the 5G wireless communication system. FIG. 4 illustrates an example in which two control resource sets (control resource set #1 401 and control resource set #2 402) are configured in one slot 420 on the time axis, and a UE bandwidth part 410 is configured on the frequency axis. The control resource sets 401 and 402 may be configured to a particular frequency resource 403 in the overall system bandwidth part 410 on the frequency axis. FIG. 4 illustrates that the specific frequency resource 403 is an example of a frequency resource configured in control resource set #1 401. The control resource set may be configured with one or more OFDM symbols on the time axis, which may be defined as control resource set duration 404. Referring to the example shown in FIG. 4, control resource set #1 401 may be configured as a control resource set length of two symbols, and control resource set #2 402 may be configured as a control resource set length of one symbol.

The control resource set in 5G described above may be configured in the UE by the base station through higher layer signaling (e.g., system information, master information block (MIB), or radio resource control (RRC) signaling). Configuring a UE with a control resource set means providing the UE with such information as the identifier (ID) of the control resource set, the frequency position of the control resource set, and symbol length of the control resource set. For example, the configuration information for the control resource set may include the following information.

TABLE 8

```
ControlResourceSet ::=          SEQUENCE {
  -- Corresponds to L1 parameter 'CORESET-ID'
  controlResourceSetId          ControlResourceSetId,
  (control resource set identity)
  frequencyDomainResources      BIT STRING (SIZE (45)),
  (frequency domain resource allocation information)
  duration                      INTEGER
    (1..maxCoReSetDuration),
  (time domain resource allocation information)
  cce-REG-MappingType            CHOICE {
  (CCE-to-REG mapping type)
    interleaved                 SEQUENCE {
      reg-BundleSize             ENUMERATED {n2, n3, n6},
      precoderGranularity        ENUMERATED
    {sameAsREG-bundle, allContiguousRBs},
      interleaverSize            ENUMERATED {n2, n3, n6}
      shiftIndex
      INTEGER(0..maxNrofPhysicalResourceBlocks-1)
      (interleaver shift)
    },
    nonInterleaved               NULL
  },
  tci-StatesPDCCH               SEQUENCE(SIZE
    (1..maxNrofTCI-StatesPDCCH)) OF TCI-StateId
      OPTIONAL,
  (QCL configuration information)
  tci-PresentInDCI              ENUMERATED {enabled}
}
```

In Table 8 above, tci-StatesPDCCH (simply referred to as transmission configuration indication (TCI) state) configuration information may include information for one or more synchronization signal (SS)/physical broadcast channel (PBCH) block indexes or channel state information reference signal (CSI-RS) index quasi-co-located (QCLed) with the DMRS transmitted in the corresponding control resource set.

Figure 5:
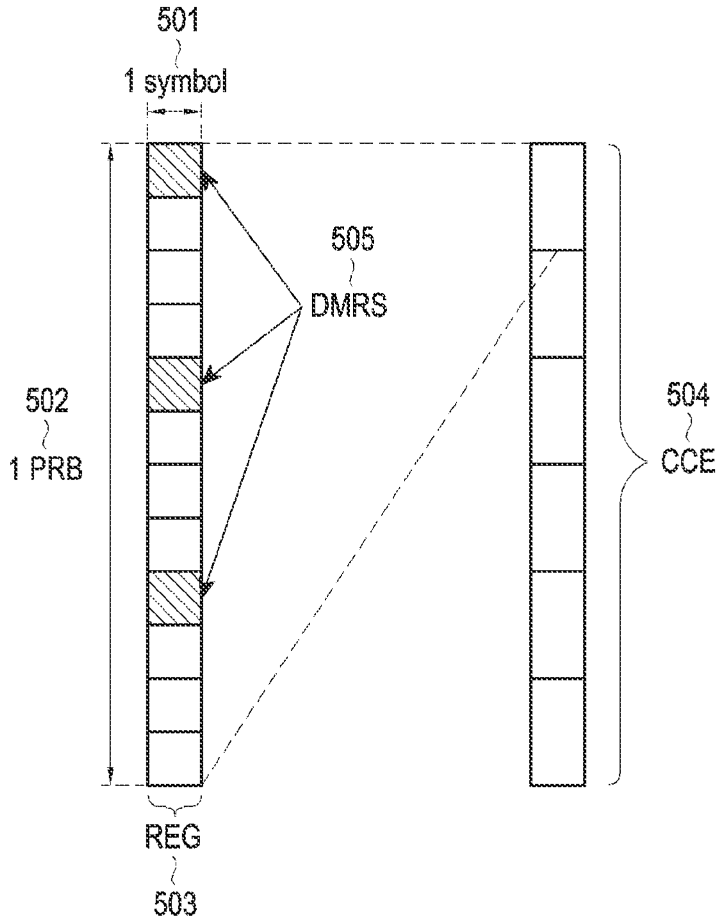
FIG. 5 is a view illustrating a structure of a downlink control channel in a wireless communication system according to an embodiment of the disclosure.

FIG. 5 is a view illustrating an example of a basic unit of time and frequency resource constituting a download control channel available in 5G. Referring to FIG. 5, the basic unit of time and frequency resources constituting the downlink control channel may be referred to as a resource element group (REG) 503, and the REG 503 may be defined with one OFDM symbol 501 on the time axis and with one physical resource block (PRB) 502, i.e., 12 subcarriers, on the frequency axis. The base station may configure a downlink control channel allocation unit by concatenating REGs 503.

As shown in FIG. 5, if the basic unit for allocation of a downlink control channel in 5G is a control channel element (CCE) 504, one CCE 504 may be composed of multiple REGs 503. In the example of the REG 503 illustrated in FIG. 5, the REG 503 may be constituted of 12 REs, and if one CCE 504 is constituted of six REGs 503, one CCE 504 may be constituted of 72 REs. When the download control resource set is set, the region may be constituted of multiple CCEs 504, and a particular download control channel may be mapped to one or more CCEs 504 according to the aggregation level (AL) in the control resource set and be transmitted. The CCEs 504 in the control resource set are distinguished with numbers, and in this case, the numbers of the CCEs 504 may be assigned according to a logical mapping scheme.

The basic unit, i.e., the REG 503, of the download control channel shown in FIG. 5 may contain REs to which the DCI is mapped and the region to which the DMRS 505, a reference signal for decoding the REs, is mapped. As shown in FIG. 5, three DMRSs 505 may be transmitted in one REG 503. The number of CCEs necessary to transmit a PDCCH may be, e.g., 1, 2, 4, 8, or 16 depending on the aggregation level (AL), and different numbers of CCEs may be used to implement link adaptation of downlink control channel. For example, if AL=L, one downlink control channel may be transmitted via L CCEs. The UE needs to detect a signal while being unaware of information for downlink control channel and, for blind decoding, a search space is defined which indicates a set of CCEs. The search space is a set of candidate control channels constituted of CCEs that the UE needs to attempt to decode on the given aggregation level, and since there are several aggregation levels to bundle up 1, 2, 4, 8, or 16 CCEs, the UE has a plurality of search spaces. A search space set (Set) may be defined as a set of search spaces at all set aggregation levels.

Search spaces may be classified into a common search space and a UE-specific search space. A predetermined group of UEs or all the UEs may search for the common search space of the PDCCH to receive cell-common control information, e.g., paging message, or dynamic scheduling for system information. For example, PDSCH scheduling allocation information for transmitting an SIB containing, e.g., cell service provider information may be received by investigating the common search space of the PDCCH. In the case of the common search space, since a certain group of UEs or all the UEs need receive the PDCCH, it may be defined as a set of CCEs previously agreed on. Scheduling allocation information for the UE-specific PDSCH or PUSCH may be received by inspecting the UE-specific search space of PDCCH. The UE-specific search space may be UE-specifically defined with a function of various system parameters and the identity of the UE.

In 5G, the parameters for the search space for the PDCCH may be configured in the UE by the base station using higher layer signaling (e.g., SIB, MIB, or RRC signaling). For example, the base station may configure the UE with, e.g., the number of PDCCH candidates at each aggregation level L, monitoring period for search space, monitoring occasion of symbol unit in slot for search space, search space type (common search space or UE-specific search space), combination of RNTI and DCI format to be monitored in the search space, and control resource set index to be monitored in the search space. For example, configuration information for the search space for the PDCCH may include information as shown in Table 9a and 9b.

TABLE 9a

```
SearchSpace ::=                          SEQUENCE {
  -- Identity of the search space. SearchSpaceId = 0 identifies the
     SearchSpace configured via PBCH (MIB) or
     ServingCellConfigCommon.
  searchSpaceId                            SearchSpaceId,
  (search space identity)
  controlResourceSetId                     ControlResourceSetId,
     (control region identity)
  monitoringSlotPeriodicityAndOffset         CHOICE {
  (monitoring slot level period)
     sl1                                   NULL,
     sl2                                   INTEGER (0..1),
     sl4                                   INTEGER (0..3),
     sl5                                 INTEGER (0..4),
     sl8                                   INTEGER (0..7),
     sl10                                  INTEGER (0..9),
     sl16                                  INTEGER (0..15),
     sl20                                  INTEGER (0..19)
  }
  duration(monitoring duration)                  INTEGER (2..2559)
  monitoringSymbolsWithinSlot                 BIT STRING (SIZE (14))
                                              OPTIONAL,
  (monitoring symbol in slots)
  nrofCandidates                           SEQUENCE {
  (a number of PDCCH candidate groups per aggregation level)
     aggregationLevel1                     ENUMERATED {n0, n1, n2,
n3, n4, n5, n6, n8},
     aggregationLevel2                     ENUMERATED {n0, n1, n2,
n3, n4, n5, n6, n8},
     aggregationLevel4                     ENUMERATED {n0, n1, n2,
n3, n4, n5, n6, n8},
     aggregationLevel8                     ENUMERATED {n0, n1, n2,
n3, n4, n5, n6, n8},
     aggregationLevel16                      ENUMERATED {n0, n1,
n2, n3, n4, n5, n6, n8}
  },
searchSpaceType                          CHOICE {
  (search space type)
     -- Configures this search space as common search space (CSS) and
     DCI formats to monitor.
     common                                SEQUENCE {
     (common search space)
       }
```

TABLE 9b

```
  ue-Specific              SEQUENCE {
(UE-specific search space)
     -- Indicates whether the UE monitors in this USS for DCI
formats 0-0 and 1-0 or for formats 0-1 and 1-1.
  formats                  ENUMERATED
{formats0-0-And-1-0, formats0-1-And-1-1},
     . . .
     }
```

According to the configuration information, the base station may configure one or more search space sets to the UE. According to an embodiment, the base station may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space. In the X-RNTI and Y-RNTI, "X" and "Y" may correspond to one of various RNTIs to be described below.

According to the above-described configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, a combination of DCI format and RNTI as follows may be monitored. Of course, it is not limited to the examples described below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of DCI format and RNTI as follows may be monitored. Of course, it is not limited to the examples described below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may be defined and used as follows.

Cell RNTI (C-RNTI): for scheduling UE-specific PDSCH

Temporary cell RNTI (TC-RNTI): for scheduling UE-specific PDSCH

Configured scheduling RNTI (CS-RNTI): for scheduling semi-statically configured UE-specific PDSCH Random access RNTI (RA-RNTI): for scheduling PDSCH in the random access phase Paging RNTI (P-RNTI): for scheduling PDSCH where paging is transmitted System information RNTI (SI-RNTI): for scheduling PDSCH where system information is transmitted Interruption RNTI (INT-RNTI): for indicating whether to puncture PDSCH Transmit power control for PUSCH RNTI (TPC-PUSCH-RNTI): for indicating power control command for PUSCH Transmit power control for PUCCH RNTI (TPC-PUCCH-RNTI): for indicating power control command for PUCCH Transmit power control for SRS RNTI (TPC-SRS-RNTI): for indicating power control command for SRS The above-described DCI formats may follow the definitions below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by Equation 1 below.

$$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\left\lfloor\frac{N_{CCE,p}}{L}\right\rfloor\right\}+i \quad \text{[Equation 1]}$$

L: aggregation level $n_{CI}$: carrier index $N_{CCE,p}$: total number of CCEs present in control resource set p $$n_{s,f}^{\mu}$$

slot index $$M_{s,max}^{(L)}$$

number of PDCCH candidate groups of aggregation level L $$m_{s,n_{CI}}=0,\ \ldots\ ,M_{s,max}^{(L)}-1:$$

PDCCH candidate group index of aggregation level L i=0, 0 L−1

$$Y_{p,n_{s,f}^{\mu}}=\left(A_p\cdot Y_{p,n_{s,f}^{\mu}-1}\right)\bmod D,$$

$Y_{p,-1}=n_{RNTI}\neq 0$, $A_p=39827$ for p mod 3=0, $A_p=39829$ for p mod 3=1, $A_p=39839$ for p mod 3=2, D=65537

$n_{RNTI}$: UE identifier $$Y_{p,n_{s,f}^{\mu}}$$

may correspond to 0 in the case of the common search space.

In the case of the UE-specific search space, $$Y_{p,n_{s,f}^{\mu}}$$

may be a value that changes depending on the UE's identity (C-RNTI or ID configured in the UE by the base station) and the time index.

In 5G, as a plurality of search space sets may be set with different parameters (e.g., parameters in Table 9), the set of search space sets monitored by the UE at each point in time may be different. For example, when search space set #1 is set at the X-slot period, search space set #2 is set at the Y-slot period, and X differs from Y, the UE may monitor both search space set #1 and search space set #2 in a specific slot and monitor either search space set #1 or search space set #2 in a specific slot.

[PDCCH: Span]

The UE ma perform UE capability reporting for the case where there are a plurality of PDCCH monitoring positions in a slot, at each subcarrier spacing, and in this case, the concept "span" may be used. Span means contiguous symbols where the UE may monitor PDCCH in a slot, and each PDCCH monitoring position is within one span. The span may be represented as (X,Y). Here, x means the minimum number of symbols where the first symbols of two consecutive spans should be apart from each other, and Y means the number of symbols where the PDCCH may be monitored in one span. In this case, the UE may monitor the PDCCH in the period of Y symbols from the first symbol of a span.

Figure 6:
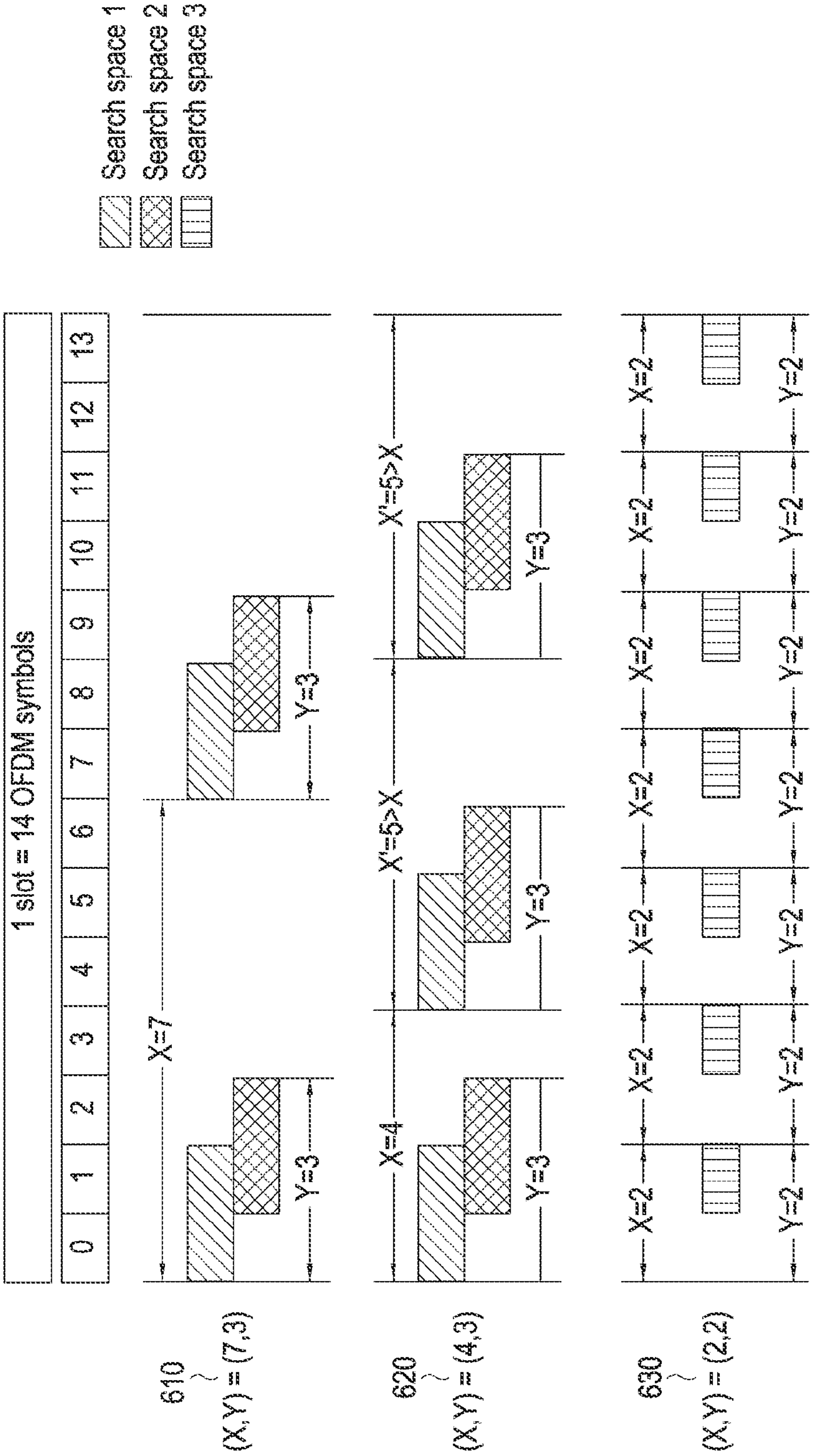
FIG. 6 is a view illustrating, via span, a case where a UE may have a plurality of PDCCH monitoring positions in a slot in a wireless communication system according to an embodiment of the disclosure.

FIG. 6 is a view illustrating, via span, a case where a UE may have a plurality of PDCCH monitoring positions in a slot in a wireless communication system.

FIG. 6 illustrates an example in which the span may be, e.g., (X,Y)=(7,3), (4,3), and (2,2) which are denoted by reference numbers 610, 620, and 630, respectively, in FIG. 6. As an example, 610 represents a case where there are two spans, which may be expressed as (7,3), in a slot. The interval between the first symbols of two spans is expressed as X=7, and a PDCCH monitoring position may exist within a total of Y=3 symbols from the first symbol of each span, and search spaces 1 and 2 are present within Y=3 symbols. As another example, in 620, a case where there are a total of three spans, which may be expressed as (4,3), in a slot is shown, and the interval between the second and third spans is X'=5 symbols which are larger than X=4. In 630, a case where a total of 7 spans that may be expressed as (2,2) exist in a slot is shown, and a PDCCH monitoring position may exist within a total of Y=2 symbols from the first symbol of each span, and search space 3 is present in the Y=2 symbols is shown.

[PDCCH: UE Capability Report]

The position of the slot where the above-described common search space and UE-specific search space are positioned is indicated by the monitoringSlotPeriodicityAndOffset parameter of Table 9 above which indicates configuration information about the search space for the PDCCH, and the symbol position in the slot is indicated by a bitmap through the monitoringSymbolsWithinSlot parameter of Table 9. Meanwhile, the symbol position in the slot where the UE is capable of search space monitoring may be reported to the base station through the following UE capabilities.

UE capability 1 (hereafter referred to as feature group (FG) 3-1). The UE capability means the capability of monitoring a corresponding monitoring occasion (MO) when the MO is positioned in the first three symbols of the slot when there is, in the slot, one MO for the UE-specific search space or type 1 and type 3 common search spaces as shown in Table 11 below. UE capability 1 is a mandatory capability that all UE supporting NR should support, and whether UE capability 1 is supported may not explicitly be reported to the base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6 RB bit-map and duration of 1-3 OFDM symbols for FR1<br>For type 1 CSS without dedicated RRC configuration and for type 0, 0A, and 2 CSSs, CORESET resource allocation of 6 RB bit-map and duration 1-3 OFDM symbols for FR2<br>For type 1 CSS with dedicated RRC configuration and for type 3 CSS, UE specific SS, CORESET resource allocation of 6 RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

UE capability 2 (hereafter referred to as FG 3-2). As shown in Table 13-2 below, UE capability 2 means a capability of monitoring regardless of where the start symbol of the corresponding MO is positioned when there is one MO for the common search space or UE-specific search space in the slot. This UE capability is optionally supported by the UE, and whether this capability is supported is explicitly reported to the base station.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoring-SingleOccasion |

UE capability 3 (hereafter referred to as FG 3-5, 3-5*a*, or 3-5*b*). This UE capability indicates the pattern of the MO which may be monitored by the UE when there are a plurality of MOs for the common search space or UE-specific search space in the slot as shown in Tables 13a and 13b. The above-described pattern is constituted of the inter-start symbol interval X between different MOs and the maximum symbol length for one MO. The (X,Y) combination that is supported by the UE may be one or more of {(2,2), (4,3), (7,3)}. This UE capability is optionally supported by the UE, and whether this capability is supported and the above-described (X,Y) combination are explicitly reported to the base station.

TABLE 13a

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAny-Occasions { 3-5. withoutDCI-Gap 3-5a. withDCI-Gap } |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |

TABLE 13b

| | | | |
|---|---|---|---|
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum | |

TABLE 13b-continued

| | | |
|---|---|---|
| | | value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. |
| 3-5b | All PDCCH monitoring occasion can be any OFDM symbol(s) of a slot for Case 2 with a span gap | For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. |

The UE may report, to the base station, whether UE capability 2 and/or UE capability 3 is supported and relevant parameters. The base station may perform time axis resource allocation on the common search space and UE-specific search space based on the UE capability. Upon resource allocation, the base station may prevent an MO from being positioned at a position where UE monitoring is impossible.

[PDCCH: BD/CCE Limit]

When a plurality of search space sets are configured to the UE, the following conditions may be considered in a method for determining the search space sets that should be monitored by the UE.

If the UE is configured with the value of monitoringCapabilityConfig-r16 which is higher layer signaling, as r15monitoringcapability, the UE defines, per slot, the number of PDCCH candidate groups that the UE may monitor and the maximum value for the number of CCEs constituting the entire search space (where the entire search space means the entire CCE set corresponding to the union area of a plurality of search space sets) and, if the UE is configured with the value of monitoringCapabilityConfig-r16, as r16monitoringcapability, the UE defines, per span, the number of PDCCH candidate groups that the UE may monitor and the maximum value for the number of CCEs constituting the entire search space (where the entire search space means the entire CCE set corresponding to the union area of a plurality of search space sets). For monitoringCapabilityConfig-r16, refer to the configuration information in Tables 14a and 14b below.

TABLE 14a

PDCCH-Config information element

```
-- ASNISTART
-- TAG-PDCCH-CONFIG-START
PDCCH-Config : :=                   SEQUENCE {
  controlResourceSetToAddModList              SEQUENCE (SIZE (1..3) ) OF ControlResourceSet
OPTIONAL, -- Need N
  controlResourceSetToReleaseList             SEQUENCE (SIZE (1..3) ) OF ControlResourceSetId
OPTIONAL, --- Need N
  searchSpacesToAddModList                    SEQUENCE (SIZE (1..10) ) OF SearchSpace
OPTIONAL, -- Need N
  searchSpacesToReleaseList                   SEQUENCE (SIZE (1..10) ) OF SearchSpaceId
OPTIONAL, -- Need N
  downlinkPreemption                          SetupRelease { DownlinkPreemption }
OPTIONAL, -- Need M
  tpc-PUSCH                                   SetupRelease { PUSCH-TPC-CommandConfig }
OPTIONAL, -- Need M
  tpc-PUCCH                                   SetupRelease { PUCCH-TPC-CommandConfig }
OPTIONAL, -- Need M
  tpc-SRS                                     SetupRelease { SRS-TPC-CommandConfig }
OPTIONAL, -- Need M
   . . . ,
  [ [
  controlResourceSetToAddModList    2   -r16     SEQUENCE   (SIZE (1..2) )   OF ControlResourceSet
OPTIONAL, -- Need N
  controlResourceSetToReleaseList-r16    SEQUENCE   (SIZE   (1..5) )   OF   ControlResourceSetId-r16
OPTIONAL, -- Need N
  searchSpacesToAddModListExt-r16             SEQUENCE (SIZE (1..10) ) OF SearchSpaceExt-r16
OPTIONAL, -- Need N
  uplinkCancellation-r16                      SetupRelease          { UplinkCancellation-r16 }
OPTIONAL, -- Need M
  monitoringCapabilityConfig-r16      ENUMERATED { r15monitoringcapability, r16monitoringcapability
} OPTIONAL, Need M
```

TABLE 14a-continued

PDCCH-Config information element

```
  searchSpaceSwitchConfig-r16                                    SearchSpaceSwitchConfig-r16
OPTIONAL -- Need R
  ] ],
  . . .
}
SearchSpaceSwitchConfig-r16 : :=      SEQUENCE {
  cellGroupsForSwitchList-r16              SEQUENCE (SIZE (1..4)) OF CellGroupForSwitch-r16
OPTIONAL, -- Need R
  searchSpaceSwitchDelay-r16                                             INTEGER (10.. 2)
OPTIONAL -- Need R
}
CellGroupForSwitch-r16 : :=                      SEQUENCE (SIZE (1.. 6) ) OF ServCellIndex
-- TAG-PDCCH-CONFIG-STOP
-- ASNISTOP
```

TABLE 14b

| PDCCH-Config field descriptions |
|---|
| controlResourceSetToAddModList, controlResourceSetToAddModList2<br>List of UE specifically configured Control Resource Sets (CORESETs) to be used by the UE. The network restrictions on configuration of CORESETs per DL BWP are specified in TS 38.213 [13], clause 10.1 and TS 38.306 [26]. The UE shall consider entries in controlResourceSetToAddModList and in controlResourceSetToAddModList2 as a single list, i.e. an entry created using controlResourceSetToAddModList can be modified using controlResourceSetToAddModList2 and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon. |
| controlResourceSetToReleaseList<br>List of UE specifically configured Control Resource Sets (CORESETs) to be released by the UE. This field only applies to CORESETs configured by controlResourceSetToAddModList and does not release the field commonControlResourceSet configured by PDCCH-ConfigCommon. |
| downlinkPreemption<br>Configuration of downlink preemption indications to be monitored in this cell (see TS 38.213 [13], clause 11.2). |
| monitoringCapabilityConfig<br>Configures either Rel-15 PDCCH monitoring capability or Rel-16 PDCCH monitoring capability for PDCCH monitoring on a serving cell. Value r15monitoringcapability enables the Rel-15 monitoring capability, and value r16monitoringcapability enables the Rel-16 PDCCH monitoring capability (see TS 38.213 [13], clause 10.1). |
| searchSpacesToAddModList, searchSpacesToAddModListExt<br>List of UE specifically configured Search Spaces. The network configures at most 10 Search Spaces per BWP per cell (including UE-specific and common Search Spaces). If the network includes searchSpacesToAddModListExt, it includes the same number of entries, and listed in the same order, as in searchSpacesToAddModList. |
| tpc-PUCCH<br>Enable and configure reception of group TPC commands for PUCCH. |
| tpc-PUSCH<br>Enable and configure reception of group TPC commands for PUSCH. |
| tpc-SRS<br>Enable and configure reception of group TPC commands for SRS. |
| uplinkCancellation<br>Configuration of uplink cancellation indications to be monitored in this cell (see TS 38.213 [13], clause 11.2A). |

[Condition 1: Limit to Maximum Number of PDCCH Candidate Groups]

According to the setting value of higher layer signaling as described above, the maximum number $M^{\mu}$ of PDCCH candidate groups that may be monitored by the UE may follow Table 15a if it is defined based on slot in the cell where the subcarrier spacing is set to 15.24 kHz and follow Table 15b if it is defined based on span.

TABLE 15a

| μ | Maximum number of PDCCH candidates per slot and per serving cell ($M^{\mu}$) |
|---|---|
| 0 | 44 |
| 1 | 36 |
| 2 | 22 |
| 3 | 20 |

TABLE 15b

| μ | Maximum number $M^{\mu}$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

[Condition 2: Limit to Maximum Number of CCEs]

According to the setting value of higher layer signaling as described above, Cu which is the maximum number of CCEs constituting the entire search space (where the entire search space means the entire CCE set corresponding to the union area of a plurality of search space sets) may follow Table 16a if it is defined based on slot in the cell where the subcarrier spacing is set to $15\cdot 2^{\mu}$ kHz and follow Table 16b if it is defined based on span.

TABLE 16a

| μ | Maximum number of non-overlapped CCEs per slot and per serving cell ($C^{\mu}$) |
|---|---|
| 0 | 56 |
| 1 | 56 |
| 2 | 48 |
| 3 | 32 |

TABLE 16b

| μ | Maximum number $C^{\mu}$ of non-overlapped CCEs per span for combination (X, Y) and per serving cell | | |
|---|---|---|---|
| | (2, 2) | (4, 3) | (7, 3) |
| 0 | 18 | 36 | 56 |
| 1 | 18 | 36 | 56 |

For convenience of description, a situation in which both conditions 1 and 2 are met at a specific point in time is defined as "condition A". Accordingly, not meeting condition A may mean not meeting at least one of conditions 1 and 2 above.

[PDCCH: Overbooking]

According to the configuration of search space sets by the base station, an occasion in which condition A is not met may occur at a specific point in time. If condition A is not met at a specific point in time, the UE may select only some of search space sets configured to meet condition A at that point in time to perform monitoring, and the base station may transmit the PDCCH through the selected search space set.

As a method for selecting some search spaces from the entire configured search space set, the following method may be followed.

If condition A for the PDCCH is not met at a specific time point (slot), the UE (or the base station) may select the search space set whose search space type is set as common search space among the search space sets present at the corresponding time point preferentially over the search space set which is set as UE-specific search space.

When all of the search space sets set as common search space are selected (i.e., when condition A is met even after all the search spaces set as common search space are selected), the UE (or base station) may select the search space sets set as UE-specific search space. In this case, when there are a plurality of search space sets set as UE-specific search space, the search space set having a lower search space set index may have higher priority. Considering priority, UE-specific search space sets may be selected within a range where condition A is met.

[QCL, TCI State]

In the wireless communication system, one or more different antenna ports (which may be replaced with one or more channels, signals, or combinations thereof, but are collectively referred to as different antenna ports for convenience of description in the following description of the disclosure) may be associated with each other through quasi co-location (QCL) configuration as shown in Table 17 below. The TCI state is for announcing/indicating the QCL relationship between the PDCCH (or PDCCH DMRS) and another RS or between channels. When some reference antenna port A (reference RS #A) and another target antenna port B (target RS #B) are QCLed with each other, this means that the UE is allowed to apply all or some of the large-scale channel parameters estimated in antenna port A to channel measurement from antenna port B. QCL may require associating different parameters depending on contexts, such as 1) time tracking influenced by average delay and delay spread, 2) frequency tracking influenced by Doppler shift and Doppler spread, 3) radio resource management (RRM) influenced by average gain, and 4) beam management (BM) influenced by spatial parameter. Accordingly, NR supports four types of QCL relationships as shown in Table 17 below.

TABLE 17

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Spatial RX parameter may collectively refer to all or some of various parameters, such as Angle of arrival (AoA), Power Angular Spectrum (PAS) of AoA, Angle of departure (AoD), PAS of AoD, transmit/receive channel correlation, transmit/receive beamforming, spatial channel correlation.

The QCL relationship may be configured to the UE through the RRC parameter TCI-State and QCL-Info as shown in Table 18 below. Referring to Table 18 below, the base station may configure the UE with one or more TCI states, indicating up to two QCL relationships (qcl-Type1 and qcl-Type2) for the RS referencing the ID of the TCI state, i.e., the target RS. In this case, the QCL information (QCL-Info) included in each TCI state includes the serving cell index and BWP index of the reference RS indicated by the QCL information, type and ID of the reference RS, and the QCL type as shown in Table 17 above.

TABLE 18

```
TCI-State ::=          SEQUENCE {
  tci-StateId          TCI-StateId,
  (ID of corresponding TCI state)
  qcl-Type1            QCL-Info,
  (QCL information about first reference RS of RS (target RS)
referring to corresponding TCI state ID)
  qcl-Type2            QCL-Info               OPTIONAL,   -- Need R
  (QCL information about second reference RS of RS (target RS)
referring to corresponding TCI state ID)
  . . .
}
QCL-Info ::=           SEQUENCE {
  cell                   ServCellIndex        OPTIONAL,   -- Need R
  (serving cell index of reference RS indicated by corresponding
  QCL information)
  bwp-Id                 BWP-Id               OPTIONAL,   --   Cond
CSI-RS-Indicated
  (BWP index of reference RS indicated by corresponding QCL
  information)
  referenceSignal        CHOICE {
    csi-rs                 NZP-CSI-RS-ResourceId,
    ssb                    SSB-Index
    (one of CSI-RS ID or SSB ID indicated by corresponding
    QCL information)
  },
  qcl-Type               ENUMERATED {typeA, typeB, typeC, typeD},
  . . .
}
```

Figure 7:
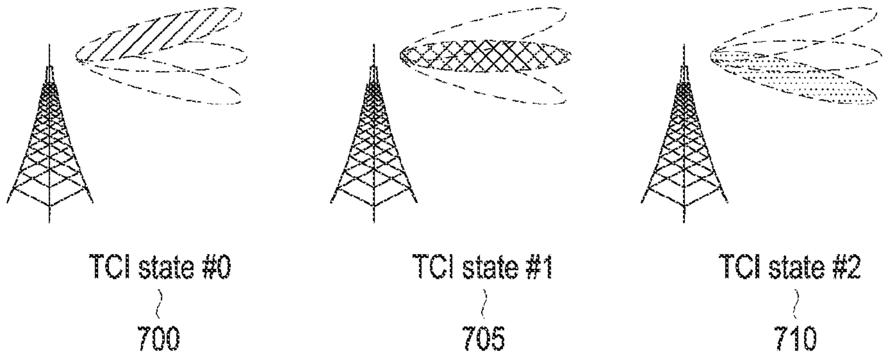
FIG. 7 is a view illustrating an example of base station beam allocation according to a TCI state configuration in a wireless communication system according to an embodiment of the disclosure.

FIG. 7 is a view illustrating an example of base station beam allocation according to a TCI state configuration. Referring to FIG. 7, the base station may transfer information about N different beams to the UE through N different TCI states. For example, when N=3 as shown in FIG. 7, the base station may announce/indicate that the qcl-Type2 parameter included in three TCI states 700, 705, and 710 is associated with the CSI-RSs or SSBs corresponding to different beams and is rendered to be set in QCL type D so that the antenna ports referencing the different TCI states 700, 705, and 710 are associated with different spatial RX parameters, i.e., different beams.

Tables 19a to 19e below show effective TCI state configurations according to target antenna port types.

Table 19a below shows the effective TCI state configuration when the target antenna port is CSI-RS for tracking (TRS). The TRS refers to a non-zero-power (NZP) CSI-RS in which no repetition parameter is set among CSI-RSs and trs-Info is set to true in the configuration information exemplified in Tables 20a and 20b. Configuration No. 3 in Table 19a may be used for aperiodic TRS.

TABLE 19a

| Valid TCIstate Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS1) | QCL-TypeD |

Table 19b below shows the effective TCI state configuration when the target antenna port is CSI-RS for CSI. The CSI-RS for CSI refers to an NZP CSI-RS in which no parameter indicating repetition (e.g., repetition parameter) is set and trs-Info is not set to true among the CSI-RSs.

TABLE 19b

| Valid TCIstate Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS for BM | QCL-TypeD |
| 3 | TRS | QCL-TypeA | TRS (same as DL RS1) | QCL-TypeD |
| 4 | TRS | QCL-TypeB | | |

Table 19c below shows effective TCI state configurations when the target antenna port is CSI-RS for beam management (BM, which is identical in meaning to CSI-RS for L1 reference signal received power (RSRP) reporting). The CSI-RS for BM refers to an NZP CSI-RS in which a repetition parameter is set and has a value of On or Off, and trs-Info is not set to true among the CSI-RSs.

TABLE 19c

| Valid TCIstate Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |

TABLE 19c-continued

| Valid TCIstate Configuration | DL RS 1 | qcl-Type1 | DL RS 2 (if configured) | qcl-Type2 (if configured) |
|---|---|---|---|---|
| 3 | SS/PBCH Block | QCL-TypeA | SS/PBCH Block | QCL-TypeD |

Table 19d below shows the effective TCI state configuration when the target antenna port is PDCCH DMRS.

TABLE 19d

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS1) | QCL-TypeD |

Table 19e below shows the effective TCI state configuration when the target antenna port is PDSCH DMRS.

TABLE 19e

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Tables 19a to 19e above is to set and operate the target antenna port and reference antenna port for each step as "SSB"→"TRS"→"CSI-RS for CSI, or CSI-RS for BM, or PDCCH DMRS, or PDSCH DMRS". This may help the UE's reception operation, with the statistical characteristics measurable from the SSB and TRS associated with the antenna ports.

For configuration information about trs-Info related to the NZP CSI-RS, refer to Tables 20a and 20b below.

TABLE 20a

NZP-CSI-RS-ResourceSet information element

```
-- ASN1START
-- TAG-NZP-CSI-RS-RESOURCESET-START
NZP-CSI-RS-ResourceSet ::=        SEQUENCE {
   nzp-CSI-ResourceSetId             NZP-CSI-RS-ResourceSetId,
   nzp-CSI-RS-Resources              SEQUENCE (SIZE (1..maxNrofNZP-CSI-RS-
ResourcesPerSet)) OF NZP-CSI-RS-ResourceId,
   repetition                     ENUMERATED { on, off }
OPTIONAL, -- Need S
   aperiodicTriggeringOffset         INTEGER(0..6)
OPTIONAL, -- Need S
   trs-Info                       ENUMERATED {true}
OPTIONAL, -- Need R
   . . .,
   [ [
   aperiodicTriggeringOffset-r16     INTEGER(0..31)
OPTIONAL, -- Need S
   ] ],
}
-- TAG-NZP-CSI-RS-RESOURCESET-STOP
-- ASN1STOP
```

TABLE 20b

| NZP-CSI-RS-ResourceSet field descriptions |
|---|
| aperiodicTriggeringOffset, aperiodicTriggeringOffset-r16<br>Offset X between the slot containing the DCI that triggers a set of aperiodic NZP CSI-RS resources and the slot in which the CSI-RS resource set is transmitted. For aperiodicTriggeringOffset the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0. |
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set. |
| repetition<br>Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report". |
| trs-Info<br>Indicates that the antenna port for all NZP-CSI-RS resources in the CSI-RS resource set is same. If the field is absent or released the UE applies the value false (see TS 38.214 [19], clause 5.2.2.3.1). |

[PDCCH: TCI State Related]

Specifically, a combination of TCI states applicable to the PDCCH DMRS antenna port is as shown in Table 21 below. In Table 21, the fourth row is a combination assumed by the UE before RRC configuration, and configuration after RRC is not possible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
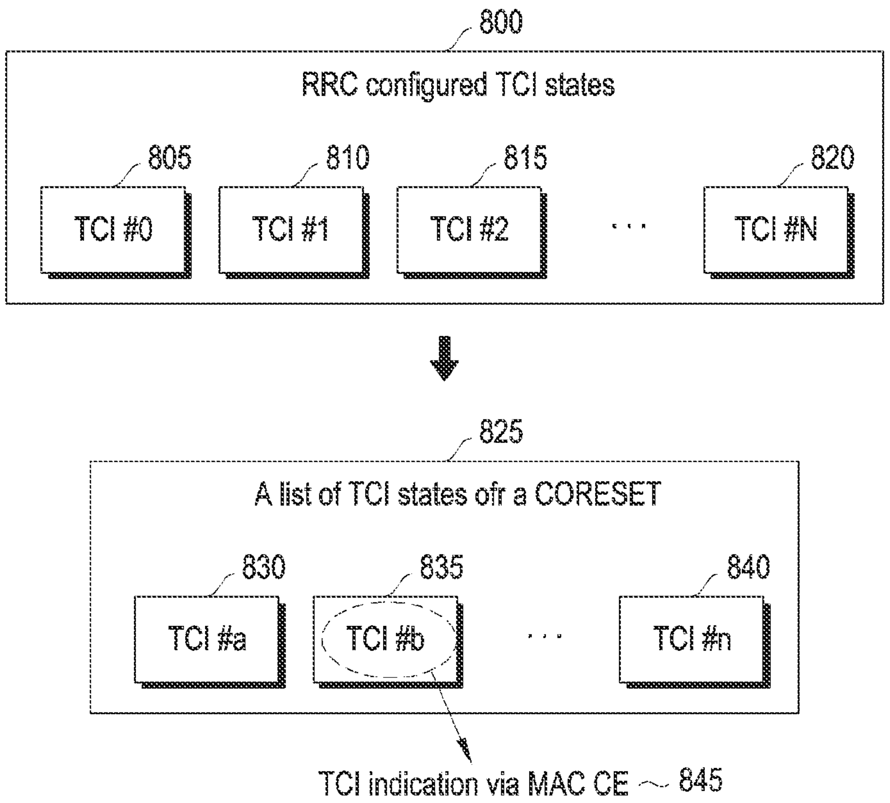
FIG. 8 is a view illustrating an example of a TCI state allocation method for a PDCCH in a wireless communication system according to an embodiment of the disclosure.

NR supports a hierarchical signaling method as shown in FIG. 8 for dynamic allocation of a PDCCH beam.

FIG. 8 is a view illustrating an example of a TCI state allocation method for a PDCCH in a wireless communication system according to an embodiment of the disclosure.

Referring to FIG. 8, the base station may configure N TCI states 805, 810, . . . , 820 to the UE through RRC signaling 800 and set some of them as TCI states for CORESET (825). Thereafter, the base station may indicate one of the TCI states 830, 835, and 840 for CORESET to the UE through MAC control element (CE) signaling (845). Thereafter, the UE receives the PDCCH based on the beam information included in the TCI state indicated by the MAC CE signaling.

Figure 9:
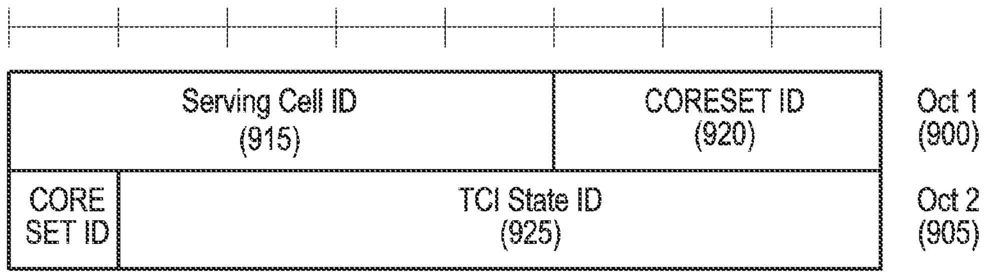
FIG. 9 is a view illustrating a TCI indication MAC CE signaling structure for a PDCCH DMRS in a wireless communication system according to an embodiment of the disclosure.

FIG. 9 is a view illustrating a TCI indication MAC CE signaling structure for a PDCCH DMRS in a wireless communication system according to an embodiment of the disclosure.

Referring to FIG. 9, TCI indication MAC CE signaling for PDCCH DMRS is constituted of, e.g., 2 bytes (16 bits) (Oct1 900, Oct2 905) and includes five-bit serving cell ID 915, four-bit CORESET ID 920, and seven-bit TCI state ID 925.

Figure 10:
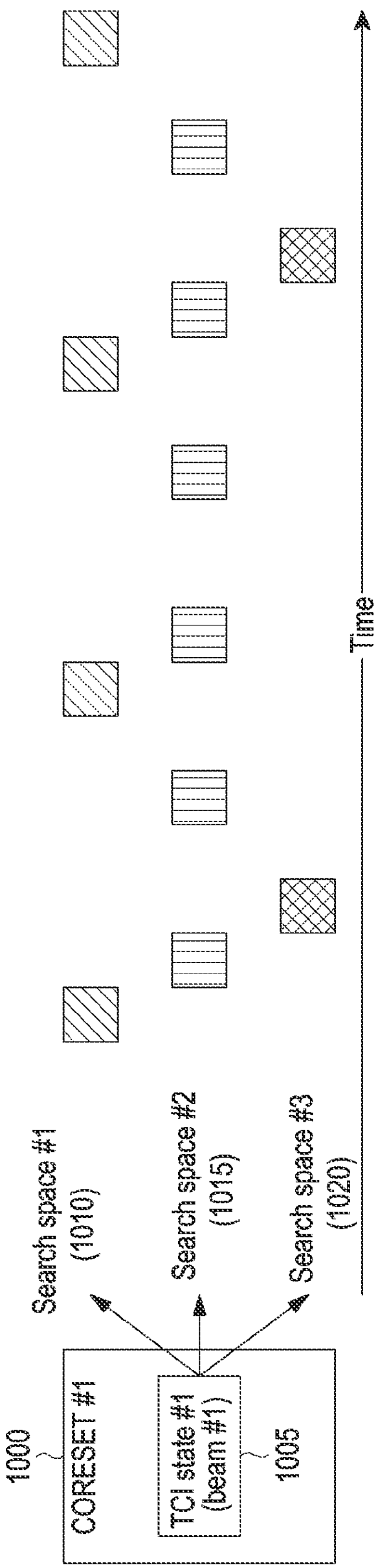
FIG. 10 is a view illustrating an example of a beam configuration of a search space and a control resource set in a wireless communication system according to an embodiment of the disclosure.

FIG. 10 is a view illustrating an example of a beam configuration of a search space and a control resource set (CORESET) in a wireless communication system according to an embodiment of the disclosure.

Referring to FIG. 10, the base station may indicate, to the UE through MAC CE signaling, one of TCI state lists included in the CORESET (1000) configuration (1005). Thereafter, until before another TCI state is indicated to the corresponding CORESET through other MAC CE signaling, the UE regards the same QCL information (beam #1, 1005) for one or more search spaces #1, #2, and #3 1010, 1015, and 1020, associated with the CORESET. The above-described PDCCH beam allocation method has difficulty in indicating a quicker beam change than MAC CE signaling delay and applies the same beam to all the CORESETs regardless of the search space characteristics. Thus, flexible PDCCH beam operation may be difficult.

A method for configuring and operating a PDCCH beam more flexibly is provided below in embodiments of the disclosure. In describing embodiments of the disclosure, for convenience of description, some separated examples are provided, but the example embodiments do not exclude each other, but rather, two or more embodiments may be combined and applied depending on contexts.

The base station may configure, to the UE, one or more TCI states for a specific control resource set and activate one of the configured TCI states through a MAC CE activation command. For example, {TCI state #0, TCI state #1, TCI state #2} are set in control resource set #1 as TCI states. The base station may transmit, to the UE, a command to activate to assume TCI state #0 as the TCI state for control resource set #1, through the MAC CE. Based on the activation command for the TCI state received through the MAC CE, the UE may correctly receive the DMRS of the corresponding control resource set based on QCL information in the activated TCI state.

For the control resource set (control resource set #0) in which the index is set to 0, if the UE does not receive the MAC CE activation command for the TCI state of control resource set #0, the UE may assume (QCL assumption) that the DMRS transmitted in control resource set #0 is QCLed with the SS/PBCH block (SSB) identified in an initial access process or a non-contention-based random access process that is not triggered by the PDCCH command.

For the control resource set (control resource set #X) in which the index is set to a non-zero value, if the TCI state for control resource set #X is not configured to the UE or if one or more TCI states are configured but a MAC CE activation command for activating one of them is not received, the UE may assume that the DMRS transmitted in control resource set #X has been QCLed with the SS/PBCH block identified in the initial access process.

[PDCCH: QCL Prioritization Rule Related]

Hereinafter, the operation of determining the QCL priority for PDCCH is described in detail.

When the UE operates in carrier aggregation in a band or a single cell, and a plurality of control resource sets present in the bandwidth part activated in a single cell or a plurality of cells are equal to each other or overlap each other over time with the same or different QCL-TypeD characteristics in a specific PDCCH monitoring period, the UE may select a specific control resource set according to the QCL prioritization operation and monitor control resource sets having the same QCL-TypeD characteristics as those of the corresponding control resource set. In other words, when a plurality of control resource sets overlap over time, only one QCL-TypeD characteristic may be received. In this case, the criteria for determining the QCL priority may be as follows.

Criterion 1. A control resource set connected to the common search space having the lowest index, in the cell corresponding to the lowest index among cells including the common search space.

Criterion 2. A control resource set connected to the UE-specific search space having the lowest index in the cell corresponding to the lowest index among cells including the UE-specific search space;

As described above, when the above criteria are not met, the following criteria apply. For example, when control resource sets overlap over time in a specific PDCCH monitoring period, if all control resource sets are not connected to the common search space but are connected to the UE specific search space, i.e., if criterion 1 is not met, the UE may apply criterion 2 while omitting criterion 1.

When the UE selects the control resource set based on the above-described criteria, the UE may additionally consider two matters regarding the QCL information set in the control resource set as follows. First, when it has CSI-RS 1 as a reference signal in which control resource set 1 has the QCL-TypeD relationship, the reference signal in which CSI-RS 1 has the QCL-TypeD relationship is SSB1, and the reference signal in which another control resource set 2 has the QCL-TypeD relationship is SSB1, the UE may consider that the two control resource sets 1 and 2 have different QCL-TypeD characteristics. Second, when it has CSI-RS 1 configured in cell 1, as a reference signal in which control resource set 1 has the QCL-TypeD relationship, the reference signal in which CSI-RS 1 has the QCL-TypeD relationship is SSB1, and it has CSI-RS 2 configured in cell 2, as a reference signal in which control resource set 2 has the QCL-TypeD relationship, and the reference signal in which CSI-RS 2 has the QCL-TypeD relationship is SSB1, the UE may consider that the two control resource sets have the same QCL-TypeD characteristics.

Figure 11:
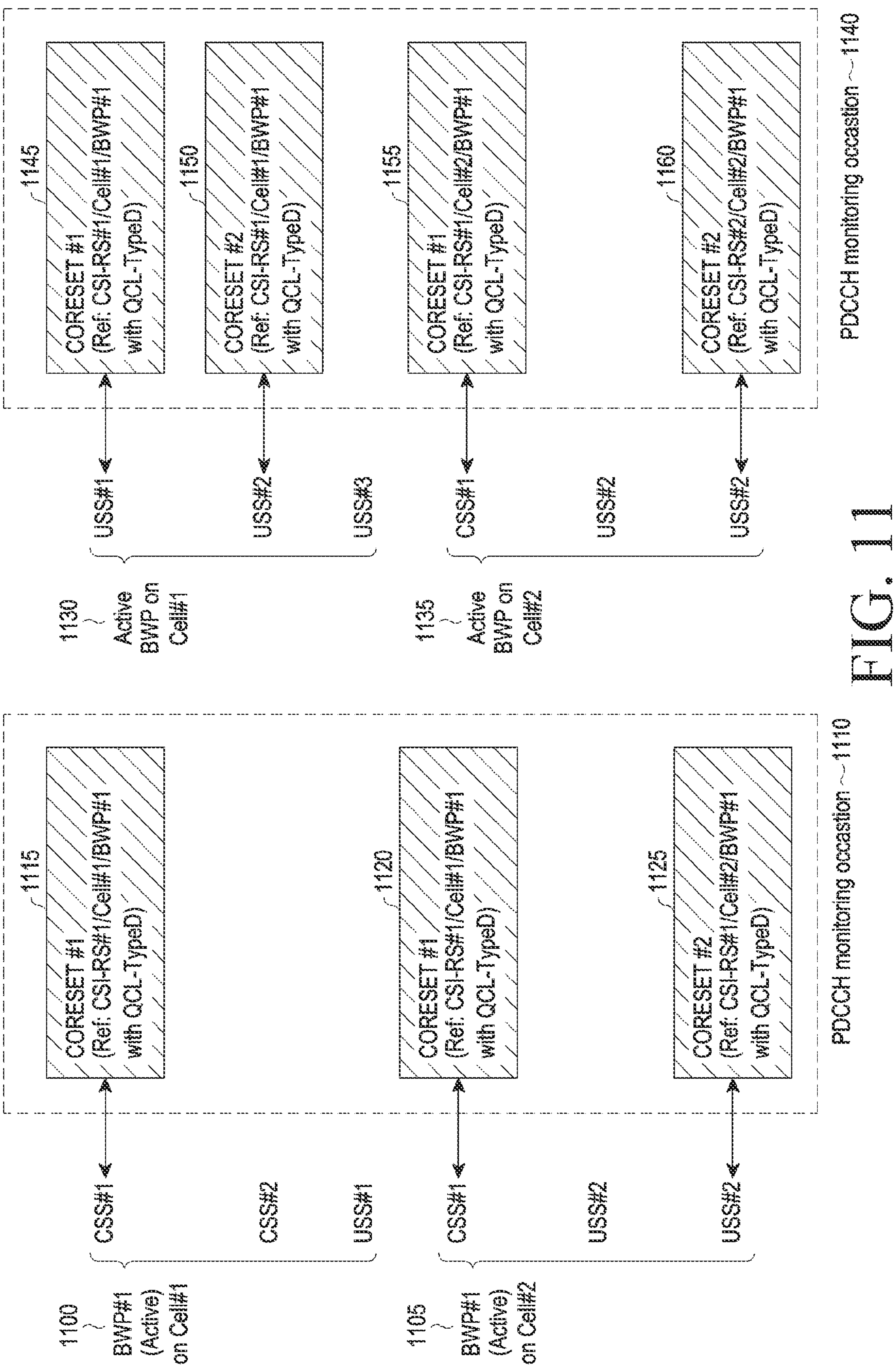
FIG. 11 is a view illustrating a method for selecting a control resource set receivable considering priority when a UE receives a downlink control channel in a wireless communication system according to an embodiment of the disclosure.

FIG. 11 is a view illustrating a method for selecting a control resource set receivable considering priority when a UE receives a downlink control channel in a wireless communication system according to an embodiment of the disclosure.

For example, the UE may be configured to receive a plurality of control resource sets that overlap over time in a specific PDCCH monitoring period 1110, and the plurality of control resource sets may be associated with the common search space or UE-specific search space for a plurality of cells. In the corresponding PDCCH monitoring period, control resource set 1 1115 associated with common search space 1 may be present in bandwidth part 1 1100 of cell 1, and control resource set 1 1120 associated with common search space 1 and control resource set 2 1125 associated with UE-specific search space 2 may be present in bandwidth part 1 1105 of cell 2. The control resource sets 1115 and 1120 may have the QCL-TypeD relationship with CSI-RS resource 1 configured in bandwidth part 1 of cell 1, and the control resource set 1125 may have the QCL-TypeD relationship with CSI-RS resource 1 configured in bandwidth part 1 of cell 2. Therefore, if criterion 1 applies to the corresponding PDCCH monitoring period 1110, all other control resource sets which have the same QCL-TypeD reference signal as control resource set 1 1115 may be received. Accordingly, the UE may receive the control resource sets 1115 and 1120 in the corresponding PDCCH monitoring period 1110. As another example, the UE may be configured to receive a plurality of control resource sets that overlap over time in a specific PDCCH monitoring period 1140, and the plurality of control resource sets may be associated with the common search space or UE-specific search space for a plurality of cells. In the corresponding PDCCH monitoring period, control resource set 1 1145 associated with UE-specific search space 1 and control resource set 2 1150 associated with UE-specific search space 2 may be present in bandwidth part 1 1130 of cell 1, and control resource set 1 1155 associated with UE-specific search space 1 and control resource set 2 1160 associated with UE-specific search space 3 may be present in bandwidth part 1 1135 of cell 2. The control resource sets 1145 and 1150 may have the QCL-TypeD relationship with CSI-RS resource 1 configured in bandwidth part 1 of cell 1, the control resource set 1155 may have the QCL-TypeD relationship with CSI-RS resource 1 configured in bandwidth part 1 of cell 2, and the control resource set 1160 may have the QCL-TypeD relationship with CSI-RS resource 2 configured in bandwidth part 1 of cell 2. However, when criterion 1 is applied to the corresponding PDCCH monitoring period 1140, since there is no common search space, criterion 2, which is the next criterion, may be applied. If criterion 2 applies to the corresponding PDCCH monitoring period 1140, all other control resource sets which have the same QCL-TypeD reference signal as the control resource set 1145 may be received. Accordingly, the UE may receive the control resource sets 1145 and 1150 in the corresponding PDCCH monitoring period 1140.

Figure 12:
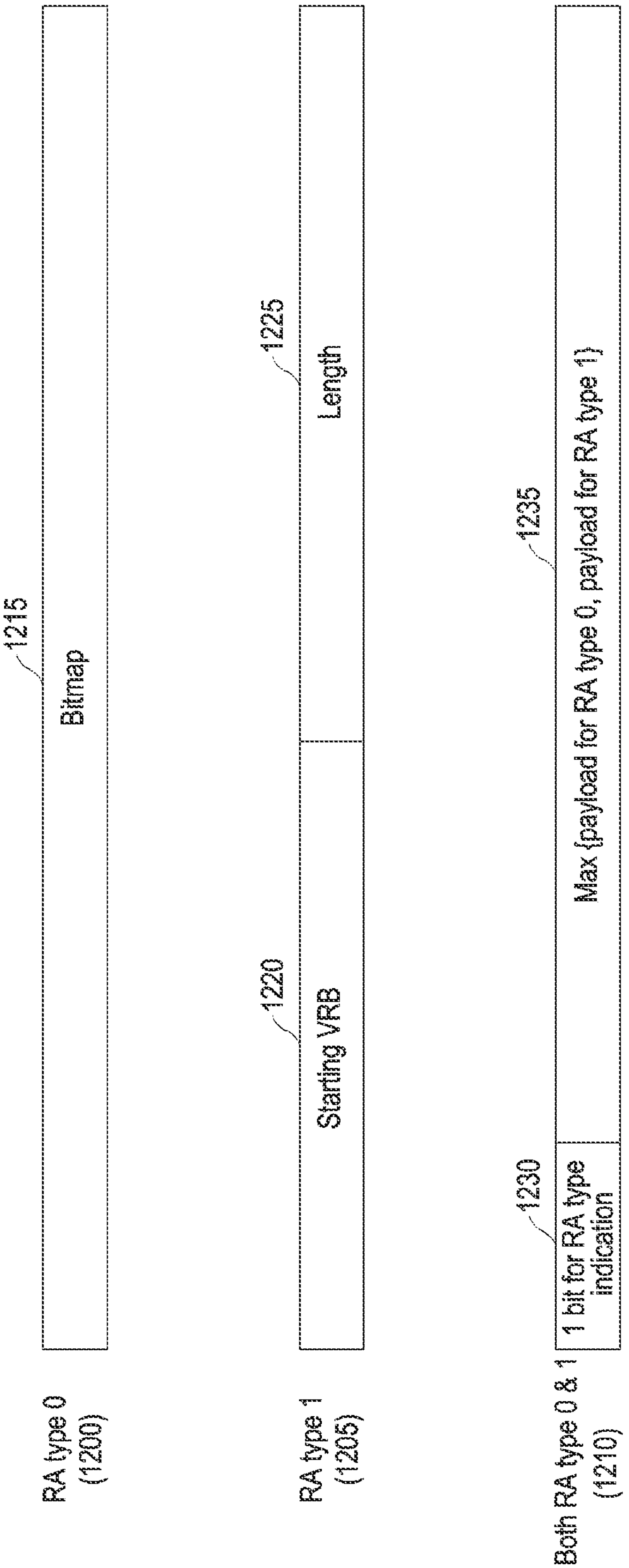
FIG. 12 is a view illustrating an example of a frequency axis resource allocation of a PDSCH in a wireless communication system according to an embodiment of the disclosure.

FIG. 12 is a view illustrating an example of a frequency axis resource allocation of a PDSCH in a wireless communication system according to an embodiment of the disclosure.

Referring to FIG. 12, three frequency axis resource allocation methods are exemplified: resource allocation (RA) type 0 1200, RA type 1 1205, and a dynamic switch (RA type 0, RA type 1) 1210, which may be configured through higher layer signaling. When the UE is configured to use only RA type 0 1200 through higher layer signaling, some downlink control information (DCI) to allocate the PDSCH to the UE includes a bitmap 1215 constituted of NRBG bits. In this case, NRBG means the number of resource block groups (RBGs) determined as illustrated in Table 22 below according to the BWP size allocated by the BWP indicator and the higher layer parameter rbg-Size, and data is transmitted in the RBG expressed as 1 by the bitmap.

TABLE 22

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only RA type 1 1205 through higher layer signaling, some DCIs that allocate a PDSCH to the corresponding UE includes frequency axis resource allocation information composed of $$\lceil \log_2(N_{RB}^{DL,BWP}(N_{RB}^{DL,BWP})+1)/2) \rceil$$

bits.

$$N_{RB}^{DL,BWP}$$

is the number of RBs of the downlink bandwidth part (BWP). Accordingly, the base station may set the starting VRB 1220 and the length 1225 of the frequency axis resources contiguously allocated therefrom.

If the UE is configured to be able to use both RA type 0 and RA type 1 through higher layer signaling (1210), some DCIs that allocate a PDSCH to the UE include frequency axis resource allocation information composed of bits of the larger 1235 of the payload for setting RA type 0 and the payload for setting RA type 1. In this case, one bit 1230 may be added to the first portion MSB of the frequency axis resource allocation information in the DCI to indicate the use of RA type 0 or RA type 1. For example, when the corresponding bit 1230 is a value of '0', it may be indicated that RA type 0 is used, and when the corresponding bit 1230 is a value of '1', it may be indicated that RA type 1 is used.

[PDSCH/PUSCH: Related to Time Resource Allocation]

Hereinafter, a time domain resource allocation method for a data channel in a next-generation wireless communication system (5G or NR system) is described.

The base station may configure the UE with a table for time domain resource allocation information for a physical downlink shared channel (PDSCH) and a physical uplink shared channel (PUSCH) via higher layer signaling (e.g., RRC signaling). For PDSCH, a table including up to maxNrofDL-Allocations=16 entries may be configured and, for PUSCH, a table including up to maxNrofUL-Allocations=16 entries may be configured. In an embodiment, the time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Table 23 or 24 below may be transmitted from the base station to the UE.

TABLE 23

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResource-Allocation |
| (PDCCH-to-PDSCH timing, unit of slot) |
| PDSCH-TimeDomainResourceAllocation ::= SEQUENCE { |
| k0 INTEGER (0..32) OPTIONAL, -- Need S |
| mappingType ENUMERATED {typeA, typeB}, |
| (PDSCH mapping type) |
| startSymbolAndLength INTEGER (0..127) |
| (start symbol and length of PDSCH) |
| } |

TABLE 24

| PUSCH-TimeDomainResourceAllocation information element |
|---|
| PUSCH-TimeDomainResourceAllocationList ::= SEQUENCE (SIZE(1..maxNrofUL-Allocations)) OF PUSCH-TimeDomainResourceAllocation |
| PUSCH-TimeDomainResourceAllocation ::= SEQUENCE { |
| k2 INTEGER(0..32) OPTIONAL, -- Need S |
| (PDCCH-to-PUSCH timing, unit of slot) |
| mappingType ENUMERATED {typeA, typeB}, |
| (PUSCH mapping type) |
| startSymbolAndLength INTEGER(0..127) |
| (start symbol and length of PDSCH) |
| } |

The base station may notify the UE of one of the entries in the table for the time domain resource allocation information via L1 signaling (e.g., DCI) (e.g., it may be indicated with the 'time domain resource allocation' field in the DCI). The UE may obtain time domain resource allocation information for the PDSCH or PUSCH based on the DCI received from the base station.

Figure 13:
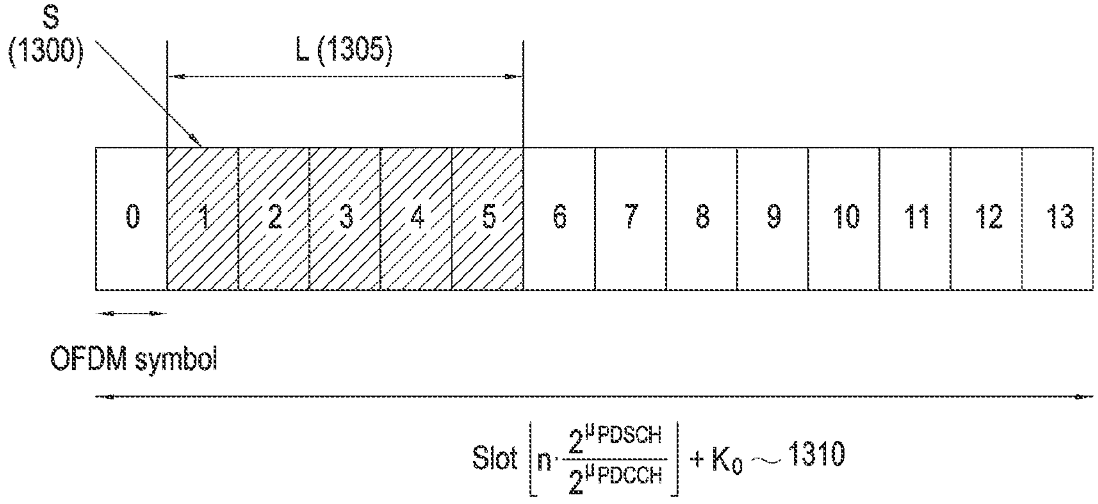
FIG. 13 is a view illustrating an example of a time axis resource allocation of a PDSCH in a wireless communication system according to an embodiment of the disclosure.

FIG. 13 is a view illustrating an example of a time axis resource allocation of a PDSCH in a wireless communication system according to an embodiment of the disclosure.

Referring to FIG. 13, the base station may indicate the position of the PDSCH resource on the time axis according to the subcarrier spacing (SCS) ($\mu_{PDSCH}$, $\mu_{PDCCH}$) of the data channel and the control channel configured using the higher layer signaling, scheduling offset (K0), and the OFDM symbol start position(S) 1300 and length 1305 in one slot 1310 dynamically indicated via DCI.

Figure 14:
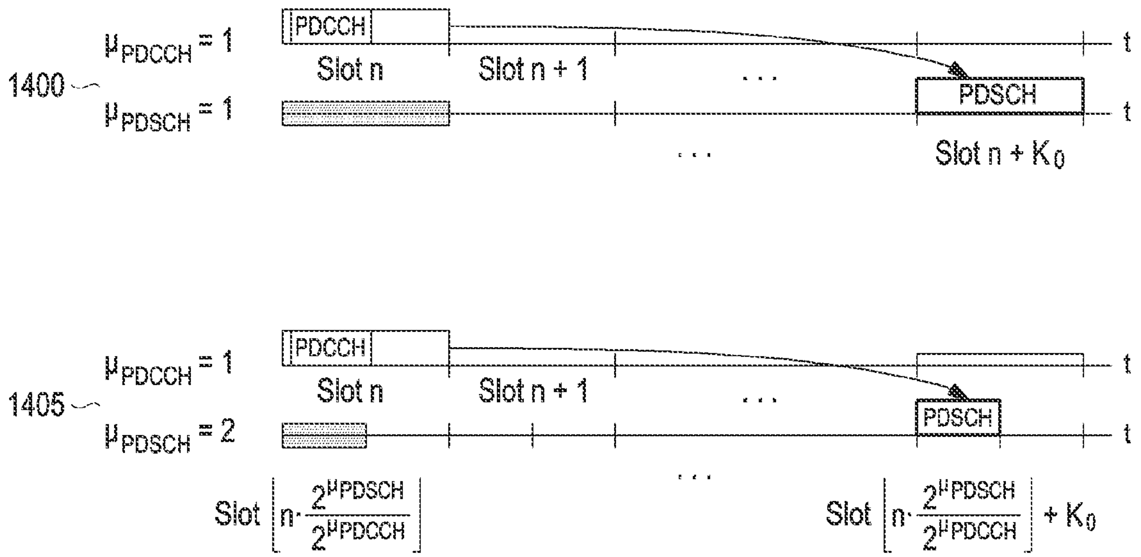
FIG. 14 is a view illustrating an example of allocating a resource on a time axis according to subcarrier spacings of a data channel and a control channel in a wireless communication system according to an embodiment.

FIG. 14 is a view illustrating an example of allocating a resource on a time axis according to subcarrier spacings of a data channel and a control channel in a wireless communication system according to an embodiment.

Referring to FIG. 14, when the subcarrier spacings (SCSs) ($\mu_{PDSCH}$, $\mu_{PDCCH}$) of the data channel and the control channel are the same (1400, $\mu_{PDSCH}=\mu_{PDCCH}$), the slot numbers for data and control are the same, so that the base station and the UE may generate a scheduling offset according to a predetermined slot offset K0. In contrast, when the subcarrier spacings of the data channel and the control channel are different from each other (1405, $\mu_{PDSCH}\neq\mu_{PDCCH}$), the slot numbers for data and control are different so that the base station and the UE may generate a scheduling offset according to a predetermined slot offset K0 with respect to the subcarrier spacing of the PDCCH. For example, if the UE receives the DCI indicating a bandwidth part change in slot n, and the slot offset value indicated in the DCI is K0, the UE may receive data on the PDSCH scheduled in slot n+K0.

[SRS Related]

Next, an uplink channel estimation method using the UE's sounding reference signal (SRS) is described. The base station may configure the UE with at least one SRS configuration for each uplink BWP to transfer configuration information for SRS transmission and may configure the UE with at least one SRS resource set for each SRS configuration. As an example, the base station and the UE may exchange the following higher signaling information to transfer information regarding the SRS resource set.

- srs-ResourceSetId: SRS resource set index
- srs-ResourceIdList: A set of SRS resource indexes referenced by SRS resource set
- resourceType: A time-axis transmission configuration of the SRS resource referenced by SRS resource set. This may be set to one of 'periodic', 'semi-persistent', and 'aperiodic'. When set to 'periodic' or 'semi-persistent,' associated CSI-RS information may be provided depending on the use of the SRS resource set. If set to 'aperiodic', aperiodic SRS resource trigger list and slot offset information may be provided, and associated CSI-RS information may be provided depending on the use of the SRS resource set.

usage: A configuration for the use of the SRS resource referenced by the SRS resource set and may be set to one of 'beamManagement,' 'codebook,' 'nonCodebook,' and 'antennaSwitching.' alpha, p0, pathlossReferenceRS, srs-PowerControlAdjustmentStates: This provides a parameter configuration for adjusting the transmit power of the SRS resource referenced by the SRS resource set.

The UE may understand that the SRS resource included in the set of SRS resource indexes referenced by the SRS resource set follows the information configured in the SRS resource set.

Further, the base station and the UE may transmit/receive higher layer signaling information to transfer individual configuration information for the SRS resource. As an example, the individual configuration information for the SRS resource may include time-frequency axis mapping information in the slot of the SRS resource, which may include information for frequency hopping within or between slots of the SRS resource. Further, the individual configuration information for the SRS resource may include the time axis transmission configuration of the SRS resource and may be set to one of 'periodic', 'semi-persistent', and 'aperiodic'. This may pose a limitation to have the same time axis transmission configuration as the SRS resource set including the SRS resource. If the time axis transmission configuration of the SRS resource is set to 'periodic' or 'semi-persistent,' the SRS resource transmission period and slot offset (e.g., periodicityAndOffset) may be additionally included in the time axis transmission configuration.

The base station may trigger activation or deactivation for SRS transmission to the UE through RRC signaling or higher layer signaling including MAC CE signaling, or L1 signaling (e.g., DCI). For example, the base station may activate or deactivate periodic SRS transmission through higher layer signaling to the UE. The base station may instruct to activate the SRS resource set in which the resourceType is set to periodic through higher layer signaling, and the UE may transmit the SRS resource referenced by the activated SRS resource set. The time-frequency axis resource mapping in the slot of the transmitted SRS resource follows the resource mapping information configured in the SRS resource, and the slot mapping including the transmission period and the slot offset follows the periodicityAndOffset configured in the SRS resource. Further, the spatial domain transmission filter applied to the transmitted SRS resource may reference the spatial relation info configured in the SRS resource or may reference the associated CSI-RS information configured in the SRS resource set including the SRS resource. The UE may transmit the SRS resource within the uplink BWP activated for the periodic SRS resource activated through higher layer signaling.

For example, the base station may activate or deactivate semi-persistent SRS transmission through higher layer signaling to the UE. The base station may instruct to activate the SRS resource set through MAC CE signaling, and the UE may transmit the SRS resource referenced by the activated SRS resource set. The SRS resource set activated through MAC CE signaling may be limited to the SRS resource set in which the resourceType is set to semi-persistent. The time-frequency axis resource mapping in the slot of the transmitted SRS resource follows the resource mapping information configured in the SRS resource, and the slot mapping including the transmission period and the slot offset follows the periodicity AndOffset configured in the SRS resource. Further, the spatial domain transmission filter applied to the transmitted SRS resource may reference the spatial relation info configured in the SRS resource or may reference the associated CSI-RS information configured in the SRS resource set including the SRS resource. If spatial relation info is configured in the SRS resource, rather than following it, the configuration information for the spatial relation info transferred through MAC CE signaling, which activates the semi-persistent SRS transmission, may be referenced to determine the spatial domain transmission filter. The UE may transmit the SRS resource within the uplink BWP activated for the semi-persistent SRS resource activated through higher layer signaling.

For example, the base station may trigger the aperiodic SRS transmission through DCI to the UE. The base station may indicate one of aperiodic SRS resource triggers (aperiodicSRS-ResourceTrigger) through the SRS request field of DCI. The UE may understand that the SRS resource set including the aperiodic SRS resource trigger indicated through the DCI in the aperiodic SRS resource trigger list among the configuration information of the SRS resource set has been triggered. The UE may transmit the SRS resource referenced by the triggered SRS resource set. The time-frequency axis resource mapping in the slot of the transmitted SRS resource follows the resource mapping information configured in the SRS resource. Further, the slot mapping of the transmitted SRS resource may be determined through a slot offset between the PDCCH including DCI and the SRS resource, and it may reference the value(s) included in the slot offset set configured in the SRS resource set. Specifically, as the slot offset between the PDCCH including DCI and the SRS resource, the value indicated by the time domain resource assignment field of DCI among the offset value(s) included in the slot offset set configured in the SRS resource set may be applied. Further, the spatial domain transmission filter applied to the transmitted SRS resource may reference the spatial relation info configured in the SRS resource or may reference the associated CSI-RS information configured in the SRS resource set including the SRS resource. The UE may transmit an SRS resource within the uplink BWP activated for aperiodic SRS resource triggered through DCI.

When the base station triggers aperiodic SRS transmission to the UE through DCI, the UE may require a minimum time interval between the transmitted SRS and the PDCCH including the DCI triggering the aperiodic SRS transmission so as to apply the configuration information for the SRS resource and transmit the SRS. The time interval for SRS transmission of the UE may be defined as the number of symbols between the last symbol of the PDCCH including the DCI triggering aperiodic SRS transmission and the first symbol mapped with the first SRS resource transmitted among the transmitted SRS resource(s). The minimum time interval may be determined with reference to PUSCH preparation procedure time required for UE to prepare PUSCH transmission. Further, the minimum time interval may have a different value depending on the use of the SRS resource set including the transmitted SRS resource. For example, the minimum time interval may be determined as N2 symbols defined considering the UE processing capability according to the UE capability by referring to the UE's PUSCH preparation procedure time. Further, when the use of the SRS resource set is set to 'codebook' or 'antennaSwitching' considering the use of the SRS resource set including the transmitted SRS resource, the minimum time interval may be determined as N2 and, when the use of SRS resource set is set to 'nonCodebook' or 'beamManagement,' the minimum time interval may be determined as $N_2$+14 symbols. The UE may transmit aperiodic SRS when the time interval for aperiodic SRS transmission is larger than or equal to the minimum time interval and May disregard DCI triggering aperiodic SRS when the time interval for aperiodic SRS transmission is smaller than the minimum time interval.

TABLE 25a

```
SRS-Resource ::=                SEQUENCE {
  srs-ResourceId                  SRS-ResourceId,
  nrofSRS-Ports                   ENUMERATED {port1, ports2, ports4},
  ptrs-PortIndex                  ENUMERATED {n0, n1 }
OPTIONAL, -- Need R
  transmissionComb                CHOICE {
    n2                              SEQUENCE {
      combOffset-n2                   INTEGER (0..1),
      cyclicShift-n2                  INTEGER (0..7)
    },
    n4                              SEQUENCE {
      combOffset-n4                   INTEGER (0..3),
      cyclicShift-n4                  INTEGER (0..11)
    }
  },
  resourceMapping                 SEQUENCE {
    startPosition                   INTEGER (0..5),
    nrofSymbols                     ENUMERATED {n1, n2, n4},
    repetitionFactor                ENUMERATED {n1, n2, n4}
  },
  freqDomainPosition              INTEGER (0..67),
  freqDomainShift                 INTEGER (0..268),
  freqHopping                     SEQUENCE {
    c-SRS                           INTEGER (0..63),
    b-SRS                           INTEGER (0..3),
    b-hop                           INTEGER (0..3)
  },
  groupOrSequenceHopping          ENUMERATED { neither, groupHop-
                                ping,
sequenceHopping },
  resourceType                    CHOICE {
    aperiodic                       SEQUENCE {
      ...
    },
    semi-persistent                 SEQUENCE {
      periodicityAndOffset-sp         SRS-PeriodicityAndOffset,
      ...
    },
    periodic                        SEQUENCE {
```

TABLE 25b

```
      periodicityAndOffset-p          SRS-PeriodicityAndOffset,
      . . .
    }
  },
  sequenceId                      INTEGER (0..1023),
  spatialRelationInfo             SRS-SpatialRelationInfo
OPTIONAL,   -- Need R
  . . .
}
```

The spatialRelationInfo configuration information in Tables 25a and 25b is applied to the beam used for SRS transmission corresponding to the beam information about the corresponding reference signal by referring to one reference signal. For example, the configuration of spatialRelationInfo may include information such as those shown in Table 26 below.

TABLE 26

```
SRS-SpatialRelationInfo ::=  SEQUENCE {
  servingCellId                ServCefile  OPTIONAL,   -- Need S
  referenceSignal              CHOICE {
    ssb-Index                    SSB-Index,
```

TABLE 26-continued

```
    csi-RS-Index                 NZP-CSI-RS-ResourceId,
    srs                          SEQUENCE {
      resourceId                   SRS-ResourceId,
      uplinkBMP                    BWP-Id
    }
  }
}
```

Referring to the spatialRelationInfo configuration, the SS/PBCH block index, CSI-RS index, or SRS index may be set as reference signal index to be referenced for use of the beam information about a specific reference signal. The higher layer signaling referenceSignal is configuration information indicating which reference signal of beam information is to be referenced for corresponding SRS transmission, and ssb-Index, csi-RS-Index, and srs refer to the index of the SS/PBCH block, the index of the CSI-RS, and the index of the SRS, respectively. If the value of the higher layer signaling referenceSignal is set to 'ssb-Index,' the UE may apply the reception beam which has been used for reception of the SS/PBCH block corresponding to the ssb-Index, as the transmission beam of corresponding SRS transmission. If the value of the higher layer signaling referenceSignal is set to 'csi-RS-Index,' the UE may apply the reception beam which has been used for reception of the CSI-RS corresponding to the csi-RS-Index, as the transmission beam of corresponding SRS transmission. If the value of the higher layer signaling referenceSignal is set to 'srs,' the UE may apply the transmission beam which has been used for transmission of the SRS corresponding to the srs, as the transmission beam of corresponding SRS transmission.

[PUSCH: Transmission Scheme Related]

Next, a scheduling method for PUSCH transmission is described. PUSCH transmission may be dynamically scheduled by UL grant in DCI or operated by configured grant type 1 or type 2. Dynamic scheduling indication for PUSCH transmission is available in DCI format 0_0 or 0_1.

Configured grant Type 1 PUSCH transmission may be semi-statically configured through reception of configuredGrantConfig including rrc-ConfiguredUplinkGrant of Table 27 through higher layer signaling without reception of the UL grant in the DCI. Configured grant Type 2 PUSCH transmission may be semi-persistently scheduled by the UL grant in the DCI after receiving the configuredGrantConfig that does not include rrc-ConfiguredUplinkGrant of Table 27 through higher layer signaling. When PUSCH transmission is operated by the configured grant, the parameters applied to PUSCH transmission are applied through configuredGrantConfig which is the higher layer signaling of Tables 27a and 27b except for the dataScramblingIdentity-PUSCH, txConfig, codebookSubset, maxRank, and scaling of UCI-OnPUSCH which are provided through the pusch-Config of Table 28 below which is higher layer signaling. If the UE receives transformPrecoder through configuredGrantConfig, which is higher layer signaling of Table 24, the UE applies tp-pi2BPSK in push-Config of Table 28 for. PUSCH transmission operated by the configured grant.

TABLE 27a

```
ConfiguredGrantConfig ::=          SEQUENCE {
   frequencyHopping                  ENUMERATED {intraSlot, interSlot}
OPTIONAL, -- Need S
   cg-DMRS-Configuration             DMRS-UplinkConfig,
   mcs-Table                         ENUMERATED {qam256, qam64LowSE}
OPTIONAL, -- Need S
   mcs-TableTransformPrecoder        ENUMERATED {qam256, qam64LowSE}
OPTIONAL, -- Need S
   uci-OnPUSCH                       SetupRelease { CG-UCI-OnPUSCH }
OPTIONAL, -- Need M
   resourceAllocation                ENUMERATED { resourceAllocationType0,
resourceAllocationType1, dynamicSwitch },
   rbg-Size                          ENUMERATED {config2}
OPTIONAL, -- Need S
   powerControlLoopToUse             ENUMERATED {n0, n1},
   p0-PUSCH-Alpha                    P0-PUSCH-AlphaSetId,
   transformPrecoder                 ENUMERATED {enabled, disabled}
OPTIONAL, -- Need S
   nrofHARQ-Processes                INTEGER (1..16),
   repK                              ENUMERATED {n1, n2, n4, n8},
   repK-RV                           ENUMERATED {s1-0231, s2-0303, s3-0000}
OPTIONAL, -- Need R
periodicity                        ENUMERATED {
                                         sym2, sym7, sym1x14, sym2x14, sym4x14,
sym5x14, sym8x14, sym10x14, sym16x14, sym20x14,
                                         sym32x14, sym40x14, sym64x14, sym80x14,
sym128x14, sym160x14, sym256x14, sym320x14, sym512x14,
                                         sym640x14, sym1024x14, sym1280x14,
sym2560x14, sym5120x14,
                                         sym6, sym1x12, sym2x12, sym4x12,
sym5x12, sym8x12, sym10x12, sym16x12, sym20x12, sym32x12,
                                         sym40x12, sym64x12, sym80x12,
sym128x12, sym160x12, sym256x12, sym320x12, sym512x12, sym640x12,
                                         sym1280x12, sym2560x12
   },
   configuredGrantTimer                 INTEGER (1..64)
OPTIONAL, -- Need R
   rrc-ConfiguredUplinkGrant            SEQUENCE {
```

TABLE 27b

```
      timeDomainOffset               INTEGER (0..5119),
      timeDomainAllocation           INTEGER (0..15),
      frequencyDomainAllocation      BIT STRING (SIZE(18).
      antennaPart                    INTEGER (0..31),
      dmrs-SeqInitialization         INTEGER (0..1)
OPTIONAL,   -- Need R
      precodingAndNumberOfLayers     INTEGER (0..63),
      srs-ResourceIndicator          INTEGER (0..15)
OPTIONAL,   -- Need R
      mcsAndTBS                      INTEGER (0..31),
      frequencyHoppingOffset         INTEGER (1..
maxNrofPhysicalResourceBlocks-1)       OPTIONAL,   -- Need R
      pathlossReferenceIndex         INTEGER (0..maxNrofPUSCH-
PathlossReferenceRSs-1),
      . . .
   }
OPTIONAL,   -- Need R
   . . .
}
```

Next, a PUSCH transmission method is described. The DMRS antenna port for PUSCH transmission is the same as the antenna port for SRS transmission. PUSCH transmission may follow a codebook-based transmission method and a non-codebook-based transmission method, respectively, depending on whether the value of txConfig in push-Config of Table 28 below, which is higher layer signaling, is 'codebook' or 'nonCodebook'.

As described above, PUSCH transmission may be dynamically scheduled through DCI format 0_0 or 0_1 or be semi-statically configured by the configured grant. If the UE receives an instruction of scheduling on PUSCH transmission through DCI format 0_0, the UE performs beam configuration for PUSCH transmission using pucch-spatialRelationInfoID corresponding to the UE-specific PUCCH resource corresponding to the minimum ID in the uplink BWP activated in the serving cell and, in this case, the PUSCH transmission is based on a single antenna port. The UE does not expect scheduling for PUSCH transmission through DCI format 0_0 in a BWP in which PUCCH resource including pucch-spatialRelationInfo is not configured. If the UE has not had txConfig in push-Config of Tables 28a and 28b configured thereto, the UE does not expect to be scheduled through DCI format 0_1.

TABLE 28a

```
PUSCH-Config ::=                          SEQUENCE {
   dataScramblingIdentityPUSCH               INTEGER (0..1023)
OPTIONAL, -- Need S
   txConfig                                  ENUMERATED {codebook, nonCodebook}
OPTIONAL, -- Need S
   dmrs-UplinkForPUSCH-MappingTypeA          SetupRelease { DMRS-UplinkConfig }
OPTIONAL, -- Need M
   dmrs-UplinkForPUSCH-MappingTypeB          SetupRelease { DMRS-UplinkConfig }
OPTIONAL, -- Need M
```

TABLE 28a-continued

| | |
|---|---|
| pusch-PowerControl OPTIONAL, -- Need M | PUSCH-PowerControl |
| frequencyHopping OPTIONAL, -- Need S | ENUMERATED {intraSlot, interSlot} |
| frequencyHoppingOffsetLists maxNrofPhysicalResourceBlocks−1) OPTIONAL, -- Need M | SEQUENCE (SIZE (1..4)) OF INTEGER (1.. |
| resourceAllocation resourceAllocationType1, dynamicSwitch}, | ENUMERATED { resourceAllocationType0, |
| pusch-TimeDomainAllocationList TimeDomainResourceAllocationList } OPTIONAL, -- Need S | SetupRelease { PUSCH- OPTIONAL, -- Need M |
| pusch-AggregationFactor OPTIONAL, -- Need S | ENUMERATED { n2, n4, n8 } |
| mcs-Table | ENUMERATED {qam256, qam64LowSE} |
| mcs-TableTransformPrecoder OPTIONAL, -- Need S | ENUMERATED {qam256, qam64LowSE} |
| transformPrecoder OPTIONAL, -- Need S | ENUMERATED {enabled, disabled} |
| codebookSubset {fullyAndPartialAndNonCoherent, partialAndNonCoherent.nonCoherent} OPTIONAL, -- Cond codebookBased | ENUMERATED |
| maxRank OPTIONAL, -- Cond codebookBased | INTEGER (1..4) |
| rbg-Size OPTIONAL, -- Need S | ENUMERATED { config2} |

TABLE 28b

| | |
|---|---|
| uci-OnPUSCH OPTIONAL, -- Need M | SetupRelease { UCI-OnPUSCH} |
| tp-pi2BPSK OPTIONAL, -- Need S | ENUMERATED {enabled} |
| . . . | |
| } | |

Next, codebook-based PUSCH transmission is described. Codebook-based PUSCH transmission may be dynamically operated through DCI format 0_0 or 0_1 or be semi-statically configured by the configured grant. if dynamically scheduled by codebook-based PUSCH DCI format 0_1 or semi-statically configured by configured grant, the UE determines a precoder for PUSCH transmission based on the SRS resource indicator (SRI), transmission precoding matrix indicator (TPMI), and transmission rank (number of PUSCH transmission layers).

In this case, the SRI may be given through a field SRS resource indicator in the DCI or configured through srs-ResourceIndicator which is higher layer signaling. The UE may have at least one SRS resource, up to two SRS resources, configured thereto upon codebook-based PUSCH transmission. When the UE receives the SRI through the DCI, the SRS resource indicated by the corresponding SRI means the SRS resource corresponding to the SRI among SRS resources transmitted prior to the PDCCH including the SRI. Further, the TPMI and transmission rank may be given through the field precoding information and number of layers in the DCI or configured through precodingAndNumberOfLayers, which is higher layer signaling. The TPMI is used to indicate the precoder applied to PUSCH transmission. If the UE is configured with one SRS resource, the TPMI is used to indicate a precoder to be applied in the configured one SRS resource. If the UE is configured with a plurality of SRS resources, the TPMI is used to indicate a precoder to be applied in the SRS resource indicated through the SRI.

The precoder to be used for PUSCH transmission is selected from an uplink codebook having the same number of antenna ports as the nrofSRS-Ports value in SRS-Config, which is higher layer signaling. In codebook-based PUSCH transmission, the UE determines a codebook subset based on the TPMI and codebookSubset in push-Config, which is higher layer signaling. codebookSubset in push-Config, which is higher layer signaling, may be set to one of 'fullyAndPartialAndNonCoherent', 'partialAndNonCoherent', or 'nonCoherent' based on the UE capability reported by the UE to the base station. If the UE reports 'partialAndNonCoherent' as the UE capability, the UE does not expect the value of codebookSubset, which is higher layer signaling, to be set to 'fullyAndPartialAndNonCoherent'. Further, if the UE reports 'nonCoherent' as the UE capability, the UE does not expect the value of codebookSubset, which is higher signaling, to be set to 'fullyAndPartialAndNonCoherent' or 'partialAndNonCoherent'. If nrofSRS-Ports in SRS-ResourceSet, which is higher layer signaling, indicates two SRS antenna ports, the UE does not expect the value of codebookSubset, which is higher layer signaling, to be set to 'partialAndNonCoherent'.

The UE may have one SRS resource set, in which the value of usage in SRS-ResourceSet, which is higher layer signaling, is set to 'codebook,' configured thereto, and one SRS resource in the corresponding SRS resource set may be indicated through the SRI. If several SRS resources are configured in the SRS resource set in which the usage value in the SRS-ResourceSet, which is higher layer signaling, is set to 'codebook', the UE expects the same value to be set for all SRS resources in the nrofSRS-Ports value in the SRS-Resource which is higher signaling.

The UE may transmit one or more SRS resources included in the SRS resource set in which the value of usage is set to 'codebook' according to higher layer signaling to the base station, and the base station selects one of the SRS resources transmitted by the UE and instructs the UE to perform PUSCH transmission using transmission beam information about the corresponding SRS resource. In this case, in codebook-based PUSCH transmission, the SRI is used as information for selecting an index of one SRS resource and is included in the DCI. Additionally, the base station includes information indicating the TPMI and rank to be used by the UE for PUSCH transmission in the DCI. The UE performs PUSCH transmission by applying the precoder indicated by the rank and TPMI indicated by the transmission beam of the SRS resource using the SRS resource indicated by the SRI.

Next, non-codebook-based PUSCH transmission is described. Non-codebook-based PUSCH transmission may be dynamically operated through DCI format 0_0 or 0_1 or be semi-statically configured by the configured grant. When at least one SRS resource is configured in the SRS resource set in which the value of usage in the SRS-ResourceSet, which is higher signaling, is set to 'nonCodebook', the UE may be scheduled for non-codebook based PUSCH transmission through DCI format 0_1.

For the SRS resource set in which the value of usage in the SRS-ResourceSet, which is higher layer signaling, is set to 'nonCodebook', the UE may be configured with one connected non-zero-power (NZP) CSI-RS resource (non-zero power CSI-RS). The UE may perform calculation on the precoder for SRS transmission through measurement of the NZP CSI-RS resource connected with the SRS resource set. If the difference between the last received symbol of the aperiodic NZP CSI-RS resource connected with the SRS resource set and the first symbol of aperiodic SRS transmission in the UE is smaller than 42 symbols, the UE does not expect that information about the precoder for SRS transmission is updated.

If the value of resourceType in SRS-ResourceSet, which is higher signaling, is set to 'aperiodic', the connected NZP CSI-RS may be indicated by an SRS request, which is a field in DCI format 0_1 or 1_1. In this case, if the connected NZP CSI-RS resource is an aperiodic NZP CSI resource, it indicates that there is a connected NZP CSI-RS for the case where the value of the field SRS request in DCI format 0_1 or 1_1 is not '00.' In this case, the DCI should not indicate cross carrier or cross BWP scheduling. Further, if the value of the SRS request indicates the presence of the NZP CSI-RS, the NZP CSI-RS is positioned in the slot in which the PDCCH including the SRS request field is transmitted. In this case, the TCI states configured for the scheduled subcarriers are not set to QCL-typeD.

If a periodic or semi-persistent SRS resource set is configured, the connected NZP CSI-RS may be indicated through associated CSI-RS in the SRS-ResourceSet, which is higher layer signaling. For non-codebook-based transmission, the UE does not expect spatialRelationInfo, which is higher signaling for SRS resource, and associated CSI-RS in SRS-ResourceSet, which is higher layer signaling, to be configured together.

When a plurality of SRS resources are configured to the UE, the UE may determine the precoder and transmission rank to be applied to PUSCH transmission based on the SRI indicated by the base station. In this case, the SRI may be indicated through a field SRS resource indicator in the DCI or be configured through srs-ResourceIndicator which is higher signaling. Like the above-described codebook-based PUSCH transmission, when the UE receives the SRI through the DCI, the SRS resource indicated by the corresponding SRI means the SRS resource corresponding to the SRI among SRS resources transmitted prior to the PDCCH including the SRI. The UE may use one or more SRS resources for SRS transmission. The maximum number of SRS resources and the maximum number of SRS resources that may be simultaneously transmitted in the same symbol within one SRS resource set are determined by the UE capability reported by the UE to the base station. In this case, SRS resources transmitted simultaneously by the UE occupy the same RB. The UE configures one SRS port for each SRS resource. Only one SRS resource set in which the value of usage in the SRS-ResourceSet, which is higher signaling, is set to 'nonCodebook' may be configured, and up to 4 SRS resources are configured for non-codebook-based PUSCH transmission.

The base station transmits one NZP CSI-RS connected with the SRS resource set to the UE, and the UE calculates the precoder to be used for transmission of one or more SRS resources in the SRS resource set based on the measurement result upon NZP CSI-RS reception. The UE may apply the calculated precoder when transmitting one or more SRS resources in the SRS resource set with usage set to 'nonCodebook' to the base station, and the base station selects one or more SRS resources among one or more SRS resources received. In this case, in non-codebook based PUSCH transmission, the SRI indicates an index that may represent a combination of one or a plurality of SRS resources, and the SRI is included in the DCI. In this case, the number of SRS resources indicated by the SRI transmitted by the base station may be the number of transmission layers of the PUSCH. The UE applies the precoder applied to SRS resource transmission to each layer and transmits the PUSCH.

[PUSCH: Preparation Procedure Time]

Next, the PUSCH preparation procedure time is described. When the base station schedules the UE to transmit the PUSCH using DCI format 0_0, 0_1, or 0_2, the UE may require a PUSCH preparation procedure time to apply the transmission precoding method, number of transmission layers, and spatial domain transmission filter to the transmission method (SRS resource) indicated through the DCI and transmit the PUSCH. Given this, NR defines the PUSCH preparation procedure time. The PUSCH preparation procedure time of the UE may follow Equation 2 below.

$$T_{proc,2}=\max((N_2+d_{2,1}+d_2)(2048+144)^{K}2^{-\mu}T_c+T_{ext}+T_{switch},d_{2,2}) \quad \text{[Equation 2]}$$

In $T_{proc,2}$ of Equation 2 above, each variable may have the following meaning.

$N_2$: The number of symbols determined according to UE processing capability 1 or 2 and numerology μ according to the capabilities of the UE. When UE processing capability 1 is reported according to the UE capability report, it may have the value of Table 29 below. When UE processing capability 2 is reported, and it is set through higher layer signaling to be able to use UE processing capability 2, it may have the value of Table 30.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: The number of symbols set to 0 if all of the resource elements of the first OFDM symbol of the PUSCH transmission are configured to consist only of DM-RS, and 1 otherwise.

k: 64

μ: Of $\mu_{DL}$ or $\mu_{UL}$, this follows the value where $T_{proc,2}$ is bigger. PDL means the numerology of the downlink where the PDCCH including the DCI scheduling PUSCH is transmitted, and HUL means the numerology of the uplink where the PUSCH is transmitted.

$T_c$: This has $1/(\Delta f_{max} \cdot N_f)$, $\Delta f_{max}=480 \cdot 10^5$ Hz, $N_f=4096$.

$d_{2,2}$: This follows the BWP switching time when the DCI scheduling PUSCH indicates BWP switching and, otherwise, is 0.

$d_2$: When the PUCCH overlaps, in OFDM symbols on the time axis, the PUSCH having a high priority index and the PUCCH having a low priority index, the $d_2$ value of the PUSCH having a high priority index is used: Otherwise, $d_2$ is 0.

$T_{ext}$: When the UE uses a shared spectrum channel access scheme, the UE may calculate $T_{ext}$ and apply it to the PUSCH preparation procedure time. Otherwise, $T_{ext}$ is assumed to be 0.

$T_{switch}$: When uplink switching interval is triggered, $T_{switch}$ is assumed to be the switching interval time. Otherwise, it is assumed to be 0.

Considering the time axis resource mapping information for the PUSCH scheduled through DCI and the effect of the timing advance between uplink and downlink, if the first symbol of the PUSCH starts before the first uplink symbol for which the CP starts $T_{proc,2}$ after the last symbol of the PDCCH including the DCI scheduling the PUSCH, the base station and the UE determine that the PUSCH preparation procedure time is not sufficient. Otherwise, the base station and the UE determine that the PUSCH preparation procedure time is sufficient. The UE may transmit the PUSCH only when the PUSCH preparation procedure time is sufficient and may disregard DCI scheduling PUSCH when the PUSCH preparation procedure time is not sufficient.

[PUSCH: Repeated Transmission Related]

Repeated transmission of an uplink data channel in a 5G system is described below in detail. The 5G system supports two types, PUSCH repeated transmission type A and PUSCH repeated transmission type B, as repeated transmission methods of an uplink data channel. The UE may have either PUSCH repeated transmission type A or B configured thereto by higher layer signaling.

PUSCH Repeated Transmission Type A

As described above, by the time domain resource allocation method in one slot, the symbol length and start symbol position of the uplink data channel may be transmitted, and the base station may notify the UE of the number of repeated transmissions through higher layer signaling (e.g., RRC signaling) or L1 signaling (e.g., DCI).

The UE may repeatedly transmit uplink data channels, which are identical in length and start symbol to the configured uplink data channel, in consecutive slots based on the number of repeated transmissions received from the base station. In this case, when at least one symbol among the symbols of the uplink data channel configured to the UE or the slot configured to the UE through downlink by the base station is configured through downlink, the UE omits uplink data channel transmission but counts the number of uplink data channel repeated transmissions.

PUSCH Repeated Transmission Type B

As described above, as the time domain resource allocation method in one slot, the start symbol and length of the uplink data channel may be transmitted, and the base station may notify the UE of the number of repeated transmissions, numberofrepetitions, through higher layer signaling (e.g., RRC signaling) or L1 signaling (e.g., DCI).

First, the nominal repetition of the uplink data channel is determined as follows based on the start symbol and length of the uplink data channel configured above. The slot where the nth nominal repetition starts is given by $$K_s + \left\lfloor \left( \frac{S + n \cdot L}{N_{symb}^{slot}} \right) \right\rfloor,$$

and the symbol which starts in the slot is given by $$\mathrm{mod}\left(S + n \cdot L, N_{slot}^{symb}\right).$$

The slot where the nth nominal repetition starts is given by $$K_s + \left\lfloor \left( \frac{S + (n+1) \cdot L - 1}{N_{symb}^{slot}} \right) \right\rfloor,$$

and the symbol which ends in the slot is given by $$\mathrm{mod}\left(S + (n+1) \cdot L - 1, N_{slot}^{symb}\right).$$

Here, n=0, . . . , numberofrepetitions−1, S indicates the start symbol of the configured uplink data channel, and L indicates the symbol length of the configured uplink data channel. $K_s$ indicates the slot where PUSCH transmission starts, and $$N_{slot}^{symb}$$

indicates the number of symbols per slot.

The UE determines an invalid symbol for PUSCH repeated transmission type B. The symbol configured. through downlink by tdd-UL-DL-ConfigurationCommon or tdd-UL-DL-ConfigurationDedicated is determined to be an invalid symbol for PUSCH repeated transmission type B. Additionally, invalid symbols may be configured in higher layer parameters (e.g., InvalidSymbolPattern). As the higher layer parameter (e.g., InvalidSymbolPattern) provides a symbol level bitmap over one or two slots, an invalid symbol may be configured. 1 in the bitmap represents an invalid symbol. Additionally, the periodicity and pattern of the bitmap may be configured through the higher layer parameter (e.g., periodicityAndPattern). If the higher layer parameter (e.g., InvalidSymbolPattern) is configured, and InvalidSymbolPatternIndicator-ForDCIFormat0_1 or InvalidSymbolPatternIndicator-ForDCIFormat0_2 parameter indicates 1, the UE applies the invalid symbol pattern and, if it indicates 0, the UE does not apply the invalid symbol pattern. If the higher layer parameter (e.g., InvalidSymbolPattern) is configured, and InvalidSymbolPatternIndicator-ForDCIFormat0_1 or InvalidSymbolPatternIndicator-ForDCIFormat0_2 parameter is not configured, the UE applies the invalid symbol pattern.

After the invalid symbol is determined, for each nominal repetition, the UE may consider symbols other than the invalid symbol as valid symbols. If each nominal repetition includes one or more valid symbols, the nominal repetition may include one or more actual repetitions. Here, each actual repetition includes a contiguous set of valid symbols that may be used for PUSCH repeated transmission type B in one slot.

Figure 15:
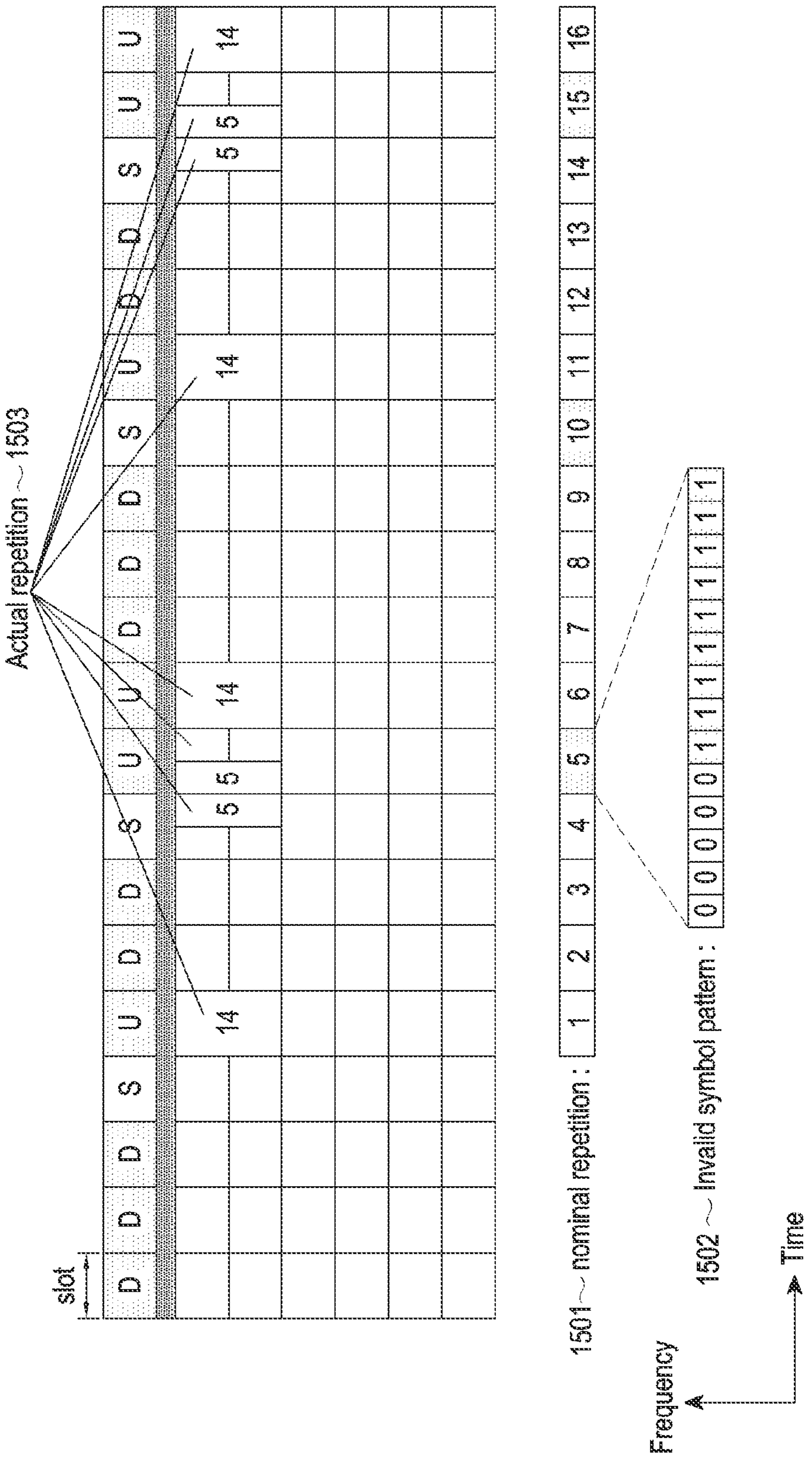
FIG. 15 is a view illustrating an example of PUSCH repeated transmission type B in a wireless communication system according to an embodiment of the disclosure.

FIG. 15 is a view illustrating an example of PUSCH repeated transmission type B in a wireless communication system according to an embodiment of the disclosure.

Referring to the example of FIG. 15, the UE may have the start symbol set to 0 and the uplink data channel length L set to 14 and may have the number of repeated transmissions set to 16. In this case, nominal repetition is indicated in 16 contiguous slots (1501). Thereafter, the UE may determine symbols set as downlink symbols in each nominal repetition 1501 as invalid symbols. Further, the UE determines symbols set to 1 in the invalid symbol pattern 1502 as invalid symbols. In each nominal repetition, when valid symbols, not invalid symbols, are constituted of one or more contiguous symbols in one slot, they are set as actual repetitions and transmitted (1503).

Further, for repeated PUSCH transmission, NR Release 16 may define the following additional methods for UL grant-based PUSCH transmission and configured grant-based PUSCH transmission across slot boundaries.

- Method 1 (mini-slot level repetition): Through one UL grant, two or more PUSCH repeated transmissions are scheduled within one slot or across the boundary of contiguous slots. Further, for method 1, time domain resource allocation information in DCI indicates resources of the first repeated transmission. Further, the time domain resource information of the remaining repeated transmissions may be determined according to the uplink or downlink direction that is determined for each symbol in each slot and the time domain resource information of the first repeated transmission. Each repeated transmission occupies contiguous symbols.
- Method 2 (multi-segment transmission): Two or more repeated PUSCH transmissions are scheduled in contiguous slots through one UL grant. In this case, one transmission is designated for each slot, and the start point or repetition length may differ for each transmission. Further, in method 2, time domain resource allocation information in DCI indicates the start point and repetition length of all repeated transmissions. Further, when repeated transmission is performed within a single slot through method 2, if there are several bundles of contiguous symbols in the corresponding slot, each repeated transmission is performed for each uplink symbol bundle. If a unique bundle of contiguous uplink symbols is present in the corresponding slot, one PUSCH repeated transmission is performed according to the method of NR release 15.
- Method 3: Two or more repeated PUSCH transmissions are scheduled in contiguous slots through two or more UL grants. In this case, one transmission is designated for each slot, and the nth UL grant may be received before the PUSCH transmission scheduled by the n−1th UL grant is ended.
- Method 4: Through one UL grant or one configured grant, one or more PUSCH repeated transmissions in a single slot or two or more PUSCH repeated transmissions over the boundary of consecutive slots may be supported. The number of repetitions indicated by the base station to the UE is only a nominal value, and the number of repeated PUSCH transmissions actually performed by the UE may be larger than the nominal number of repetitions. The time domain resource allocation information in DCI or configured grant means the resource of the first repeated transmission indicated by the base station. The time domain resource information about the remaining repeated transmissions may be determined by referring to the uplink or downlink direction of symbols and the resource information about at least the first repeated transmission. If the time domain resource information about the repeated transmission indicated by the base station is over the slot boundary or includes the uplink/downlink switching point, the corresponding repeated transmission may be divided into a plurality of repeated transmissions. In this case, one repeated transmission may be included for each uplink period in one slot.

[PUSCH: Frequency Hopping Process]

Frequency hopping of the uplink data channel (physical uplink shared channel (PUSCH)) in the 5G system is described below in detail.

5G supports two methods supported for each PUSCH repeated transmission type, as a frequency hopping method for an uplink data channel. First, PUSCH repeated transmission type A supports intra-slot frequency hopping and inter-slot frequency hopping, and PUSCH repeated transmission type B supports inter-repetition frequency hopping and inter-slot frequency hopping.

The intra-slot frequency hopping method supported by PUSCH repeated transmission type A is a method in which the UE changes and transmits the allocated resources of the frequency domain by a set frequency offset in two hops within one slot. In intra-slot frequency hopping, the start RB of each hop may be expressed through Equation 3 below.

$$RB_{start} = \begin{cases} RB_{start} & i = 0 \\ (RB_{start} + RB_{offset}) \bmod N_{BWP}^{size} & i = 1 \end{cases} \quad \text{[Equation 3]}$$

In Equation 3, i=0 and i=1 represent the first hop and the second hop, respectively, and $RB_{start}$ denotes the start RB in the UL BWP and is calculated from the frequency resource allocation method. $RB_{offset}$ denotes the frequency offset between two hops through the higher layer parameter. The number of symbols in the first hop may be represented as $$\lfloor N_{symb}^{PUSCH,s}/2 \rfloor,$$

and the number of symbols in the second hop may be represented as $$N_{symb}^{PUSCH,s} - \lfloor N_{symb}^{PUSCH,s}/2 \rfloor \cdot N_{symb}^{PUSCH,s}$$

is the length of PUSCH transmission within one slot and is represented as the number of OFDM symbols.

Next, the inter-slot frequency hopping method supported by PUSCH repeated transmission types A and B is a method in which the UE changes and transmits the allocated resources of the frequency domain by a set frequency offset in each slot. In inter-slot frequency hopping, the start RB during $n_s^\mu$ slot may be expressed through Equation 4 below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 4]}$$

In Equation 4, $n_s^\mu$ denotes the current slot number in multi-slot PUSCH transmission, $RB_{start}$ t denotes the start RB in the UL BWP and is calculated from the frequency resource allocation method. $RB_{offset}$ denotes the frequency offset between two hops through the higher layer parameter.

Next, the inter-repetition frequency hopping method supported by PUSCH repeated transmission type B moves and transmits resources allocated in the frequency domain for one or more actual repetitions within each nominal repetition by a set frequency offset. $RB_{start}$ (n) that is the index of the start RB in the frequency domain for one or more actual repetitions within the nth nominal repetition may follow Equation 5 below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In Equation 5, n denotes the index of nominal repetition, and $RB_{offset}$ denotes the RB offset between two hops through a higher layer parameter.

[PUSCH Transmit Power Related]

A method for determining transmit power of an uplink data channel in the 5G system is described below in detail.

In the 5G system, transmit power of an uplink data channel may be determined through Equation 6 below.

[Equation 6]

$$P_{PUSCH,b,f,c}(i, j, q_d, l) = \min\begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{cases} \text{[dBm]}$$

In Equation 6, j means the grant type of PUSCH, and specifically, j=0 denotes the PUSCH grant for random access response, and j=1 denotes the configured grant, and $j \in \{2, 3, \ldots, J-1\}$ denotes the dynamic grant. $P_{CMAX,f,c}(i)$ means the maximum output power set in the UE for carrier f of supporting cell c for PUSCH transmission occasion i. $P_{O\_PUSCH,b,f,c}(j)$ is a parameter constituted of the sum of $P_{O\_NOMINAL\_PUSCH,f,c}(j)$ set as a higher layer parameter and $P_{O\_UE\_PUSCH,b,f,c}(j)$ that may be determined through a higher layer configuration and SRI (in the case of dynamic grant PUSCH).

$M_{RB,b,f,c}^{PUSCH}(i)$ means the bandwidth for the resource allocation represented as the number of resource blocks for PUSCH transmission occasion i, and $\Delta_{TF,b,f,c}(i)$ means a value determined according to, e.g., the type (e.g., whether UL-SCH is included or whether CSI is included) of information transmitted through the PUSCH and the modulation coding scheme (MCS). $\alpha_{b,f,c}(j)$ is a value for compensating for pathloss, and denotes a value that may be determined through higher layer configuration and an SRS resource indicator (SRI) (in the case of dynamic grant PUSCH). $PL_{b,f,c}(q_d)$ means the downlink pathloss value estimated by the UE through the reference signal whose reference signal index is $q_d$, and the reference signal index $q_d$, may be determined by the UE through a higher layer configuration or through the higher layer configuration or SRI (in the case of ConfiguredGrantConfig-based configured grant PUSCH (type 2 configured grant PUSCH) not including the higher layer configuration rrc-ConfiguredUplinkGrant or the dynamic grant PUSCH). $f_{b,f,c}(i,l)$ is a closed loop power adjustment value and may be supported by an accumulation scheme and an absolute scheme. If the higher layer parameter tpc-Accumulation is not configured in the UE, the closed loop power adjustment value may be determined by an accumulation scheme. In this case, $f_{b,f,c}(i,l)$ is determined as $$f_{b,f,c}(i - i_0, l) + \sum_{m=0}^{c(D_i)-1} \delta_{PUSCH,b,f,c}(m, l)$$

which is the sum of the TPC command values for closed loop index l received through DCI between the $K_{PUSCH}(i-i_0)-1$ symbol transmitting PUSCH transmission occasion $i-i_0$ and the $K_{PUSCH}(i)$ symbol transmitting PUSCH transmission occasion i and the closed loop power adjustment value for prior PUSCH transmission occasion $i-i_0$. If the higher layer parameter tpc-Accumulation is configured in the UE, $f_{b,f,c}(i,l)$ is determined as the TPC command value $\delta_{PUSCH,b,f,c}(i, l)$ for closed loop index l received through DCI. The closed loop index l may be set to 0 or 1 if the higher layer parameter twoPUSCH-PC-AdjustementStates is configured in the UE, and the value may be determined through higher layer configuration and SRI (in the case of dynamic grant PUSCH). The mapping relationship between the TPC command field in DCI and the TPC value $\delta_{PUSCH,b,f,c}(i, l)$ according to the accumulation scheme and the absolute scheme may be defined as in Table 31 below.

TABLE 31

| TPC command field | Accumulated $\delta_{PUSCH,b,f,c}$ [dB] | Absolute $\delta_{PUSCH,b,f,c}$ [dB] |
|---|---|---|
| 0 | −1 | −4 |
| 1 | 0 | −1 |
| 2 | 1 | 1 |
| 3 | 3 | 4 |

[Regarding UE Capability Report]

In the LTE and NR systems, the UE may perform a procedure for reporting the capability supported by the UE to the corresponding base station while connected to the serving base station. In the description below, this is referred to as a UE capability report.

The base station may transfer a UE capability enquiry message for requesting capability report to the UE in the connected state. The message may include a UE capability request for each radio access technology (RAT) type of the base station. The request for each RAT type may include supported frequency band combination information. Further, in the case of the UE capability enquiry message, the respective UE capabilities of the plurality of RAT types may be requested through one RRC message container, or the base station may include a plurality of UE capability enquiry messages containing the per-RAT type UE capability requests and transfer them to the UE. In other words, a plurality of UE capability enquiries may be repeated in one message, and the UE may configure a UE capability information message corresponding thereto and report it multiple times. In the next-generation mobile communication system, UE capability requests for multi-RAT dual connectivity (MR-DC) as well as NR, LTE, E-UTRA-NR dual connectivity (EN-DC) may be made. Further, although it is common that the UE capability enquiry message is transmitted at an early time after the UE is connected to the base station, it may also be requested under any condition when required by the base station.

Upon receiving a request for UE capability report from the base station, the UE configures UE capability according to the RAT type and band information requested from the base station. Examples of methods for the UE to configure UE capability in the NR system are summarized below.

If the UE is provided with a list of LTE and/or NR bands at the request for UE capability from the base station, the UE configures a band combination (BC) for EN-DC and NR stand alone (SA). In other words, the UE configures a BC candidate list for EN-DC and NR SA based on the bands requested to the base station through FreqBandlist. Band priorities may have priorities in the order listed in FreqBandlist.

If the base station sets "eutra-nr-only" flag or "eutra" flag in the UE capability enquiry message and requests UE capability report, the UE completely removes those for NR SA BCs from the configured BC candidate list. This operation may occur only when the LTE base station (eNB) requests "eutra" capability.

Then, the UE removes fallback BCs from the configured BC candidate list. Here, fallback BC means a BC that may be obtained by removing the band corresponding to at least one SCell from any BCs and, since the BC before removing the band corresponding to at least one SCell is able to cover the fallback BC, it may be omitted. This step applies to MR-DC, i.e., LTE bands also apply. The BCs remaining after this step are the final "candidate BC list."

The UE selects BCs fitting the requested RAT type in the final "candidate BC list" to select BCs to be reported. In this step, the UE configures the supportedBandCombinationlist in a predetermined order. In other words, the UE configures the BCs and UE capabilities to be reported according to the preset rat-Type order. (nr→eutra-nr→eutra). Further, the UE configures a featureSetCombination for the configured supportedBandCombinationList and configures a "candidate feature set combination" list in the candidate BC list where the list of fallback BCs (including the capability of the same or lower step) has been removed. The "candidate feature set combination" may include the whole feature set combination for NR and EUTRA-NR BC and be obtained from the feature set combination of the UE-MRDC-Capabilities container and the UE-NR-Capabilities.

Further, if the requested rat type is eutra-nr and has an effect, featureSetCombinations is included in both containers of UE-MRDC-Capabilities and UE-NR-Capabilities. However, the NR feature set includes only the UE-NR-Capabilities.

After the UE capability is configured, the UE transfers a UE capability information message including the UE capability to the base station. The base station performs appropriate scheduling and transmission/reception management on the UE based on the UE capability received from the UE.

[CA/DC Related]

Figure 16:
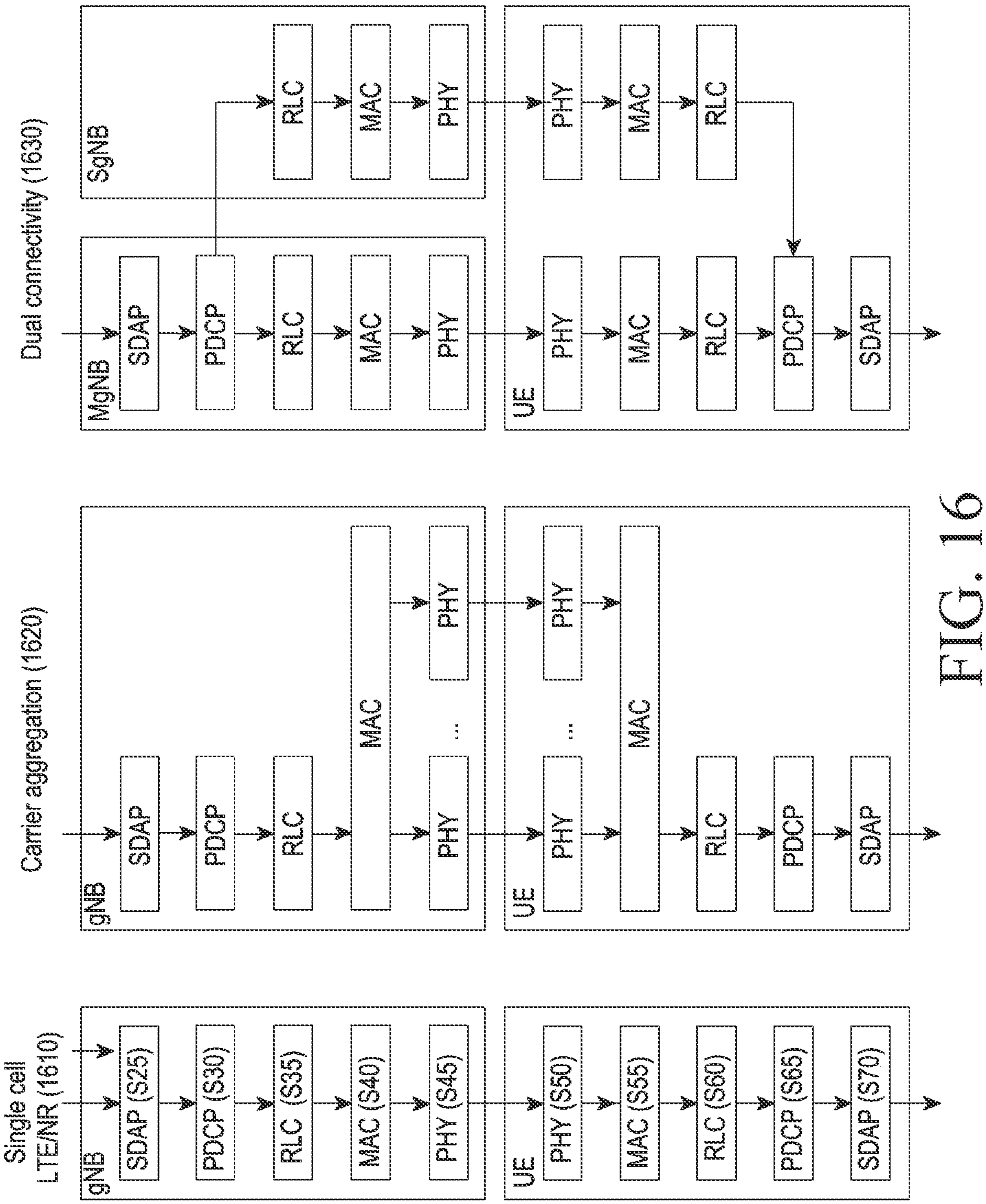
FIG. 16 is a view illustrating radio protocol structures of a base station and a UE in single cell, carrier aggregation, and dual connectivity situations in a wireless communication system according to an embodiment of the disclosure.

FIG. 16 is a view illustrating radio protocol structures of a base station and a UE in single cell 1610, carrier aggregation 1620, and dual connectivity 1630 situations according to an embodiment of the disclosure.

Referring to FIG. 16, the radio protocol of the next-generation wireless communication system includes an NR service data adaptation protocol (NR SDAP) S25 or S70, an NR packet data convergence protocol (NR PDCP) S30 or S65, an NR radio link control (NR RLC) S35 or S60, and an NR medium access control (NR MAC) S40 or S55 in each of the UE and the base station. In the following description, each layer device may be understood as a functional block in charge of the corresponding layer.

The main functions of the NR SDAPs S25 and S70 may include some of the following functions.

- Transfer of user plane data
- Mapping between a QoS flow and a DRB for both DL and UL
- marking QoS flow ID in both DL and UL packets
- reflective QoS flow to DRB mapping for the UL SDAP PDUs For the SDAP layer device, the UE may be set, via an RRC message, for whether to use the functions of the SDAP layer or the header of the SDAP layer device per PDCP layer device, per bearer, or per logical channel. If an SDAP header has been set, the UE may be instructed to update or reset mapping information for the data bearer and QoS flow of uplink and downlink, by a one-bit NAS reflective QoS indicator and a one-bit AS reflective QoS indicator. The SDAP header may include QoS flow ID information indicating QoS. The QoS information may be used as data priority handling or scheduling information for seamlessly supporting a service.

The main functions of the NR PDCPs S30 and S65 may include some of the following functions.

- Header compression and decompression: ROHC only)
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The reordering by the NR PDCP refers to the function of reordering PDCP PDUs received from a lower layer in order based on the PDCP sequence number (SN) and may include the function of transferring data to a higher layer in the reordered order. The reordering by the NR PDCP may include transferring immediately without considering order, recording PDCP PDUs missed by reordering, reporting the state of the missing PDCP PDUs to the transmit part, and requesting to retransmit the missing PDCP PDUs.

The main functions of the NR RLCs S35 and S60 may include some of the following functions.

- Transfer of upper layer PDUs
- In-sequence delivery of upper layer PDUs
- Out-of-sequence delivery of upper layer PDUs

- Error correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery of the NR RLC refers to a function of sequentially delivering RLC SDUs received from a lower layer to an upper layer. The in-sequence delivery of the NR RLC may include a function of reassembling and transferring several RLC SDUs to which one RLC SDU has been divided and received and may include a function of reordering the received RLC PDUs based on an RLC sequence number (SN) or a PDCP sequence number (SN), a function of reordering and recording the lost RLC PDUs, a function of reporting the status of the lost RLC PDUs to the transmitting side, and a function of requesting retransmission of the lost RLC PDUs. The in-sequence delivery of the NR RLC may include a function of transferring, in sequence, only the RLC SDUs before a missed RLC SDU, if any, or may include a function of transferring, in sequence, to the higher layer, all RLC SDUs received before a predetermined timer starts, if the timer has expired although there is a missed RLC SDU. The in-sequence delivery of the NR RLC device may include a function of sequentially delivering all RLC SDUs received so far to the upper layer if the predetermined timer expires even when there is a lost RLC SDU. Further, the RLC PDUs may be processed in order of reception (in order of arrival regardless of the sequence number order) and delivered to the PDCP device regardless of order (out-of-sequence delivery). For segments, segments which are stored in a buffer or are to be received later may be received and reconstructed into a single whole RLC PDU, and then, the whole RLC PDU is processed and transferred to the PDCP device. The NR RLC layer may not include the concatenation function, and the function may be performed by the NR MAC layer or replaced with a multiplexing function of the NR MAC layer.

The out-of-sequence delivery by the NR RLC refers to immediately transferring the RLC SDUs received from the lower layer to the higher layer regardless of order and, if one original RLC SDU is split into several RLC SDUs that are then received, the out-of-sequence delivery may include reassembling and transferring them and storing the RLC SNs or PDCP SNs of the received RLC PDUs, ordering them, and recording missing RLC PDUs.

The NR MACs S40 and S55 may be connected to several NR RLC layer devices configured in one UE, and the major functions of the NR MAC may include some of the following functions.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding The NR PHY layers S45 and S50 may channel-code and modulate higher layer data into OFDM symbols, transmit the OFDM symbols through a wireless channel or demodulates OFDM symbols received through a wireless channel, channel-decodes and transfers the same to a higher layer.

The detailed structure of the radio protocol structure may be varied depending on the carrier (or cell) operating scheme. As an example, when the base station transmits data to the UE based on a single carrier (or cell), the base station and the UE use the protocol structure having a single structure for each layer like reference number 1610 of FIG. 16. On the other hand, when the base station transmits data to the UE based on carrier aggregation (CA) which uses multiple carriers in a single TRP, the base station and the UE use the protocol structure that has a single structure up to the RLC like reference number 1620 but performs multiplexing on the PHY layer through the MAC layer. As another example, when the base station transmits data to the UE based on dual connectivity (DC) which uses multiple carriers in multiple TRPs, the base station and the UE use the protocol structure that has a single structure up to the RLC like reference number 1630 but performs multiplexing on the PHY layer through the MAC layer.

Referring to the above-described PDCCH and beam configuration-related descriptions, current Rel-15 and Rel-16 have difficulty in achieving the reliability required in scenarios that require high reliability, such as URLLC, because of not supporting PDCCH repeated transmission. The disclosure may provide a PDCCH repeated transmission method through multiple transmission points (TRPs), enhancing the UE's PDCCH reception reliability. Specific methods are described below in detail in the following embodiments.

The content of the disclosure may be applied to at least one of FDD and TDD systems. As used herein, the term "higher signaling" (or higher layer signaling) may refer to a method for transmitting signals from the base station to the UE using a downlink data channel of the physical layer or from the UE to the base station using an uplink data channel of the physical layer and may be interchangeably used with RRC signaling, PDCP signaling, or medium access control (MAC) control element (MAC CE).

In the disclosure, in determining whether cooperative communication applies, the UE may use various methods, such as allowing the PDCCH(s) allocating the PDSCH where cooperative communication applies to have a specific format, or allowing the PDCCH(s) allocating the PDSCH where cooperative communication applies to include a specific indicator for indicating whether cooperative communication applies, allowing the PDCCH(s) allocating toe PDSCH where cooperative communication applies to be scrambled with a specific RNTI, or assuming application of cooperative communication in a specific period indicated by a higher layer. Thereafter, for convenience of description, that the UE receives cooperative communication-applied PDSCH based on similar conditions is referred to as a non-coherent joint transmission (NC-JT) case.

Hereinafter, in the disclosure, 'determine priority between A and B' may be referred to in other various manners, e.g., as selecting one with higher priority according to a predetermined priority rule and performing an operation according thereto or omitting or dropping the operation for the one with lower priority.

Hereinafter, in the disclosure, the above-described examples are described in connection with various embodiments. One or more embodiments may be applied simultaneously or in combination, rather than independently.

[NC-JT Related]

According to an embodiment of the disclosure, non-coherent joint transmission (NC-JT) may be used for the UE to receive PDSCH from multiple TRPs.

Unlike conventional, the 5G wireless communication system may support all of a service requiring a high transmission rate, a service having very short transmission latency, and a service requiring a high connection density. In a wireless communication network including a plurality of cells, transmission and reception points (TRPs), or beams, coordinated transmission between cells, TRPs, and/or beams may increase the strength of the signal received by the UE or efficiently perform interference control between cells, TRPs, and/or beams to thereby meet various service requirements.

Joint transmission (JT) is a representative transmission technology for the coordinated communication and is a technology for increasing the strength or throughput of the signal received by the UE by transmitting signals to one UE through multiple different cells, TRPs, and/or beams. In this case, inter-cell, TRP, and/or beam-UE channels may have significantly different characteristics. In particular, non-coherent joint transmission (NC-JT) supporting inter-cell, TRP, and/or inter-beam non-coherent precoding may require individual precoding, MCS, resource allocation, and TCI indication according to inter-cell, TRP, and/or beam-UE per-link characteristics.

The above-described NC-JT transmission may apply to at least one of downlink data channels (PDSCH), downlink control channels (PDCCH), uplink data channels (PUSCH), and uplink control channels (PUCCH). During PDSCH transmission, transmission information such as precoding, MCS, resource allocation, and transmission configuration indication (TCI) is indicated by the DL DCI and, for NC-JT transmission, the transmission information should be indicated independently per cell, TRP, and/or beam. This becomes a major factor to increase the payload necessary for DL DCI transmission, which may negatively affect the reception performance of the PDCCH transmitting the DCI. Accordingly, for supporting the JT of PDSCH, the tradeoff between DCI information quantity and control information reception performance needs to be carefully designed.

Figure 17:
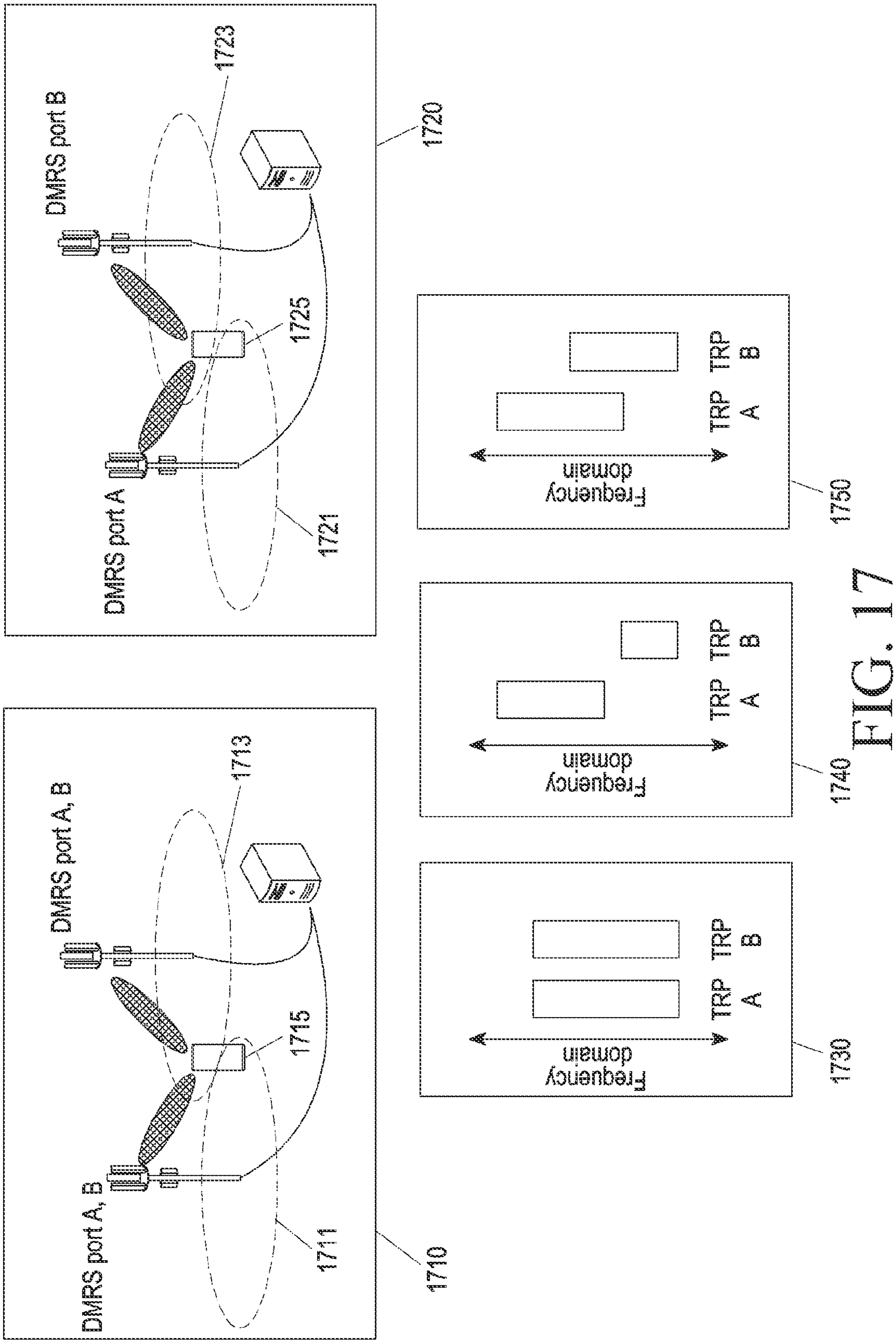
FIG. 17 is a view illustrating an antenna port configuration and a resource allocation example for cooperative communication in a wireless communication system according to an embodiment of the disclosure.

FIG. 17 is a view illustrating an antenna port configuration and a resource allocation example for transmitting a PDSCH using cooperative communication in a wireless communication system according to an embodiment of the disclosure.

Referring to FIG. 17, examples for PDSCH transmission are described for each technique of joint transmission (JT), and examples for allocating radio resources for each TRP are shown.

Referring to FIG. 17, an example 1710 of coherent joint transmission (C-JT) supporting inter-cell, TRP, and/or inter-beam coherent precoding is shown.

In the case of the C-JT, TRP A 1711 and TRP B 1713 transmit single data (PDSCH) to the UE 1715, and joint precoding may be performed in multiple TRPs. This may mean that DMRS is transmitted through the same DMRS ports so that TRP A 1711 and TRP B 1713 transmit the same PDSCH. For example, TRP A 1711 and TRP B 1713 may transmit DRMS to the UE through DMRS port A and DMRS port B, respectively. In this case, the UE may receive one DCI information for receiving one PDSCH to be demodulated based on the DMRSs transmitted through DMRS port A and DMRS port B.

FIG. 17 also illustrates an example 1720 of non-coherent joint transmission (NC-JT) supporting inter-cell, TRP, and/or inter-beam non-coherent precoding for PDSCH transmission. This may mean that DMRS is transmitted through different DMRS ports in order for TRP A 1721 and TRP B 1723 to transmit different PDSCHs. For example, TRP A 1721 may transmit DRMS to the UE through DMRS port A, and TRP B 1723 may transmit DRMS to UE 1725 through DMRS port B. The UE may receive DCI information for receiving the PDSCHs demodulated based on the DMRSs transmitted through DMRS port A and DMRS port B, respectively.

In the case of NC-JT, a PDSCH is transmitted to the UE (N035) for each cell, TRP or/and beam, and individual-precoding may be applied to each PDSCH. As each cell, TRP, and/or beam transmits a different PDSCH or a different PDSCH layer to the UE, it is possible to enhance the throughput relative to the single cell, TRP, and/or beam transmission. It is also possible to enhance the reliability relative to single cell, TRP, and/or beam transmission as each cell, TRP, and/or beam repeatedly transmits the same PDSCH to the UE. For convenience of description, the cell, TRP, and/or beam are collectively referred to as a TRP.

Further, various radio resource allocations may be considered, in the example of FIG. 17, such as when the frequency and time resources used in multiple TRPs for PDSCH transmission are the same (1730), when the frequency and time resources used in multiple TRPs do not overlap (1740), and when some of the frequency and time resources used in multiple TRPs overlap (1750).

For NC-JT support, DCIs in various forms, structures, and relationships may be considered to simultaneously allocate multiple PDSCHs to one UE.

Figure 18:
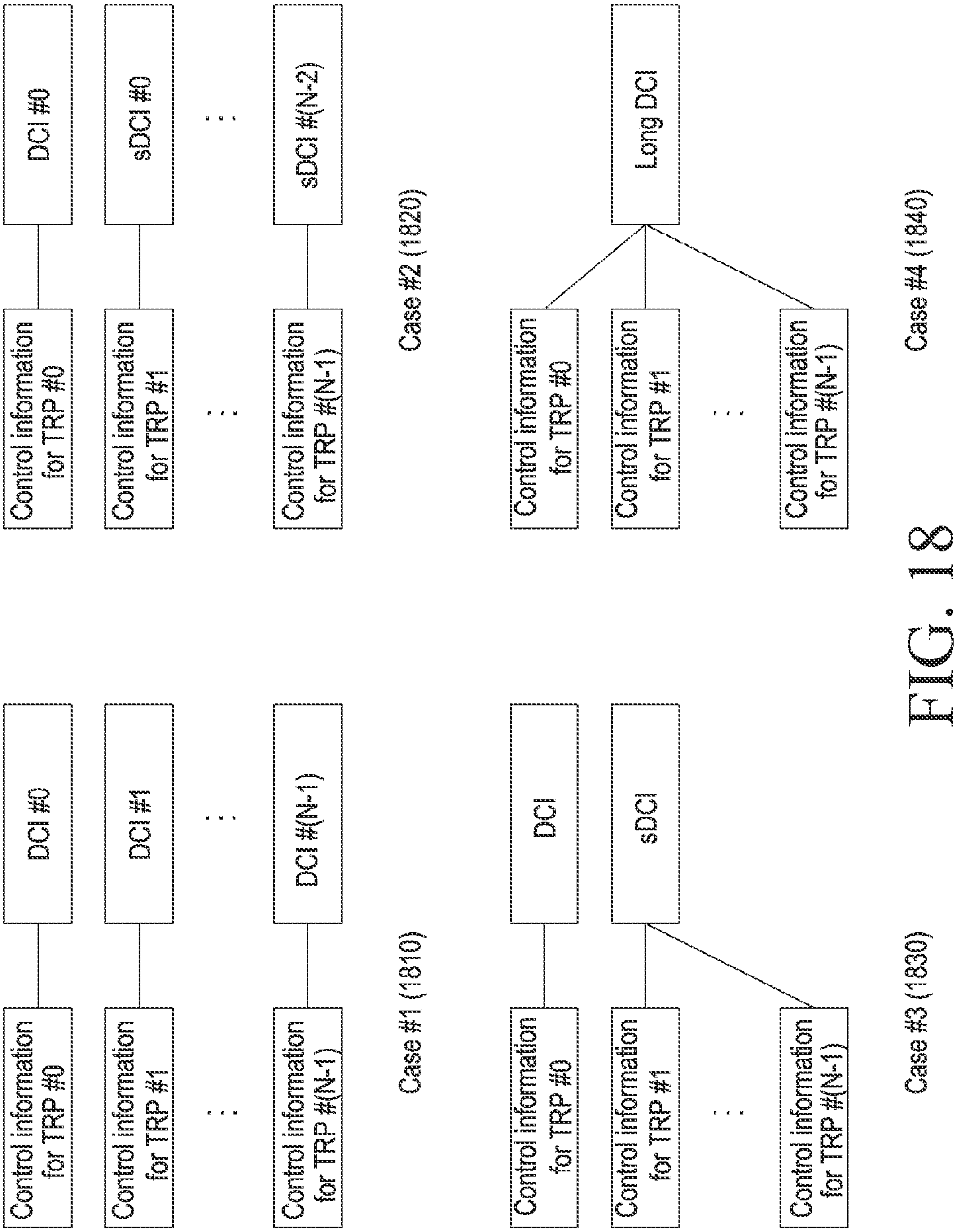
FIG. 18 is a view illustrating an example of a downlink control information (DCI) configuration for cooperative communication in a wireless communication system according to an embodiment of the disclosure.

FIG. 18 is a view illustrating an example of a configuration of downlink control information (DCI) for NC-JT for each TRP to transmit a different PDSCH or different PDSCH layer to the UE in a wireless communication system according to an embodiment of the disclosure.

Referring to FIG. 18, case #1 1810 is an example in which control information for PDSCHs transmitted in (N−1) additional TRPs is transmitted independently from control information for the PDSCH transmitted in the serving TRP in the situation where (N−1) different PDSCHs are transmitted from (N−1) additional TRPs (TRP #1 to TRP #(N−1)) other than the serving TRP (TRP #0) used for single PDSCH transmission. In other words, the UE may obtain control information for the PDSCHs transmitted from different TRPs (TRP #0 to TRP #(N−1)) through independent DCIs (DCI #0 to DCI #(N−1)). Formats between the independent DCIs may be the same or different, and payloads between the DCIs may also be the same or different. The above-described case #1 1810 may fully guarantee each PDSCH control or allocation degree of freedom, but if each DCI is transmitted in a different TRP, a difference in coverage occurs for each DCI, deteriorating reception performance.

Case #2 1820 is an example in which the control information (DCI) for (N−1) additional TRPs is respectively transmitted, and each of the DCIs (sDCI #0 to sDCI #(N−2)) is dependent upon the control information DCI #0 for the PDSCH transmitted from the serving TRP in the situation where (N−1) different PDSCHs are transmitted from (N−1) additional TRPs (TRP #1 to TRP #(N−1)) other than the serving TRP (TRP #0) used for single PDSCH transmission.

For example, DCI #0 which is the control information for the PDSCH transmitted from the serving TRP (TRP #0) includes all information elements of DCI format 1_0, DCI format 1_1, and DCI format 1_2, but shortened DCIs (hereinafter, sDCIs) (sDCI #0 to sDCI #(N−2)) which is are control information for the PDSCHs transmitted from the cooperative TRPs (TRP #1 to TRP #(N−1)) may include only some of the information elements of DCI format 1_0, DCI format 1_1, and DCI format 1_2. Accordingly, since the sDCI transmitting the control information for the PDSCHs transmitted from the cooperative TRPs has small payload as compared with the normal DCI (nDCI) transmitting PDSCH-related control information transmitted from the serving TRP, it is possible to include reserved bits as compared with the nDCI.

In the above-described case #2 1820, each PDSCH control or allocation degree of freedom may be limited according to the content of the information elements included in the sDCI. However, since the reception performance of sDCI becomes excellent relative to the nDCI, the probability that a difference in coverage per DCI occurs may be reduced.

In FIG. 18, case #3 1830 is an example in which one control information (sDCI) for (N−1) additional TRPs is transmitted, and the DCI is dependent upon the control information (DCI) for the PDSCH transmitted from the serving TRP in the situation where (N−1) different PDSCHs are transmitted from (N−1) additional TRPs (TRP #1 to TRP #(N−1)) other than the serving TRP (TRP #0) used for single PDSCH transmission.

For example, DCI #0 which is the control information for the PDSCH transmitted from the serving TRP (TRP #0) includes all information elements of DCI format 1_0, DCI format 1_1, and DCI format 1_2, and in the case of the control information for the PDSCHs transmitted from the cooperative TRPs (TRP #1 to TRP #(N−1)), only some of the information elements of DCI format 1_0, DCI format 1_1, and DCI format 1_2 may be collected and transmitted into one 'secondary' DCI (sDCI). For example, the sDCI may include at least one of HARQ-related information such as the frequency domain resource assignment, time domain resource assignment, and MCS of cooperative TRPs. Further, information that is not included in the sDCI, such as bandwidth part (BWP) indicator or carrier indicator, may follow the DCIs (DCI #0, normal DCI, and nDCI) of the serving TRP.

In FIG. 18, in case #3 1830, each PDSCH control or allocation degree of freedom may be limited according to the content of the information element included in the sDCI, but the reception performance of the sDCI may be adjusted and, as compared with case #1 1810 or case #2 1820, the complexity of DCI blind decoding of the UE may be reduced.

In FIG. 18, case #4 1840 is an example in which control information for PDSCHs transmitted in (N−1) additional TRPs is transmitted in the same DCI (long DCI) as the control information for the PDSCH transmitted from the serving TRP in the situation where (N−1) different PDSCHs are transmitted from (N−1) additional TRPs (TRP #1 to TRP #(N−1)) other than the serving TRP (TRP #0) used for single PDSCH transmission. In other words, the UE may obtain control information for the PDSCHs transmitted from different TRPs (TRP #0 to TRP #(N−1)) through a single DCI. In case #4 (1840), the complexity of DCI blind decoding of the UE may not increase, but PDSCH control or allocation degree of freedom may be reduced, like the number of cooperative TRPs being limited according to the long DCI payload limitation.

In the following description and embodiments, sDCI may denote various auxiliary DCIs such as shortened DCI, secondary DCI, or normal DCI (DCI formats 1_0 to 1 1 described above) including PDSCH control information transmitted in the cooperative TRP and, unless specified otherwise, the corresponding description may apply likewise to the auxiliary DCIs.

In the following description and embodiments, case #1 1810, case #2 1820, and case #3 1830 where one or more DCIs (PDCCH) are used for supporting NC-JT may be identified as multiple PDCCH-based NC-JT, and case #4 1840 where a single DCI (PDCCH) is used for supporting NC-JT may be identified as single PDCCH-based NC-JT. In multiple PDCCH-based PDSCH transmission, the CORESET where the DCI of the serving TRP (TRP #0) is scheduled and the CORESET where the DCIs of the cooperative TRPs (TRP #1 to TRP #(N−1)) are scheduled may be divided. As a method for dividing CORESETs, there may be a method for dividing through a higher layer indicator for each CORESET and a method for dividing through a beam configuration for each CORESET. Further, the single PDCCH-based NC-JT may schedule a single PDSCH having a plurality of layers instead of scheduling a plurality of PDSCHs by a single DCI, and the plurality of layers may be transmitted from multiple TRPs. In this case, the connection relationship between the layer and the TRP transmitting the layer may be indicated through a transmission configuration indicator (TCI) indication for the layer.

In embodiments of the disclosure, "cooperative TRP" may be replaced with various terms such as "cooperative panel" or "cooperative beam" in actual applications.

In embodiments of the disclosure, "when NC-JT applies" may be interpreted in various manners according to the context, such as "when the UE simultaneously receives one or more PDSCHs in one BWP," "when the UE receives the PDSCH based simultaneously on two or more TCI indications in one BWP," or "when the PDSCH received by the UE is associated with one or more DMRS port groups," but one expression is used for convenience of description.

In the disclosure, the radio protocol structure for NC-JT may be used in various manners according to the TRP scenarios. As an example, when there is no or little backhaul delay between cooperative TRPs, a method (CA-like method) using a structure based on MAC layer multiplexing is possible like reference number 1620 of FIG. 16. On the other hand, when the backhaul delay between cooperative TRPs is too large to be disregarded (e.g., when a time of 2 ms or longer is required for exchanging information, such as CSI, scheduling, and HARQ-ACK between cooperative TRPs), a method (DC-like method) for securing robust characteristics using an independent structure for each TRP from the RLC layer is possible like reference number 1630 of FIG. 16.

The UE supporting C-JT/NC-JT may receive, e.g., C-JT/NC-JT-related parameters or set values in the higher layer configuration and, based thereupon, set the UE's RRC parameters. For the higher layer configuration, the UE may utilize the UE capability parameter, e.g., tci-StatePDSCH. Here, the UE capability parameter, e.g., tci-StatePDSCH may define TCI states for the purpose of PDSCH transmission, and the number of TCI states may be set to 4, 8, 16, 32, 64, or 128 in FR1 and 64 or 128 in FR2, and up to eight states that may be indicated with the 3 bits of the TCI field of the DCI may be set via a MAC CE message among the set numbers. The maximum value, 128, means the value indicated by the maxNumberConfiguredTCIstatesPerCC in the tci-StatePDSCH parameter included in the UE's capability signaling. As such, the series of configuration processes from the higher layer configuration to the MAC CE configuration may be applied to a beamforming indication or beamforming change instruction for at least one PDSCH in one TRP.

[Multi-DCI-Based Multi-TRP]

According to an embodiment of the disclosure, a downlink control channel for NC-JT transmission may be configured based on multi-PDCCH.

The NC-JT based on multiple PDCCHs may have CORESETs or search spaces divided per TRP when transmitting DCI for the PDSCH schedule of each TRP. The CORESET or search space for each TRP may be configured like at least one of the following cases.

Higher layer index configuration per CORESET: The CORESET configuration information configured through a higher layer may include an index value, and TRPs transmitting PDCCH in the corresponding CORESET may be divided with the configured per-CORESET index values. In other words, in a set of CORESETs having the same index value set through the higher layer, it may be considered that the same transmits the PDCCH or that the PDCCH scheduling the PDSCH of the same TRP is transmitted. The above-described index for each CORESET may be referred to as CORESETPoolIndex, and it may be considered that the PDCCH is transmitted from the same TRP for CORESETs in which the same CORESETPoolIndex value is set. The CORESET in which no CORESETPoolIndex value is set may be regarded as having the default CORESETPoolIndex value set, and the above-described default value may be 0.

Multi-PDCCH-Config configuration: A plurality of PDCCH-Config's may be configured in one BWP, and each PDCCH-Config may include a PDCCH configuration for each TRP. In other words, a list of per-TRP CORESETs and/or a list of per-TRP search spaces may be configured in one PDCCH-Config, and one or more CORESETs and one or more search spaces included in one PDCCH-Config may be regarded as corresponding to a specific TRP.

CORESET beam/beam group configuration: The TRP corresponding to the corresponding CORESET may be identified through the beam or beam group configured per CORESET. For example, when the same TCI state is configured in multiple CORESETs, the corresponding CORESETs may be regarded as being transmitted through the same TRP or it may be considered that the PDCCH scheduling the PDSCH of the same TRP in the corresponding CORESET is transmitted.

Search space beam/beam group configuration: A beam or beam group may be configured per search space, and the TRP for each search space may be identified thereby. For example, when the same beam/beam group or TCI state is configured in multiple search spaces, in the corresponding search space, it may be considered that the same TRP transmits the PDCCH, or in the corresponding search space, it may be considered that the PDCCH scheduling the PDSCH of the same TRP is transmitted.

As described above, by identifying the CORESET or search space for each TRP, it is possible to classify the PDSCH and HARQ-ACK information for each TRP and thereby generate an HARQ-ACK codebook independently for each TRP and independently use the PUCCH resources.

The above-described configurations may be independent for each cell or for each BWP. For example, in the PCell, two different CORESETPoolIndex values are set whereas in a specific SCell, no CORESETPoolIndex may be set. In this case, it may be considered that while NC-JT transmission is configured in the PCell, no NC-JT transmission is configured in the SCell where no CORESETPoolIndex is configured.

[Single-DCI-Based Multi-TRP]

According to another embodiment of the disclosure, a downlink beam for NC-JT transmission may be configured based on single-PDCCH.

The single PDCCH-based NC-JT may schedule the PDSCHs transmitted by multiple TRPs with one DCI. In this case, as a method for indicating the number of TRPs transmitting the PDSCH, the number of TCI states may be used. In other words, if the number of TCI states indicated by the DCI scheduling the PDSCH is 2, it may be regarded as single PDCCH-based NC-JT transmission and, if 1, it may be regarded as single-TRP transmission. The TCI state indicated by the DCI may correspond to one or two TCI states among the TCI states activated by the MAC-CE. When the TCI states of the DCI correspond to two TCI states activated by the MAC-CE, a correlation may be established between the TCI codepoint indicated in the DCI and the TCI states activated by the MAC-CE, and it may be when the number of TCI states activated by the MAC-CE, corresponding to the TCI codepoint, is two.

The above-described configurations may be independent for each cell or for each BWP. For example, while the maximum number of activated TCI states corresponding to one TCI codepoint is two in the PCell, the maximum number of activated TCI states corresponding to one TCI codepoint may be one in a specific SCell. In this case, it may be considered that while NC-JT transmission is configured in the PCell, no NC-JT transmission is configured in the SCell.

Referring to the above-described PUSCH-related descriptions, current Rel-15/16 NR focuses on single cell and/or single TRP and/or single panel and/or single beam and/or single transmission direction for PUSCH repeated transmission. Specifically, PUSCH repeated transmission considers transmission with a single TRP regardless of codebook-based or non-codebook-based transmission. For example, codebook-based PUSCH transmission may determine the UE's transmission beam by the SRI and TPMI transferred from the base station, i.e., a single TRP, to the UE. Similarly, even in non-codebook-based PUSCH transmission, the NZP CSI-RS that may be configured from the base station, i.e., a single TRP may be configured to the UE, and the UE's transmission beam may be determined by the SRI transferred from a single TRP. Accordingly, when there is a deteriorating element that has a temporally or spatially large correlation such as blockage on the channel between the UE and a specific TRP, PUSCH repeated transmission through the single TRP may fail to meet an expected performance. Accordingly, to overcome such deterioration, Rel-17 or subsequent releases may support PUSCH repeated transmission considering a plurality of TRPs. This may be a method for maximizing diversity gain considering the channel between the UE and the plurality of TRPs having different spatial features. To support this, the UE needs to support a configuration for PUSCH repeated transmission with multiple TRPs. For example, a plurality of transmission beams for use in PUSCH repeated transmission considering multiple TRPs, and configurations or indication methods for power adjustment are required. Further, higher layer signaling or dynamic indication for distinguishing between a repeated transmission method considering a single TRP defined in Rel-15/16 and PUSCH repeated transmission considering multiple TRPs to be newly defined in Rel-17 is required. Further, as a method for enhancing PUSCH reception performance, a method for reporting the power headroom of the PUSCH for each TRP considering the transmit power of the PUSCH transmitted through each TRP is required to maximize the PUSCH transmission/reception gain by efficiently managing PUSCH transmit power considering multiple TRPs. In this case, in Rel-15/16, PUSCH repeated transmission is performed on a single TRP, and the conditions for triggering power headroom reporting are performed considering only PUSCH repeated transmission considering a single TRP. Since Rel-17 supports PUSCH repeated transmission considering multiple TRPs, identifying whether a change in pathloss which is one of the conditions for triggering power headroom reporting is larger than a threshold should be performed with respect to PUSCH repeated transmission considering multiple TRPs. In the disclosure, there may be provided a method for triggering power headroom reporting considering a plurality of TRPs to allow the base station to perform efficient PUSCH transmit power management when the PUSCH considering multiple TRPs is repeatedly transmitted and a method for determining information included in the triggered power headroom report. Specific methods are described below in detail in the following embodiments. In the disclosure, for convenience of description, the cell, transmission point, panel, beam, and/or transmission direction that may be identified through an indicator, such as cell ID, TRP ID, or panel ID, or higher layer/L1 parameters such as TCI state or spatial relation information are collectively referred to as transmission reception point (TRP) in the following description. Therefore, in actual applications, TRP may be appropriately replaced with one of the above terms.

In the disclosure, in determining whether cooperative communication applies, the UE may use various methods, such as allowing the PDCCH(s) allocating the PDSCH where cooperative communication applies to have a specific format, or allowing the PDCCH(s) allocating the PDSCH where cooperative communication applies to include a specific indicator for indicating whether cooperative communication applies, allowing the PDCCH(s) allocating toe PDSCH where cooperative communication applies to be scrambled with a specific RNTI, or assuming application of cooperative communication in a specific period indicated by higher layer signaling. Thereafter, for convenience of description, that the UE receives cooperative communication-applied PDSCH based on similar conditions is referred to as an NC-JT case.

In the disclosure, higher layer signaling may be signaling corresponding to at least one or a combination of one or more of the following signaling.

- Master information block (MIB)
- System information block (SIB) or SIB X (X=1, 2, . . . )
- Radio resource control (RRC)
- Medium access control (MAC) control element (CE)

Further, L1 signaling may be signaling corresponding to at least one or a combination of one or more of the following physical layer channels or signaling methods using signaling.

- Physical downlink control channel (PDCCH)
- Downlink control information (DCI)
- UE-specific DCI
- Group common DCI
- Common DCI
- Scheduling DCI (e.g., DCI used for scheduling downlink or uplink data)
- Non-scheduling DCI (e.g., DCI not for the purpose of scheduling downlink or uplink data)
- Physical uplink control channel (PUCCH)
- Uplink control information (UCI)

Hereinafter, in the disclosure, ‘determine priority between A and B’ may be referred to in other various manners, e.g., as selecting one with higher priority according to a predetermined priority rule and performing an operation according thereto or omitting or dropping the operation for the one with lower priority.

Hereinafter, in the disclosure, the above-described examples are described in connection with various embodiments. One or more embodiments may be applied simultaneously or in combination, rather than independently.

First Embodiment: PUSCH Repeated Transmission Method Considering Multiple TRPs The first embodiment of the disclosure describes a method for configuring by higher layer signaling and L1 signaling indication for PUSCH repeated transmission considering multiple TRPs. The PUSCH repeated transmission considering multiple TRPs may operate through an indication based on a single DCI and multiple DCIs which are described below in the 1-1th embodiment and the 1-2th embodiment. Further, the 1-3th embodiment of the disclosure describes a configured grant PUSCH repeated transmission method considering multiple TRPs.

Further, the 1-4th embodiment of the disclosure describes an SRS resource set configuration method for PUSCH repeated transmission considering multiple TRPs.

1-1th Embodiment: PUSCH Repeated Transmission Method Considering Multiple TRPs Based on a Single DCI As an embodiment of the disclosure, the 1-1th embodiment describes a PUSCH repeated transmission method considering multiple TRPs based on a single DCI. The UE may report that a PUSCH repeated transmission method considering multiple TRPs based on a single DCI is possible through UE capability reporting. The base station may configure what PUSCH repeated transmission method is to be used on the UE which has reported the corresponding UE capability (e.g., the UE capability supporting PUSCH repeated transmission considering multiple TRPs based on a single DCI) through higher layer signaling. In this case, the higher layer signaling may select and configure either PUSCH repeated transmission type A or PUSCH repeated transmission type B.

In the PUSCH repeated transmission method considering a single TRP in 3GPP standard Rel-15/16, both the codebook-based and non-codebook-based transmission methods are performed based on a single DCI. The UE may apply the same SRI or TPMI value to each PUSCH repeated transmission using the SRI or TPMI indicated by one DCI upon codebook-based PUSCH transmission. Further, the UE may apply the same SRI value to each PUSCH repeated transmission using the SRI indicated by one DCI upon non-codebook-based PUSCH transmission. For example, if codebook-based PUSCH transmission and PUSCH repeated transmission scheme A is configured by higher layer signaling, and the time resource allocation index in which the number of PUSCH repeated transmissions is set to 4, SRI index 0, and TPMI index 0 are indicated through the DCI, the UE applies both SRI index 0 and TPMI index 0 to each of the four PUSCH repeated transmissions. Here, the SRI and the TPMI may be related to the transmission beam and the transmission precoder, respectively. Unlike the PUSCH repeated transmission method considering a single TRP, the PUSCH repeated transmission method considering multiple TRPs may be required to differently apply the transmission beam and the transmission precoder to transmission to the respective TRPs. Accordingly, the UE may receive an indication of a plurality of SRIs or TPMI through the DCI and apply them to the respective PUSCH repeated transmissions, thereby performing PUSCH repeated transmission considering multiple TRPs.

When indicating the PUSCH repeated transmission method considering multiple TRPs based on a single DCI to the UE, methods for indicating a plurality of SRIs or TPMIs for the case in which the PUSCH transmission method is codebook or non-codebook may be considered as follows.

[Method 1] Transmission of a Single DCI where a Plurality of SRI or TPMI Fields are Present To support the PUSCH repeated transmission method considering multiple TRPs based on a single DCI, the base station may transmit the DCI where a plurality of SRI or TPMI fields are present to the UE. The DCI may have a new format (e.g., DCI format 0_3) or may have the existing format (e.g., DCI format 0_1 or 0_2) in which additional higher layer signaling (e.g., signaling capable of determining whether a plurality of SRI or TPMI fields may be supported) has been configured so that if the configuration were present, a plurality of SRIs or TPMIs would be present. For example, when codebook-based PUSCH transmission is configured through higher layer signaling, if the UE is configured with higher layer signaling capable of determining whether a plurality of SRI or TPMI fields may be supported, the UE may receive a DCI having a new format or existing format that has, e.g., two SRI fields and two TPMI fields and perform codebook-based PUSCH repeated transmission considering multiple TRPs. As another example, when non-codebook-based PUSCH transmission is configured through higher layer signaling, if the UE is configured with higher layer signaling capable of determining whether a plurality of SRI or TPMI fields may be supported, the UE may receive a DCI having a new format or existing format that has two SRI fields and perform non-codebook-based PUSCH repeated transmission considering multiple TRPs. If a plurality of SRI fields are used for both the above-described codebook and non-codebook-based PUSCH transmissions, two or more SRS resource sets in which the higher layer signaling 'usage' is set to codebook or non-codebook may be configured, and each SRI field may indicate the respective SRS resource, and the respective SRS resources may be included in two different SRS resource sets. Details of the plurality of SRS resource sets are described in the following 1-4th embodiment.

[Method 2] DCI Transmission to which Enhanced SRI and TPMI Field is Applied

The UE may receive a MAC-CE for enhanced SRI or TPMI field support from the base station to support a PUSCH repeated transmission method considering multiple TRPs based on a single DCI. The corresponding MAC-CE contains information instructing to change the interpretation of the codepoint of the DCI field so that for a specific codepoint of the SRI field in the DCI, a plurality of transmission beams are indicated or, for a specific codepoint of the TPMI field, a plurality of transmission precoders may be indicated. The following two methods may be considered for indicating a plurality of transmission beams.

Receive MAC-CE to activate a specific codepoint of the SRI field to indicate one SRS resource connected with a plurality of SRS spatial relation info Receive MAC-CE to activate a specific codepoint of the SRI field to indicate a plurality of SRS resources connected with one SRS spatial relation info When a plurality of SRS resources are indicated using an enhanced SRI field, the transmit power adjustment parameter of SRS resource is set per SRS resource set. Thus, each SRS resource may be present in a different SRS resource set to set a different transmit power adjustment parameter for each TRP. Accordingly, there may be two or more SRS resource sets in which the higher layer signaling 'usage' is set to codebook or non-codebook.

1-2th Embodiment: PUSCH Repeated Transmission Method Considering Multiple TRPs Based on Multiple DCIs As an embodiment of the disclosure, the 1-2th embodiment describes a PUSCH repeated transmission method considering multiple TRPs based on multiple DCIs. As described above, all the PUSCH repeated transmission method in 3GPP standard Rel-15/16 consider a single TRP and may thus use the same values for transmission beam, transmission precoder, resource allocation, and power adjustment parameters, in each repeated transmission. However, the PUSCH repeated transmission considering multiple TRPs may require that different parameters be applied, per TRP, to the PUSCH transmission-related parameters indicated by the DCI or configured by higher layer signaling for each PUSCH repeated transmission through multiple TRPs. For example, when multiple TRPs are present in different directions from the UE, transmission beams or transmission precoders may differ. Thus, it may be required to configure or indicate a transmission beam or transmission precoder for each TRP. As another example, when multiple TRPs are present at different distances from the UE, power adjustment methods independent from each other between the multiple TRPs and the UE may be needed, so that different time/frequency resource allocations may be performed. For example, for TRPs that are present far as compared with a specific TRP, a relatively small number of resource blocks (RBs) and a larger number of symbols may be allocated to increase the power per resource element (RE). Therefore, since the bit length of the corresponding DCI may be very large if different pieces of information are transferred through a single DCI, it may be more efficient to indicate PUSCH repeated transmission to the UE through a plurality of DCIs.

The UE may report that a PUSCH repeated transmission method considering multiple TRPs based on multiple DCIs is possible through UE capability reporting. For the UE that has reported the corresponding UE capability (e.g., UE capability supporting PUSCH repeated transmission considering multiple TRPs based on multiple DCIs), the base station may notify to allow the UE to perform PUSCH repeated transmission considering multiple TRPs through multiple DCIs using a configuration through higher layer signaling, an indication through L1 signaling, or a configuration and indication through a combination of higher layer signaling and L1 signaling. The base station may use a method for configuring or indicating PUSCH repeated transmission considering multiple TRPs based on multiple DCIs as follows.

Upon PUSCH repeated transmission considering multiple TRPs based on multiple DCIs, the UE may expect that the time/frequency resource allocation information indicated by each DCI considering TRPs with different distances from the UE is different. The UE may report whether different time/frequency resource allocations are possible, as UE capability, to the base station. The base station may configure whether to allocate different time/frequency resources to the UE through higher layer signaling, and the UE receiving the configuration may expect that the time/frequency resource allocation information to be indicated from each DCI is different. In this case, the UE may be configured or indicated for PUSCH repeated transmission considering multiple TRPs based on multiple DCIs, by the base station, considering conditions between a plurality of DCI fields and higher layer signaling configuration. When transmission beam and transmission precoder information is indicated through multiple DCIs, the SRI and TPMI in the first received DCI may be first applied when applying the transmission beam mapping method of the second embodiment below, and the SRI and TPMI in the second received DCI may be second applied when applying the transmission beam mapping method of the second embodiment below.

The base station may configure CORESETPoolIndex, which is higher layer signaling, to the UE, for each CORESET, and the UE may know from which TRP the corresponding CORESET is transmitted when receiving which CORESET. For example, if CORESETPoolIndex is set to 0 in CORESET #1 and CORESETPoolIndex is set to 1 in CORESET #2, the UE may know that CORESET #1 is transmitted from TRP #0 and CORESET #2 is transmitted from TRP #1. Further, that the DCI transmitted in each of the CORESETs in which CORESETPoolIndex values are set to 0 and 1, respectively, indicates the repeated PUSCH may be implicitly indicated by the conditions between specific fields in a plurality of transmitted DCIs. For example, when the HARQ process number field values in the plurality of DCIs transmitted by the base station to the UE are the same and the new data indicator (NDI) field values are the same, the UE may implicitly consider that the corresponding plurality of DCIs respectively schedule the repeated PUSCHs considering the multiple TRPs. Meanwhile, when the HARQ process number field values are the same and the NDI field values are the same, the reception of the plurality of DCIs may be limited. For example, the maximum interval between the plurality of DCI receptions may be defined as within the number of one or more specific slots or within the number of one or more specific symbols. In this case, the UE may perform PUSCH transmission based on the minimum Transport Block size calculated (or identified) based on the time/frequency resource allocation information indicated differently in the plurality of DCIs.

1-3th Embodiment: Configured Grant PUSCH Repeated Transmission Method Considering Multiple TRPs As an embodiment of the disclosure, the 1-3th embodiment describes a configured grant PUSCH repeated transmission method considering multiple TRPs. The UE may report to the base station whether to repeatedly transmit the configured grant PUSCH considering multiple TRPs as UE capability. The base station may configure by higher layer signaling, indicate by L1 signaling, or configure and indicate by a combination of higher layer signaling or L1 signaling, the configured grant PUSCH repeated transmission considering multiple TRPs to the UE using various methods as follows.

[Method 1] Activate Single DCI-Based Single Configured Grant Configuration

Method 1 is a method of indicating a plurality of SRIs or TPMIs to the UE based on a single DCI, and activating a single configured grant configuration along with the corresponding indication. A method of indicating a plurality of SRIs or TPMIs with a single DCI may follow the method of the 1-1th embodiment. If there is only one configured grant configuration in the UE, all bits of the HARQ process number field and the redundancy version field in the corresponding DCI may be indicated as 0. If the UE has a plurality of configured grant configurations and activates one of them with the corresponding DCI, the HARQ process number field in the corresponding DCI may indicate the index of the configured grant configuration, and all bits of the redundancy version field may be indicated as 0. The UE may map the transmission beam and the transmission precoder to each of the activated configured grant PUSCH repeated transmissions according to the transmission beam mapping method in the following second embodiment by using the plurality of SRIs or TPMIs indicated by a single DCI.

[Method 2] Activate Multiple DCI-Based Single Configured Grant Configuration

Method 2 is a method of indicating each SRI or TPMI to the UE with each DCI based on the multiple DCIs, and activating a single configured grant configuration along with the corresponding indication. A method of indicating each SRI or TPMI with each DCI based on multiple DCIs may follow the method of the 1-1th embodiment. If there is only one configured grant configuration in the UE, all bits of all the HARQ process number fields and the redundancy version fields in the multiple DCIs may be indicated as 0. If the UE has a plurality of configured grant configurations and activates one of them with the corresponding multiple DCIs, all the HARQ process number fields in the corresponding multiple DCIs may indicate the same index of the configured grant configuration, and all bits of all the redundancy version fields in the corresponding multiple DCIs may be indicated as 0. According to the conditions of the DCI field during the multiple DCI-based PUSCH repeated transmission, the NDI field in addition to the HARQ process number field may also have the same value. The UE may map the transmission beam and the transmission precoder to each of the activated configured grant PUSCH repeated transmissions according to the following transmission beam mapping method by using the plurality of SRIs or TPMIs indicated by multiple DCIs. For example, if the transmission beam and the transmission precoder-related information indicated by the first received DCI are SRI #1 and TPMI #1, the transmission beam and the transmission precoder-related information indicated by the second received DCI are SRI #2 and TPMI #2, and the transmission beam mapping scheme set by higher layer signaling is cyclical, the UE may apply SRI #1 and TPMI #1 to the odd-numbered transmissions (1, 3, 5, . . . ) of the activated configured grant PUSCH repeated transmissions and SRI #2 and TPMI #2 to the even-numbered transmissions (2, 4, 6, . . . ) to perform PUSCH transmission.

[Method 3] Activate Multiple DCI-Based Multiple Configured Grant Configuration

Method 3 is a method of indicating each SRI or TPMI to the UE with each DCI based on the multiple DCIs, and activating multiple configured grant configurations along with the corresponding indication. A method of indicating each SRI or TPMI with each DCI based on multiple DCIs may follow the method of the 1-2th embodiment, a plurality of configured grant configurations may be present in the UE, and the index of each configured grant configuration may be indicated through the HARQ process number field in each DCI. Further, all bits of all redundancy version fields in the corresponding multiple DCIs may be indicated as 0. According to the conditions of the DCI field during the multiple DCI-based PUSCH repeated transmission, the NDI field in addition to the HARQ process number field may also have the same value. The UE may receive MAC-CE signaling indicating (commanding) a connection between a plurality of configured grant configurations activated by multiple DCIs. After performing HARQ-ACK transmission for MAC-CE signaling, e.g., after 3 ms, the UE may receive multiple DCIs from the base station. If the configured grant configuration index indicated by each DCI matches the configured grant configuration indexes indicated (commanded) for the connection through MAC-CE signaling, the UE may perform PUSCH repeated transmission considering multiple TRPs based on the indicated configured grant configurations. In this case, some configurations may be shared as the same value between a plurality of connected configured grant configurations. For example, repK, which is higher layer signaling indicating the number of repeated transmissions, repK-RV, which is higher layer signaling indicating the order of redundancy versions during repeated transmissions, and periodicity, which is higher layer signaling indicating the period of repeated transmissions, may be configured to have the same value within the connected configuration grant configurations.

1-4th Embodiment: Method for Configuring SRS Resource Set for PUSCH Repeated Transmission Considering Multiple TRPs In the 1-4th embodiment, as an embodiment of the disclosure, an SRS resource set configuration method for PUSCH repeated transmission considering multiple TRPs is described. Since the power adjustment parameters of the SRS (e.g., alpha, p0, pathlossReferenceRS, srs-PowerControlAjdustmentStates, etc., which may be configured by higher layer signaling) may vary for each SRS resource set, the number of SRS resource sets may be increased to two or more, and different SRS resource sets may be used to support different TRPs, for the purpose of different SRS power adjustment for each TRP during repeated PUSCH transmission considering multiple TRPs. The SRS resource set configuration method considered in the present embodiment may be applied to the 1-1th to 1-3th embodiments. For a basic description of the power adjustment parameter of the SRS, refer to 3GPP standard TS 38.331.

During repeated PUSCH transmission considering multiple TRPs based on a single DCI, a plurality of SRIs indicated by a single DCI may be selected from SRS resources present in different SRS resource sets. For example, if two SRIs are indicated by a single DCI, the first SRI may be selected from SRS resource set #1, and the second SRI may be selected from SRS resource set #2.

Upon PUSCH repeated transmission considering multiple DCI-based multiple TRPs, the SRIs respectively indicated by two DCIs may be selected from SRS resources present in different SRS resource sets, and each SRS resource set may be explicitly or implicitly connected (corresponding) to higher layer signaling (e.g., CORESETPoolIndex) indicating each TRP. As an explicit connection method, a CORESETPoolIndex value may be set in the configuration of the SRS resource set configured by a higher layer to notify the UE of a quasi-static connection state between the CORESET and the SRS resource set. As another example, as a more dynamic explicit connection method, a MAC-CE for activating a connection between a specific CORESET (including both the cases where the CORESETPoolIndex value is set to 0 or 1 or is not set) and the SRS resource set may be used. For example, 3 ms after receiving the MAC-CE for activating the connection between the specific CORESET (including both the cases where the CORESETPoolIndex value is set to 0 or 1 or is not set) and the SRS resource set and then transmitting the HARQ-ACK, the UE may consider that the connection between the corresponding CORESET and the SRS resource set has been activated. An implicit method is to assume an implicit connection state using a specific criterion between the CORESETPoolIndex and the SRS resource set index. For example, assuming that the UE is configured with two SRS resource sets, e.g., SRS resource set #0 and SRS resource set #1, the UE may assume that CORESETs where no CORESETPoolIndex is set or the CORESETPoolIndex is set to 0 are connected with SRS resource set #0 and that CORESETs where the CORESETPoolIndex is set to 1 are connected with SRS resource set #1.

For the above-described single or multiple DCI-based methods, the UE explicitly or implicitly configured or indicated for connection between different SRS resource sets and the respective TRPs may expect that sameAsFci2 is set to the srs-PowerControlAdjustmentStates value set by higher layer signaling in each SRS resource set but is not set to separateClosedLoop. Further, it may be expected that usage set by higher layer signaling in each SRS resource set is set to be the same as codebook or noncodebook.

1-5th Embodiment: Dynamic Switching Method for Determining PUSCH Transmission Considering a Single TRP Based on Codebook or PUSCH Transmission Considering Multiple TRPs As an embodiment of the disclosure, in the 1-5th embodiment, a dynamic switching method for determining PUSCH transmission considering a codebook-based single TRP or PUSCH transmission considering multiple TRPs is described.

According to the 1-1th embodiment and the 1-4th embodiment, the base station may receive the UE capability report from the UE which is capable of codebook-based PUSCH repeated transmission considering multiple TRPs based on a single DCI and configure, to the UE, higher layer signaling for performing PUSCH repeated transmission through multiple TRPs. In this case, upon PUSCH repeated transmission considering multiple TRPs based on a single DCI as in the 1-4th embodiment, the base station may transmit, to the UE, a single DCI including a plurality of SRI fields to indicate the SRS resources present in different SRS resource sets. In this case, each of the plurality of SRI fields may be interpreted in the same manner as the 3GPP standard NR Release 15/16. More specifically, the first SRI field may select the SRS resource in the first SRS resource set, and the second SRI field may select the SRS resource in the second SRS resource set. Similar to the plurality of SRI fields, in order to repeatedly transmit the PUSCH considering multiple TRPs, the base station may transmit, to the UE, a single DCI including a plurality of TPMI fields to select each TPMI corresponding to the SRS resource indicated by each SRI field. In this case, the plurality of TPMI fields may be indicated through . . . the same DCI as the DCI including the plurality of SRI fields described above. Meanwhile, the plurality of TPMIs to be used for PUSCH transmission to each TRP may be selected through the following methods using the plurality of TPMI fields:

[Method 1] Each TPMI field may be interpreted in the same manner as 3GPP standard NR Release 15/16. For example, the first TPMI field may indicate the TPMI index and layer information for the SRS resource indicated by the first SRI field, and the second TPMI field may indicate the TPMI index and layer information for the SRS resource indicated by the second SRI field. In this case, the first TPMI field and the second TPMI field may indicate the same layer information.

[Method 2] The first TPMI field may indicate the TPMI index and layer information for the SRS resource indicated by the first SRI field in the same manner as the 3GPP standard NR Release 15/16. In contrast, since the second TPMI field selects the TPMI index for the same layer as the layer indicated by the first TPMI field, the second TPMI field may not indicate layer information, and may indicate the TPMI index information for the SRS resource indicated by the second SRI field.

Meanwhile, when a plurality of TPMIs are selected through the method 2, the bit length of the second TPMI field may be smaller than that of the first TPMI field. This is because the second TPMI field indicates one value (index) of the same TPMI index candidates as the layer indicated by the first TPMI field, and thus may not indicate layer information.

The UE may support a dynamic switching method of receiving a single DCI including a plurality of SRI fields and a plurality of TPMI fields and determining PUSCH repeated transmission considering multiple TRPs or PUSCH repeated transmission considering a single TRP based on the received single DCI. The UE may support dynamic switching using a reserved value that does not have any meaning among values that the plurality of TPMI fields or SRI fields included in the received DCI may have. For example, if the bit length of the SRI field is 2 bits, a total number of 4 cases may be expressed, and in this case, each expressible case may be defined as a codepoint. Further, when three of the four codepoints have a meaning of which SRI to indicate and the other one does not have any meaning, this codepoint may be referred to as a codepoint indicating a reserved value (in the following description, it may be expressed that the codepoint indicating the reserved value is set to reserved). It is described in more detail through what is described below.

It is assumed that PUSCH antenna port is 4 to describe a specific example of a dynamic switching method capable of supporting a plurality of TPMI fields through reserved values. It is also assumed that the first TPMI field is composed of 6 bits, the higher layer parameter codebookSubset is set to fullyAndPartialAndNonCoherent, and is indicated in the same manner as the 3GPP standard NR Release 15/16. In this case, in the first TPMI field, e.g., indexes 0 to 61 may be set to indicate a valid TPMI index and layer information, and indexes 62 to 63 may be set to reserved. If the second TPMI field includes only TPMI index information other than the layer information as in method 2, the second TPMI field may indicate only the TPMI index when the layer for PUSCH transmission is limited to one value (e.g., one value among 1 to 4) according to the first TPMI field. In this case, the number of bits of the second TPMI field may be set based on the number of bits capable of representing a layer having the largest number of candidates among TPMI index candidates that may be set for each layer. For example, according to an example in which the number of candidates in layer 1 is 0 to 27, the number of candidates in layer 2 is 0 to 21, the number of candidates in layer 3 is 0 to 6, and the number of candidates in layer 4 is 0 to 4, layer 1 has the most candidates. Therefore, the number of bits of the second TPMI field may be set to 5 according to the number of TPMI index candidates of layer 1. The configuration of the second TPMI field is described in detail. When 1 layer and the TPMI index according thereto are indicated by the first TPMI field, the UE may interpret the second TPMI field with the codepoint indicating one value among TPMI indexes 0 to 27 for 1 layer and the codepoint indicating a reserved value. For example, when 2 layer and the TPMI index according thereto are indicated by the first TPMI field, the UE may interpret the second TPMI field with the codepoint indicating one value among TPMI indexes 0 to 21 for 2 layer and the codepoint indicating a reserved value. Further, for example, the UE may interpret the second TPMI field in a similar manner for the case where 3 layer or 4 layer and the TPMI index according thereto are indicated with the first TPMI field. In this case, when there are two or more codepoints indicating reserved values other than the codepoints indicating the TPMI index in the second TPMI field, the codepoints indicating the two reserved values may be used to indicate dynamic switching. In other words, among the codepoints of the second TPMI field composed of 5 bits, the second codepoint (i.e., the 31rd codepoint in the example) from the end, corresponding to the codepoint indicating a reserved value, may be used to indicate PUSCH repeated transmission considering a single TRP with the first TRP, and the last codepoint (i.e., the 32nd codepoint in the example) may be used to indicate PUSCH repeated transmission considering a single TRP with the second TRP. In this case, the UE may receive an indication of the layer information and TPMI information for PUSCH repeated transmission considering a single TRP, through the first TPMI field. Meanwhile, the above-described assumptions are merely for convenience of description, and the disclosure is not limited thereto.

For convenience of description, the specific example for the two TRPs is generalized and described. The UE may receive a single DCI including two SRI fields and two TPMI fields, and perform dynamic switching according to the codepoint indicated by the second TPMI field. If the codepoint of the second TPMI field indicates the TPMI index for the layer indicated by the first TPMI field, the UE may perform PUSCH repeated transmission considering multiple TRPs. If the second TPMI field indicates the second codepoint from the end, corresponding to the codepoint indicating a reserved value, the UE may perform PUSCH repeated transmission considering a single TRP for TRP 1, and may identify layer information and TPMI index information for codebook-based PUSCH transmission from the first TPMI field. If the second TPMI field indicates the last codepoint corresponding to the codepoint indicating a reserved value, the UE may perform PUSCH repeated transmission considering a single TRP for TRP 2 and may identify layer information and TPMI index information for codebook-based PUSCH transmission from the first TPMI field.

Meanwhile, in the above-described example, two reserved codepoints from the end of the second TPMI field are used to indicate dynamic switching, but the instant embodiment is not limited thereto. In other words, dynamic switching may be indicated using the codepoint indicating two different reserved values of the second TPMI field, and PUSCH repeated transmission considering a single TRP for TRP1 or PUSCH repeated transmission considering a single TRP for TRP2 may be mapped to the codepoint indicating each reserved value and indicated.

Further, in the above-described example, a case where the second TPMI field is determined by method 2 is described. However, even when the second TPMI field is determined in the same manner as 3GPP standard NR Release 15/16 like method 1, dynamic switching may be supported using the reserved codepoint in the same manner as in the above-described example.

For example, when the number of the codepoints indicating reserved values of the second TPMI field is smaller than 2, the number of bits of the second TPMI field may be increased by 1, and the second codepoint from the end and the last codepoint, with respect to the increased number of bits, may be used for the purpose of supporting dynamic switching.

When two TPMI fields are determined as in method 1, a method for supporting dynamic switching depending on whether each TPMI field is indicated by the codepoint indicating a reserved value may be additionally considered. In other words, if the first TPMI field is indicated by the codepoint indicating a reserved value, the UE may perform PUSCH repeated transmission considering a single TRP for TRP2 and, if the second TPMI field is indicated by the codepoint indicating a reserved value, the UE may perform PUSCH repeated transmission considering a single TRP for TRP1. If both the TPMI fields indicate a codepoint for TPMI not codepoints indicating reserved values, the UE may perform PUSCH repeated transmission considering multiple TRPs. If no codepoint having a reserved value is present, the number of bits of the TPMI field may be increased by 1, and the last codepoint with respect to the increased number of bits may be used for the purpose of supporting dynamic switching.

Meanwhile, as another method for supporting dynamic switching, dynamic switching may be indicated with two SRI fields, and the UE may identify layer information and TPMI index information for PUSCH repeated transmission considering a single TRP or multiple TRPs from the two TPMI fields. If one or more codepoints indicating a reserved value are present in each SRI field, dynamic switching may be supported depending on whether the SRI field indicates the codepoint indicating a reserved value. If the first SRI field indicates the codepoint indicating a reserved value, and the second SRI field indicates the SRS resource of the second SRS resource set, the UE may perform PUSCH repeated transmission considering a single TRP for TRP2. In this case, the UE may identify layer information and TPMI index information from the first TPMI field to perform PUSCH repeated transmission considering a single TRP for TRP2. If the second SRI field indicates the codepoint indicating a reserved value, and the second SRI field indicates the SRS resource of the second SRS resource set, the UE may perform PUSCH repeated transmission considering a single TRP for TRP1. In this case, the UE may identify layer information and TPMI index information from the first TPMI field to perform PUSCH repeated transmission considering a single TRP for TRP1. If both the SRI fields indicate the SRS resource of each SRS resource set, not the codepoint indicating a reserved value, the UE may perform PUSCH repeated transmission considering multiple TRPs. In this case, the UE may identify layer information and TPMI index information from the first TPMI field to perform PUSCH repeated transmission for TRP1 and identify the TPMI index information from the second TPMI field to perform PUSCH repeated transmission for TRP2. In this case, upon PUSCH transmission for TRP1 and TRP2, the layers may be set to be the same. If no codepoint having a reserved value is present in the two SRI fields, the number of bits of the SRI field may be increased by 1, and the last codepoint among the codepoints indicating reserved values with respect to the increased number of bits may be used for the purpose of supporting dynamic switching.

1-6th Embodiment: Dynamic Switching Method for Determining PUSCH Transmission Considering a Single TRP Based on Non-Codebook or PUSCH Transmission Considering Multiple TRPs As an embodiment of the disclosure, in the 1-6th embodiment, a dynamic switching method for determining PUSCH transmission considering a non-codebook-based single TRP or PUSCH transmission considering multiple TRPs is described.

According to the 1-1th embodiment and the 1-4th embodiment, the base station may receive the UE capability report from the UE which is capable of non-codebook-based PUSCH repeated transmission considering multiple TRPs based on a single DCI and configure, to the UE, higher layer signaling for performing PUSCH repeated transmission through multiple TRPs. In this case, upon PUSCH repeated transmission considering multiple TRPs based on a single DCI as in the 1-4th embodiment, the base station may transmit, to the UE, a single DCI including a plurality of SRI fields to indicate the SRS resources present in different SRS resource sets. Meanwhile, a plurality of SRI fields may be selected according to the following method, for example.

[Method 1] Each SRI field may be selected in the same manner as 3GPP standard NR Release 15/16. For example, the first SRI field may indicate an SRS resource for PUSCH transmission in the first SRS resource set, and the second SRI field may indicate an SRS resource for PUSCH transmission in the second SRS resource set. In this case, the first SRI field and the second SRI field may indicate the same layer information.

[Method 2] The first SRI field may indicate the SRS resource(s) for PUSCH transmission in the first SRS resource set by the same method as the 3GPP standard NR Release 15/16. The SRI field may indicate the SRS resource(s) for PUSCH transmission in the second SRS resource set for the same layer as the layer indicated by the first SRI field.

When a plurality of TPMIs are selected through the method 2, the bit length of the second SRI field may be small as compared with the first SRI field. This is because the second SRI is determined from among the SRI candidates for the same layer as the layer determined by the first SRI field among the SRI candidates for all supportable layers.

The UE may support a dynamic switching method of receiving a single DCI including a plurality of SRIs and determining PUSCH repeated transmission considering multiple TRPs or PUSCH repeated transmission considering a single TRP based on the received single DCI. The UE may support dynamic switching using the codepoint indicating a reserved value of a plurality of SRI fields included in the received DCI.

To describe a specific example of a dynamic switching method that may be supported through a codepoint indicating a reserved value of a plurality of SRI fields, it is assumed that the maximum number of PUSCH antenna ports is 4, and the number of SRS resources in each SRS resource set is 4. It is also assumed that the first SRI field is composed of 4 bits, and is indicated in the same manner as the 3GPP standard NR Release 15/16. In this case, in the first SRI area, indexes 0 to 14 may be set to indicate the SRS resource for PUSCH transmission and the layer according to the selected SRS resource, and index 15 may be set by the codepoint indicating a reserved value. If the second SRI field selects the same number of SRS resources as the number of layers indicated by the first SRI as in method 2 above, the second SRI field may indicate SRS resource selection candidates in the case where the layer for PUSCH transmission is limited to one value (e.g., one value among 1 to 4) according to the first SRI field. In this case, the number of bits of the second SRI field may be set based on the layer that has the largest number of candidates among the numbers of per-layer SRS resource selection candidates. For example, as the values of the SRI field indicating the SRS resource selection candidate for layer 1 are 0 to 3, a total of four candidates may be present, as the values of the SRI field indicating the SRS resource selection candidate for layer 2 are 4 to 9, a total of six candidates may be present, as the values of the SRI field indicating the SRS resource selection candidate for layer 3 are 10 to 13, a total of four candidates may be present, and as the value of the SRI field indicating the SRS resource selection candidate for layer 4 is 14, a total of one candidate may be present. In this case, since the number of candidates for layer 2 is 6 and is the largest, the number of bits of the second SRI field may be set to 3. The configuration of the second SRI field is described in detail. When the SRI value for the case where the layer for PUSCH transmission is 1 is indicated by the first SRI field, the UE may interpret the second SRI field as the codepoint indicating one value among SRI candidates 0 to 3 for 1 layer or other values as codepoints having reserved values. For example, when the SRI value for the case where the layer for PUSCH transmission is 2 is indicated by the first SRI field, the UE may interpret the second SRI field as the codepoint indicating one value among SRI candidates 0 to 5 or other values as codepoints having reserved values. Further, e.g., in the case of indicating the SRI value for the case where the layer for PUSCH transmission is 3 or 4 by the first SRI field, the UE may interpret the second SRI field in a similar manner. In this case, when there are two or more codepoints indicating reserved values other than the codepoints indicating the SRI value according to the layer in the second SRI field, the codepoints indicating the two reserved values may be used to indicate dynamic switching. In other words, among the codepoints of the second SRI field composed of 3 bits, the second codepoint (i.e., the seventh codepoint in the example) from the end, corresponding to the codepoint indicating a reserved value, may be used to indicate PUSCH repeated transmission considering a single TRP with the first TRP, and the last codepoint (i.e., the eighth codepoint in the example) may be used to indicate PUSCH repeated transmission considering a single TRP with the second TRP. In this case, the UE may receive an indication of the SRI for PUSCH repeated transmission considering a single TRP, through the first SRI field. Meanwhile, the above-described assumptions are merely for convenience of description, and the disclosure is not limited thereto.

For convenience of description, the specific example for the two TRPs is generalized and described. The UE may receive a single DCI including two SRI fields, and perform dynamic switching according to the codepoint indicated by the second SRI field. If the codepoint of the second SRI field indicates the SRI value for the layer indicated by the first SRI field, the UE may perform PUSCH repeated transmission considering multiple TRPs. If the second SRI field indicates the second codepoint from the end, corresponding to the codepoint indicating a reserved value, the UE may perform PUSCH repeated transmission considering a single TRP for TRP 1, and may identify the SRI for non-codebook-based PUSCH transmission from the first SRI field. If the second SRI field indicates the last codepoint corresponding to the codepoint indicating a reserved value, the UE may perform PUSCH repeated transmission considering a single TRP for TRP 2 and may identify the SRI for non-codebook-based PUSCH transmission from the first SRI field.

Meanwhile, in the above-described example, codepoints indicating two reserved values from the end of the second SRI field are used to indicate dynamic switching, but the instant embodiment is not limited thereto. In other words, dynamic switching may be indicated using the codepoint indicating two different reserved values of the second SRI field, and PUSCH repeated transmission considering a single TRP for TRP1 or PUSCH repeated transmission considering a single TRP for TRP2 may be mapped to the codepoint indicating each reserved value and indicated.

Further, in the above-described example, a case where the second SRI field is determined by method 2 is described. However, even when the second SRI field is determined in the same manner as 3GPP NR Release 15/16 like method 1, dynamic switching may be supported using the codepoint indicating the reserved value of the SRI field in the same manner as in the above-described example.

For example, when the number of the codepoints indicating reserved values of the second SRI field is smaller than 2, the number of bits of the second SRI field may be increased by 1, and the second codepoint from the end and the last codepoint, with respect to the increased number of bits, may be used for the purpose of supporting dynamic switching.

When two SRI fields are determined as in method 1, a method for supporting dynamic switching depending on whether each SRI field is indicated by the codepoint indicating a reserved value may be additionally considered. In other words, if the first SRI field is indicated by the codepoint indicating a reserved value, the UE may perform PUSCH repeated transmission considering a single TRP for TRP2 and, if the second SRI field is indicated by the codepoint indicating a reserved value, the UE may perform PUSCH repeated transmission considering a single TRP for TRP1. If both the SRI fields indicate a codepoint for indicating the SRI, not codepoints indicating reserved values, the UE may perform PUSCH repeated transmission considering multiple TRPs. If no codepoint indicating a reserved value is present, the number of bits of the SRI area may be increased by 1, and the last codepoint with respect to the increased number of bits may be used for the purpose of supporting dynamic switching.

Figure 19:
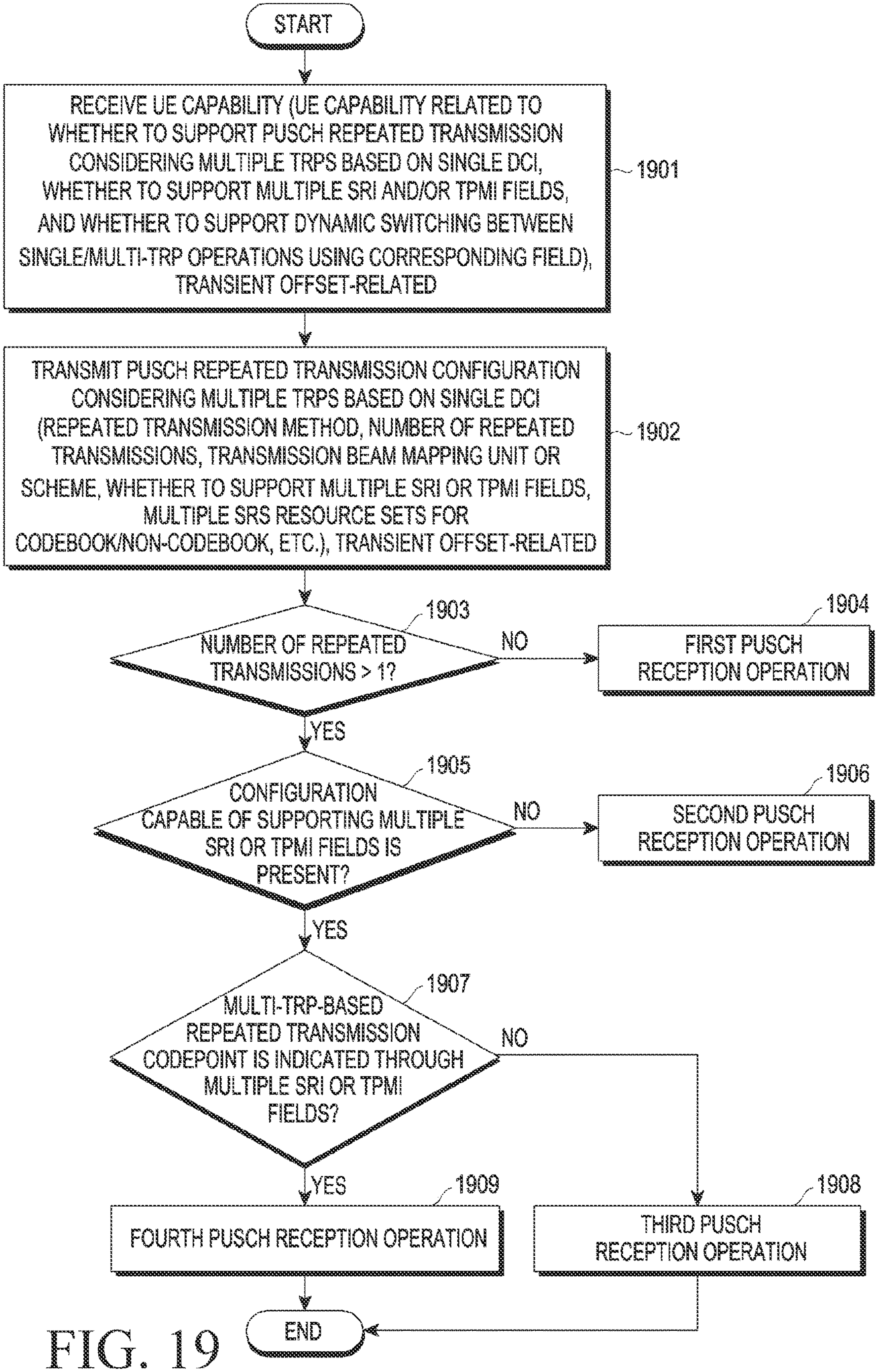
FIGS. 19 and 20, respectively, illustrate operations of a base station and a UE for PUSCH repeated transmission considering single DCI transmission-based multiple TRPs having a plurality of SRI or TPMI fields according to an embodiment of the disclosure.
Figure 20:
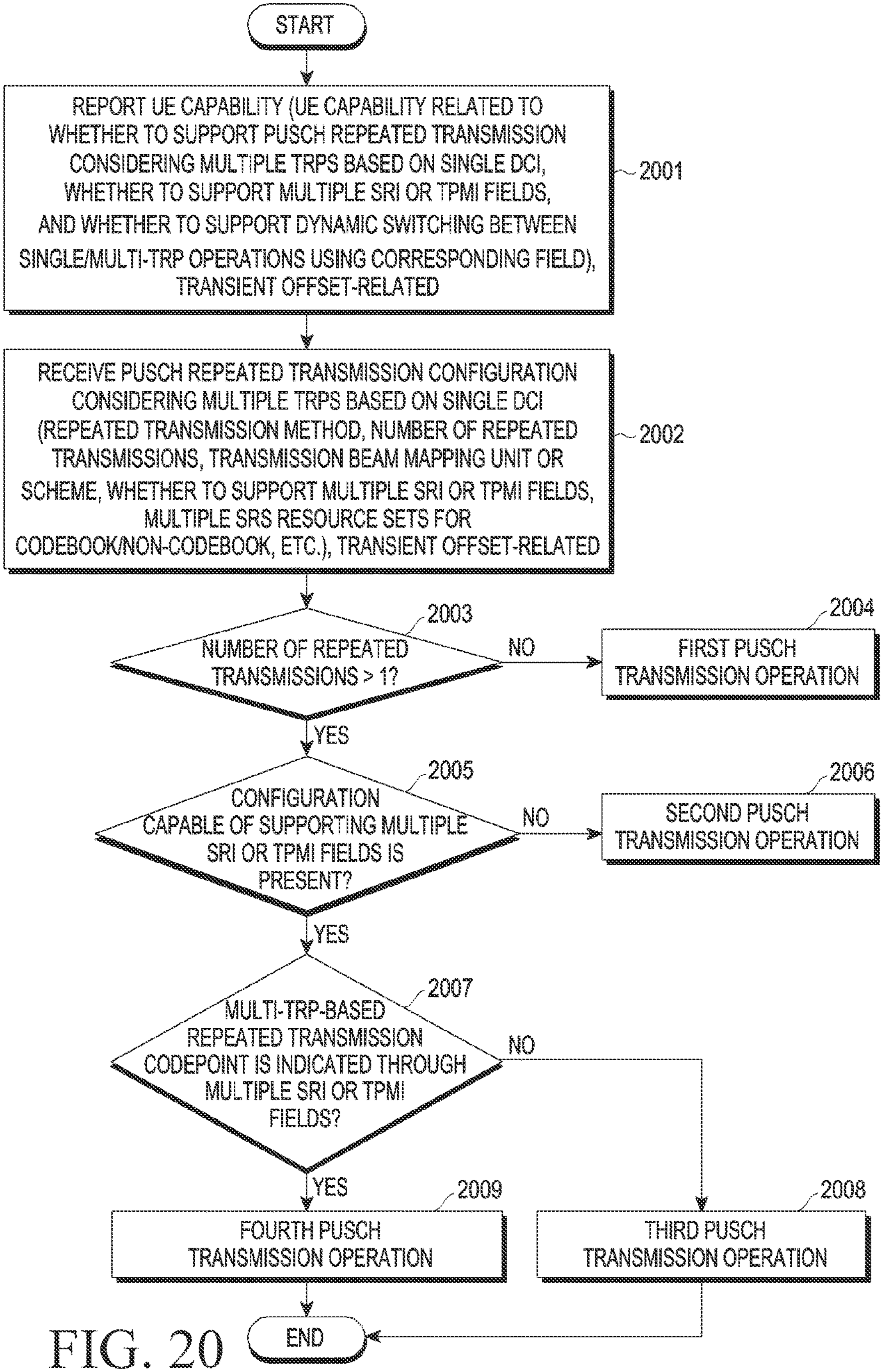

FIGS. 19 and 20 illustrate operations of a base station and a UE for PUSCH repeated transmission considering single DCI transmission-based multiple TRPs having a plurality of SRI or TPMI fields according to an embodiment of the disclosure.

Referring to FIGS. 19 and 20, the UE performs UE capability reporting on whether to support PUSCH repeated transmission considering multiple TRPs based on a single DCI, whether to support dynamic switching between single/multi-TRP operations using corresponding fields, and transient offset-related information when changing transmission beams described below in the following second embodiment (2051), and the base station receiving the UE capability report (1901) transmits, to the UE, configuration information for PUSCH repeated transmission considering multiple TRPs based on a single DCI (1902). In this case, the transmitted configuration information may include, e.g., the repeated transmission method, number of repeated transmissions, transmission beam mapping unit or scheme, whether a plurality of SRI or TPMI fields may be supported, a plurality of SRS resource sets for codebook or non-codebook, and transient offset-related information when changing transmission beams described below in the following second embodiment. The UE receiving the configuration may identify the number of PUSCH repeated transmissions through the time resource allocation field in the DCI or configured by higher layer signaling. In this case, if the number of repeated transmissions is not larger than 1 (2003), i.e., if repeated transmission is not performed, the UE may perform a first PUSCH transmission operation (2004). The first PUSCH transmission operation may be an operation that transmits the PUSCH a single time with a single TRP using one SRI field, i.e., using one transmission beam, in the case of non-codebook-based PUSCH transmission or using one SRI and TPMI field in the case of codebook-based PUSCH transmission. In a case where the number of repeated transmissions is larger than 2 (2003), if the UE does not receive a configuration capable of supporting a plurality of SRI or TPMI fields from the base station (2005), the UE may perform a second PUSCH transmission operation (2006). The second PUSCH transmission operation is an operation that repeatedly transmits the PUSCH with a single TRP using one SRI field, i.e., using one transmission beam, in the case of non-codebook-based PUSCH transmission or using one SRI and TPMI field in the case of codebook-based PUSCH transmission. Meanwhile, if the UE receives a configuration capable of supporting a plurality of SRI or TPMI fields from the base station (2005), and the plurality of SRI or TPMI fields in the DCI received by the UE indicate the codepoint meaning single TRP-based repeated transmission as described above in connection with the 1-5th and 1-6th embodiments, rather than the codepoint meaning multi-TRP-based repeated transmission (2007), the UE may perform a third PUSCH transmission operation (2008). The third PUSCH transmission operation is an operation that repeatedly transmits the PUSCH with a specific single TRP through the codepoint indicating single TRP transmission among the codepoints in each field, i.e., using one transmission beam, while using two SRI fields for the case of non-codebook-based PUSCH transmission and the two SRI and TPMI fields for the case of codebook-based PUSCH transmission. Accordingly, repeated transmission with 1 TRP or 2 TRP may be indicated depending on which codepoint is indicated through the plurality of SRI or TPMI fields. If the UE receives a configuration capable of supporting a plurality of SRI or TPMI fields from the base station (2005), and the plurality of SRI or TPMI fields in the DCI received by the UE indicate the codepoint meaning multi-TRP-based repeated transmission (2007), the UE may perform a fourth PUSCH transmission operation (2009). The fourth PUSCH transmission operation is an operation that repeatedly transmits the PUSCH with a plurality of TRPs through the codepoint indicating multiple TRP transmissions among the codepoints in each field, i.e., using two transmission beams, while using two SRI fields for the case of non-codebook-based PUSCH transmission and the two SRI and TPMI fields for the case of codebook-based PUSCH transmission. The base station operations in steps 1903 to 1909 of FIG. 19 correspond to the UE operations in steps 2003 to 2009 of FIG. 20, and a specific description thereof is thus omitted.

Second Embodiment: Method for Defining Time Interval Considering UE Capability and Transmitting Uplink Signals As an embodiment of the disclosure, the UE may define a time interval (which may be referred to as, e.g., transient period, transient offset, or transient gap) that may be needed between a plurality of uplink transmissions and perform UE capability reporting or may receive a configuration from the base station and apply the time interval between uplink transmissions during uplink signal transmission considering the same. To transmit an uplink signal, the UE may change at least one of the uplink beam, transmit power, and frequency before signal transmission. The UE may change the panel before signal, to transmit an uplink signal. Thus, the UE may change at least one of the uplink beam, transmit power, frequency, and panel, before signal transmission, to transmit the uplink signal. For example, when multiple beams are divided into multiple beam groups, a panel corresponding to each beam group may be configured, such as panel #1 to beam group #1, panel #2 to beam group #2, . . . . As another example, when a plurality of antenna modules for beam formation are included in the UE, and the plurality of antenna modules are installed in different positions, a panel corresponding to each antenna module may be configured. A plurality of panels may be configured in other various manners capable of dividing multiple beams having different beam widths or beam directions. The change for uplink signal transmission may be performed in at least one of the following cases 1) to 3):

Case 1) When repeatedly changing an uplink signal (e.g., PUCCH or PUSCH or SRS) through multiple TRPs, when changing the uplink beam, transmit power, or frequency to change TRP between repeated transmissions and perform transmission, or when the UE changes TRP between repeated transmissions and performs transmission.

Case 2) When the base station indicates uplink signal transmission through MAC CE signaling or L1 signaling including DCI, when the UE changes uplink beam, transmit power, or frequency to transmit an uplink signal, or when the UE changes the panel to transmit an uplink signal Case 3) When SRS transmission is indicated or configured, when changing the uplink beam, transmit power, or frequency to use multiple SRS resource sets or multiple SRS resources included in the SRS resource set, or when the UE changes the panel to perform SRS transmission The case of changing transmission information for changing the TRP between repeated transmissions in case 1 may be determined according to the mapping pattern between repeated transmission and TRP. Here, repeated transmission means, e.g., transmitting the same uplink signals. The 3GPP Release 16 standard supports two mapping patterns (e.g., 'Sequential' and 'Cyclical') when the base station repeatedly transmits the PDSCH. The mapping pattern for repeatedly transmitting PDSCH through multiple TRPs may be applied when the UE repeatedly transmits the uplink signal through multiple TRPs. 'Sequential' mapping is a scheme of changing TRPs in two repeated transmission units, such as {TRP1, TRP1, TRP2, TRP2}, and transmitting it, and 'Cyclical' mapping is, e.g., a scheme of changing the TRP every repeated transmission, such as {TRP1, TRP2, TRP1, TRP2}, and transmitting it. When at least one of the uplink beam, transmit power, and frequency to be transmitted (or frequency hop) for transmitting an uplink signal through multiple TRPs is determined, the UE may apply uplink transmission change information determined according to the mapping scheme and transmit the uplink signal. Or, when a panel for transmitting an uplink signal through multiple TRPs is determined, the UE may apply the uplink transmission change information determined according to the above-described mapping scheme and transmit the uplink signal. Here, the uplink transmission change information may mean at least one of the uplink beam for transmitting an uplink signal, transmit power, and frequency to be transmitted. Or, the uplink transmission change information may mean a panel for transmitting an uplink signal. Repeatedly transmitting PUSCH through multiple TRPs may include, e.g., PUSCH repeated transmission type A and PUSCH repeated transmission type B, both. PUSCH repeated transmission type B may consider nominal repetition and actual repetition, both, as the repeated transmission unit.

In case 2, the base station may configure a higher layer parameter for uplink signal transmission to the UE and indicate the UE's uplink signal (e.g., PUCCH or PUSCH or SRS) transmission through L1 signaling (e.g., DCI). In this case, the time interval between the signaling for the base station to indicate uplink signal transmission to the UE and the uplink signal transmitted by the UE may be defined as a 'time offset' which may be replaced with, e.g., 'scheduling interval,' 'scheduling offset,' 'time interval,' 'transient period,' 'transient offset,' or 'transient time.' When indicating uplink signal transmission to the UE through L1 signaling including DCI, the time offset may be calculated as 'from the last symbol where the PDCCH including DCI is transmitted to the first symbol where uplink (e.g., aperiodic/semi-persistent SRS or PUCCH including HARQ-ACK for PDSCH or PUSCH) is transmitted.' If the UE's DCI decoding time is further considered, the time offset may be calculated as 'from the last symbol where a PDCCH including DCI is transmitted to the first symbol where an uplink signal is transmitted.' When the base station indicates uplink signal transmission through MAC CE signaling, the time offset may be calculated by at least one of the following methods.

- Method 1: From the end of the last symbol where a PDSCH including MAC CE signaling is transmitted to the start of the first symbol where an uplink signal (e.g., aperiodic/semi-persistent SRS) is transmitted
- Method 2: From the end of the last symbol where PUCCH/PUSCH including HARQ-ACK for PDSCH including MAC CE signaling is transmitted to the start of the first symbol where an uplink signal is transmitted
- Method 3: From the end of the last symbol where PUCCH/PUSCH including HARQ-ACK for PDSCH including MAC CE signaling to the start of the first symbol where an uplink signal is transmitted after the MAC CE application delay time (e.g., to the first slot after 3 ms elapses)

This time offset may be converted into an absolute time unit (e.g., ms) or symbol unit. When receiving an indication of uplink signal transmission from the base station, the UE may change at least one of the uplink beam, transmit power, and frequency for uplink transmission during the time offset. Or, the UE may change the panel for uplink transmission during the time offset.

In case 3, when the UE transmits the SRS scheduled by the base station, the UE may change the uplink beam, transmit power, and frequency according to the higher layer configuration of the SRS resource included in the SRS resource set to be transmitted and transmit it. Or, the UE may change the panel according to the higher layer configuration of the SRS resource and transmit the SRS.

The UE may require a transition time (transient time) to change at least one of the uplink beam, transmit power, and frequency according to UE capability. Or, the UE may require a transition time to change the panel for uplink transmission according to UE capability. The transition time may be considered, e.g., when repeated transmission is performed in long subslot units or in short subslot units. The transition time according to UE capability may apply all or some of the uplink beam, transmit power, or frequency determined to transmit the uplink signal depending on whether it is met during the time offset or between repeated transmissions of uplink signal. As described above, a predetermined time may be required to perform a change to the uplink beam, transmit power, or frequency and, to meet this, an offset interval may be added between the repeated transmissions, or the base station may indicate uplink signal transmission to the UE so that the time offset is larger than a predetermined time for change. Or, a predetermined time may be needed even when a panel change for uplink transmission is additionally performed and, to meet this, an offset interval may be added between repeated transmissions or the base station may indicate uplink signal transmission to the UE so that the time offset is larger than the predetermined time.

Hereinafter, the offset in the time domain for the UE's uplink transmission may be appreciated as encompassing the time interval between the repeated transmissions of uplink signal or the above-described time offset.

A method in which the base station determines an offset in the time domain to ensure the time required to change the uplink beam, transmit power, or frequency according to UE capability and a method in which the UE transmits the uplink signal indicated by the base station are described below in detail in connection with a 2-1th embodiment and a 2-2th embodiment. The 2-1th embodiment and the 2-2th embodiment are so separated for ease of description, and embodiments of the disclosure may be performed alone or in combination.

2-1th Embodiment: Method for Determining an Offset of the Base Station According to UE Capability Report and Configuring the Offset to the UE As an example of the method for determining an offset in the time domain for uplink signal transmission, the UE may report, to the base station, UE capability information including at least one of the UE capability for performing an uplink beam change, the UE capability for performing a transmit power change, and the UE capability for performing a frequency change considering frequency hopping. Or, the three UE capabilities may be individually reported to the base station. The UE may select and report some of the three UE capabilities. The UE may report a representative value of the UE capability for changing the transmission configuration of the uplink signal.

Further, if the UE is able to transmit an uplink signal using multiple panels, the UE capability for a panel change may also be considered in the step of determining the UE capability to be reported. Here, the panel may be understood as the UE's component for managing the antenna or antenna port separately. For example, the panel(s) may be used for efficient power management (the UE may selectively operate ON/OFF of multiple panels depending on the network context) and simultaneous transmission/reception support using multiple beams. This is merely an example, and it should be noted that the definition of the panel is not limited to the above-described example.

In other words, UE capability information including at least one of the UE capability for performing an uplink beam change, the UE capability for performing a transmit power change, the UE capability for performing a frequency change considering frequency hopping, and the UE capability for performing a panel change may be reported to the base station. Or, the four UE capabilities may be individually reported to the base station. The UE may select and report some of the four UE capabilities. The UE may report a representative value of the UE capability for changing the transmission configuration of the uplink signal.

Hereinafter, the terms UE capability and UE capability information or UE capacity that are used interchangeably in the disclosure may be understood to have the same meaning.

This is to provide information necessary for the base station to determine an offset in the case of changing some or all of the uplink beam, transmit power, or frequency when transmitting an uplink signal. Further, if the UE supports a plurality of panels, information for the base station to determine the offset in the case of a panel change may be provided. The UE may report UE capability for each uplink beam change, transmit power or frequency change using one of the following methods. Further, the UE capability for panel change may also be reported using at least one of the following methods:

UE capability for uplink transmission configuration change of 3GPP standard NR Release 15/16 may be reported. For example, the UE may set 'beamSwitchTiming' to one of {14, 28, 48} as in NR Release 15/16 for reporting UE capability for beam change and report it to the base station. The UE may set 'beamSwitchTiming' to one of {224, 336} for reporting UE capability for panel change and report it to the base station. Here, the number indicating the 'beamSwitchTiming' is a symbol unit, e.g., when 'beamSwitchTiming' is set to "224" in the UE capability report for panel change, this means that the processing time for beam switching in UE capability for panel change is 224 symbols. Further, the 'beamSwitchTiming' may be set for each subcarrier spacing.

The time required for change may be reported in symbol or absolute time units (e.g., ms).

The base station and the UE may pre-define a processing time that may indicate processing capability. The processing time for N processing capabilities may be previously defined, and the processing time may differ depending on indicating the subcarrier spacing. Table 32 and Table 33 below show examples of processing times previously defined by the base station and the UE for processing capabilities n and n_1 for uplink beam, transmit power, or frequency change. Here, the value of the required time area may be set to establish the relationship, e.g., {a1<a2<a3<a4}, {b1<a1, b2<a2, b3<a3}. The unit of required time may be set to a symbol or ms.

TABLE 32

| Processing capability n | |
|---|---|
| μ | Required time |
| 0 | a1 |
| 1 | a2 |
| 2 | a3 |
| 3 | a4 |

TABLE 33

| Processing capability n + 1 | |
|---|---|
| μ | Required time |
| 0 | b1 |
| 1 | b2 |
| 2 | b3 |

When the UE reports a processing time for changing at least one of the uplink beam, transmit power, and frequency as UE capability, it may determine a value to be reported considering each uplink signal. For example, when reporting the processing time for uplink beam change as UE capability, the report may be made, with the UE capability divided into the UE capability for beam change for PUCCH, UE capability for beam change for PUSCH, and UE capability for beam change for SRS. The UE capability for transmit power change and the capability for frequency change may also be divided and reported according to PUCCH or PUSCH or SRS in the same manner. When the UE reports UE capability for changing at least one of uplink beam, transmit power, and frequency for PUCCH, the determination may be made considering the number of PUCCH resources, the number of configured spatial relation info, the number of activated spatial relation info, and frequency hopping configuration. When the UE reports UE capability for changing each of the uplink beam, transmit power, and frequency for PUSCH, the determination may be made considering the precoding method for PUSCH (e.g., 'codebook' or 'non-codebook'), the number of SRS resource sets associated with PUSCH transmission, the number of SRS resources configured in the associated SRS resource set, the relationship between the PUSCH and the SRS antenna port, and the frequency hopping configuration. When the UE reports UE capability for changing each of the uplink beam, transmit power, and frequency for SRS, the determination may be made considering SRS transmission indication method (e.g., DCI-based or MAC CE-based), SRS time axis information (e.g., periodic SRS or semi-persistent SRS or aperiodic SRS), the use of SRS (e.g., 'beamManagement' or 'codebook' or 'nonCodebook' or 'antennaSwitching'), the number of SRS resource sets, and the number of SRS resources. Further, when the UE supporting multiple panels reports a processing time for changing the panel as UE capability, it may determine a value to be reported considering the uplink signal. Alternatively, the UE may determine and report UE capability for change of at least one change of the uplink beam, transmit power, and frequency without distinguishing the UE capability for each uplink signal. The UE may determine and report the UE capability for the panel change without distinguishing the UE capability for each uplink signal.

The UE may additionally report UE capability for indicating whether the uplink beam, transmit power, and frequency may be changed simultaneously or sequentially. Here, the UE supporting multiple panels may report whether the panel may be changed simultaneously as the corresponding UE capability. In other words, the UE may report whether the uplink beam, transmit power, frequency, and panel may be changed simultaneously as the corresponding UE capability. As an example of the corresponding UE capability, the UE may select and report one of 'simultaneous' or 'sequential' to the base station. If the UE reports the UE capability as 'simultaneous', it means that the UE may simultaneously change the uplink beam, transmit power, and frequency. The UE supporting multiple panels means that the panels may also be changed at the same time. If the UE reports the UE capability as 'sequential', it means that the UE may sequentially change the uplink beam, transmit power, and frequency. The UE supporting multiple panels additionally means that panels may be sequentially changed.

The UE may report UE capability 'beamCorrespondenceWithoutUL-BeamSweeping' to the base station to indicate whether the beam correspondence requirement is met, in addition to reporting UE capability for supporting the uplink beam, transmit power, frequency, and panel change. The beam correspondence refers to the capability of the UE to select a beam for uplink transmission based on downlink measurement without relying on uplink beam sweeping. If the UE reports that 'beamCorrespondenceWithoutUL-BeamSweeping', which is the UE capability for the beam correspondence, is supportable ('supported'), the UE may select an uplink beam for uplink transmission without uplink beam sweeping, and thereby, transmit the uplink signal.

The base station may determine an offset for securing a required time for applying uplink transmission change information through the UE capability reported by the UE. The base station may determine the offset considering one or a combination of the following options:

- Option 1) The offset may be determined based on the largest value for at least one of UE capability for uplink beam change, UE capability for transmit power change, and UE capability for frequency change reported from the UE.
- Option 2) The offset is determined based on the largest value among UE capabilities for a change required to perform actual uplink transmission among UE capabilities reported from the UE. For example, when the base station indicates an uplink signal to the UE to change only the uplink beam and transmit power, the offset may be determined based on the largest value of the UE capability for uplink beam change and the UE capability for transmit power change. The offset may be determined in the same manner as in the above example for uplink transmission change information combinations other than the above example.
- Option 3) The offset may be determined based on the sum of UE capability for uplink beam change, UE capability for transmit power change, and UE capability for frequency change reported from the UE.
- Option 4) The offset may be determined based on the sum of the UE capabilities for change necessary for performing actual uplink transmission among the UE capabilities reported from the UE. For example, when the base station indicates an uplink signal to the UE to change only the uplink beam and transmit power, the offset may be determined based on the sum of the UE capability for uplink beam change and the UE capability for transmit power change. The offset may be determined in the same manner as in the above example for uplink transmission change information combinations other than the above example.
- Option 5) When the offset is determined through one of options 1 to 4, the offset may be determined considering the configuration of each uplink transmission signal. As an example, when the base station determines the offset for repeatedly transmitting PUCCH through multiple TRPs according to option 1, the offset may be determined based on the UE capability reported by the UE considering the configuration of the PUCCH. Or, when the UE does not distinguish UE capabilities for each uplink signal, the offset may be determined by the base station expecting an additional required time due to PUCCH configuration to the UE capability reported from the UE. This may also be applied when the base station determines an offset for transmitting another uplink signal (e.g., PUSCH or SRS).
- Option 6) When the offset is determined through one of options 1 to 4, the offset may be determined without distinguishing the configuration of each uplink transmission signal.
- Option 7) The base station may determine an arbitrary value as the offset. In this case, the higher layer parameter configuration or uplink resource configuration of the uplink signal may be considered.
- Option 8) When the UE supports multiple panels, the UE capability for panel change may be further considered in determining the offset through options 1 to 6.

Each option is an example of the case where the UE reports all of the UE capabilities for three types of uplink transmission change information. If the UE reports only some of the UE capabilities, the base station may determine the offset by applying only the reported UE capabilities to each option.

When the UE reports that the uplink beam, transmit power, and frequency may be simultaneously changed, the base station may select option 1 or option 2 to determine the offset. When the UE reports that the uplink beam, transmit power, and frequency may be sequentially changed, the base station may select option 3 or 4 to determine the offset. When the UE supports multiple panels and reports that the uplink beam, transmit power, frequency, and panel (or at least two or more thereof) may simultaneously be changed, the base station may further consider the UE capability for panel change in option 1, according to option 8, so as to determine the offset or may further consider the UE capability for panel change in option 2, according to option 8, so as to determine the offset. This is an example of the above embodiment, and the base station may determine the offset considering one or a combination of options 1 to 8 described above according to the UE capability reported by the UE.

The base station may adjust the offset value determined by the above-described options according to whether the UE supports the beam correspondent reported through the UE capability. For example, if the UE supports beam correspondence, the base station may determine the offset value determined through the above options as the final offset value or adjust it to a smaller value. Meanwhile, if the UE does not support beam correspondence, the base station may add an additional required time to the offset value determined through the above options.

The base station may adjust the offset value determined by the above-described options according to whether the UE reports on the uplink beam to be transmitted on the uplink for multiple TRPs. This may mean that if the uplink beam is reported to the base station, the corresponding uplink beam is a 'known' beam for the UE. If the uplink beam is not reported to the base station, it may mean that the corresponding uplink beam is an 'unknown' beam for the UE. If the UE reports the uplink beam to be transmitted on uplink to the base station, the base station may determine the offset value determined through the above options as the final offset value or adjust it to a smaller value. Meanwhile, if the UE does not report the uplink beam to be transmitted on uplink to the base station, the base station may add an additional required time to the offset value determined through the above options.

The base station may inform the UE of the determined offset. In this case, the base station may explicitly or implicitly inform the UE of the offset as in the following example:

When the base station explicitly configures the determined offset to the UE: The base station may configure the offset with a new higher layer parameter and explicitly inform the UE of it. As an example, the new higher layer parameter 'timeDurationForULSwitch' may be added to configuration information for PUCCH transmission, such as PUCCH-FormatConfig or PUCCH-ConFIG. Similarly for PUSCH or SRS, a new parameter for offset may be added to a higher layer parameter for PUSCH transmission and a higher layer parameter for SRS transmission. The above example is one of the methods of configuring a new higher layer parameter for indicating the offset determined by the base station to the UE and may be defined as a higher layer parameter with a different name having the same function.

When the base station implicitly indicates the determined offset: The base station may implicitly indicate the offset through other configuration(s) for transmitting an uplink signal rather than directly configuring the offset with the higher layer parameter. As an example, it may be indicated through 'startingSymbolIndex' configured in PUCCH-format[a] (where a is, e.g., 0, 1, 2, 3 or 4) in the higher layer parameter PUCCH-Resource. More specifically, as an example of one of the reinforcement methods for indicating repeated transmission of PUCCH in the slot, the startingSymbolIndex in PUCCH-format[a] of PUCCH-Resource may be configured as many times as the number of repetitions of PUCCH in the slot. As a detailed example, if the number of repetitions in the slot is, e.g., 2, the startingSymbolIndex indicates the transmission start symbol of the first PUCCH repeated transmission occasion in the slot, and 'startingSymbolIndex2' that may be newly added may indicate the transmission start symbol of the second PUCCH repeated transmission occasion in the slot. In this case, the symbol position indicated by startingSymbolIndex must be earlier than the symbol position indicated by startingSymbolIndex2, and the interval between two symbols may be set by the base station so that it becomes a value larger than the offset determined by the base station and one PUCCH transmission symbol nrofSymbols. The above example is merely an example, and the base station may inform the UE of the offset implicitly through PUCCH resource configuration for PUCCH transmission. Alternatively, when the base station schedules the PUCCH including the HACK information for the PDSCH to the UE, the PDSCH-to-HARQ_feedback timing indicator may be indicated to the UE so that the time offset becomes a larger value than the determined offset. For other uplink signals (e.g., PUSCH or SRS) than PUCCH, the UE may be implicitly informed of the offset through the transmission timing indicated by DCI or the higher layer parameter of the uplink signal.

2-2th Embodiment: Method for Transmitting the Uplink Signal Indicated from the Base Station According to UE Capability When the UE is instructed to repeatedly transmit an uplink signal from the base station, the UE may determine an operation for repeated uplink transmission according to whether the offset determined by the base station is explicitly configured or is implicitly indicated. If the UE is explicitly configured with the offset by the base station, the UE may transmit an interval between repeated transmissions according to the offset in the time domain and transmit the uplink signal. If the UE is implicitly informed of offset, the UE transmits the uplink signal according to the higher layer parameter configuration for the uplink signal configured by the base station. When the UE is explicitly configured with the offset or is implicitly informed of the offset and applies it to repeated transmission of uplink signal, it may change at least one of the uplink beam, transmit power, and frequency during the offset depending on the UE capability and transmit it. If the offset determined by the base station is set to be larger than the UE capability for changing uplink beam, transmit power, or frequency, the UE may change the uplink beam or transmit power to change TRP between repeated transmissions and transmit it or may perform a frequency change for frequency hopping. If the offset determined by the base station is set to be smaller than the UE capability for changing transmit power or frequency, the base station and the UE may previously define a default uplink transmission method considering one or a combination of the following operations to repeatedly transmit the uplink signal.

Transmitting the uplink signal with the same uplink beam, transmit power and frequency as the previous repeated transmission: Since the offset determined by the base station is smaller than the UE capability, the UE cannot meet the time for changing the beam or transmit power or frequency between repeated transmissions. Therefore, the UE may perform the next repeated transmission with the beam, transmit power and frequency applied to the previous repeated transmission. Here, the previous repeated transmission means the repeated transmission occasion immediately before the repeated transmission occasion to be transmitted. Further, it is possible to use at least one of the uplink beam, transmit power, and frequency identical to the previous (repeated) transmission to change the rest. For example, the same uplink beam and frequency as the previous (repeated) transmission may be used, and the transmit power may be changed for the next repeated transmission.

Transmitting the uplink signal with the uplink beam, transmit power and frequency set as default: Since the offset determined by the base station is smaller than the UE capability, the UE cannot meet the time for changing the beam or transmit power or frequency between repeated transmissions. Therefore, the UE may perform the next repeated transmission with the default uplink beam, default transmit power and default frequency as previously defined. Here, the base station and the UE may define default transmission information for each uplink signal (PUCCH, PUSCH, or SRS). Alternatively, the base station and the UE may define default transmission information commonly for the uplink signal. Further, at least one of the uplink beam, transmit power, and frequency may be used as default configuration, and the rest may be changed. For example, the uplink beam and frequency may be used as the default configuration, and the transmit power may be changed for the next repeated transmission.

Conditionally changing the uplink beam, transmit power, or frequency and transmitting the uplink signal: If the mapping between the uplink repeated transmission and the TRP is set to 'Sequential', the uplink beam, transmit power, or frequency may be changed and transmitted on a repeated transmission occasion that meets the UE capability. On the repeatedly transmission occasion failing to meet the UE capability, the UE may transmit the uplink signal with the same configuration as the previous repeatedly transmission occasion. For example, if the mapping is configured as {TRP1, TRP1, TRP2, TRP2}, the first two repeated transmission occasions are transmitted with the uplink beam, transmit power and frequency for TRP1. The third repeated transmission occasion should be changed with the uplink beam, transmit power and frequency for TRP2 and transmitted, but since the offset is smaller than UE capability, the UE transmits an uplink signal with the configuration for TRP1 without changing uplink transmission information. The UE may change to the uplink beam, transmit power, and frequency for TRP2 and transmit the fourth repeatedly transmission occasion.

Repeatedly transmitting uplink signal by applying a changeable configuration among the uplink beam, transmit power, or frequency When the UE compares the size between the offset set by the base station and the UE capability, the UE may apply some changeable configurations in which the UE capability is smaller than the offset among the UE capabilities to the next repeated transmission occasion. For example, if the offset is larger than the UE capability for uplink beam change and is smaller than the UE capability for transmit power change or frequency change, the UE may change only the uplink beam and apply the same repeatedly transmission occasion as the previous repeatedly transmission occasion, for the transmit power and frequency, and transmit the next repeatedly transmission occasion. If the UE sequentially changes the uplink beam, transmit power, and frequency, it compares the offset determined by the base station with a combination of the UE capabilities for uplink beam, transmit power, and frequency change. In this case, if the combination is smaller than the offset, it is determined depending on the priority for uplink beam, transmit power, and frequency change, previously determined between the base station and the UE. For example, if the offset determined by the base station is smaller than the sum of all the UE capabilities, the sum of the UE capabilities for uplink beam and transmit power change, the sum of the UE capabilities for uplink beam and frequency change, and the sum of the UE capabilities for transmit power and frequency change are smaller than the offset, and the base station and the UE previously defines priority, e.g., {uplink beam>transmit power>frequency}, the UE may change the uplink beam and the transmit power and transmit the uplink signal.

Dropping some symbols or repeatedly transmission occasion and transmitting uplink signal: To apply the uplink transmission change information and repeatedly transmit the uplink signal, the UE may drop front some symbols in the repeatedly transmission occasion to change at least one of the beam, transmit power, and frequency and transmit it through the remaining resources. For example, if the mapping between repeated PUCCH transmission and TRP is set as {TRP1, TRP1, TRP2, TRP2}, in the third repeated transmission, no PUCCH is transmitted during the front symbols until the required time for changing the uplink beam, transmit power, and frequency for TRP2 is met. For the remaining symbols after meeting the required time for changing the uplink beam, transmit power, and frequency, the UE may repeatedly transmit the third PUCCH.

As an example, if the required time for uplink beam, transmit power, and frequency change for repeated transmission for which TRP is changed is not met, the UE may drop the corresponding uplink repeated transmission occasion. For example, if the mapping between PUCCH repeated transmission and TRP is set as {TRP1, TRP1, TRP2, TRP2}, the third PUCCH repeated transmission occasion may be dropped. Thereafter, the fourth PUCCH repeated transmission occasion may be transmitted, with the uplink beam, transmit power, and frequency changed for TRP2. As another example, if the mapping between PUCCH repeated transmission and TRP is set as {TRP1, TRP2, TRP1, TRP2}, the second and fourth PUCCH repeated transmission occasions may be dropped, and a single TRP-based PUCCH repeated transmission may be supported.

If PUCCH repeated transmission is performed considering the channel status for each TRP through the methods provided herein, an increase in coverage of uplink control signals may be expected. Further, since transmit power is controlled for each transmission reception point, efficient battery management of the UE may be expected.

This may be equally applied to a size relationship between the time offset for uplink signal transmission and UE capability. If the time offset is larger than the UE capability for changing the uplink beam, transmit power, or frequency, the UE may transmit the uplink signal. If the time offset is smaller than the UE capability for changing the uplink beam or transmit power or frequency, the UE may transmit the uplink signal considering one or a combination of the following operations similarly to the above case in which the offset between repeated transmissions does not meet the UE capability.

Transmitting the uplink signal with the same uplink beam, transmit power and frequency as the previous uplink signal transmission Transmitting the uplink signal with the uplink beam, transmit power and frequency set as default Repeatedly transmitting uplink signal by applying a changeable configuration among the uplink beam, transmit power, or frequency Dropping some symbol of the first repeated transmission occasion or the first repeated transmission occasion and transmitting the uplink signal The operations according to the above conditions have been described with respect to a method for a UE supporting a single panel to change the uplink beam, transmit power, or frequency. If the UE may support multiple panels, the UE identifies whether the offset determined by the base station is set to be smaller than the UE capability for uplink beam or transmit power or frequency or panel change/switching. If the offset determined by the base station is larger than the UE capability for changing the uplink beam, transmit power, frequency, or panel, the UE may transmit the uplink signal. If the offset is set to be smaller than the UE capability for changing/switching the uplink beam or transmit power or frequency or panel, the UE may transmit the uplink signal according to one or a combination of the following operations, further considering the UE capability for panel change/switching similarly to the above case in which the offset between repeated transmissions does not meet the UE capability.

Transmitting the uplink signal with the same uplink beam, transmit power, frequency, and panel as the previous uplink signal transmission Transmitting the uplink signal with the uplink beam, transmit power, frequency, and panel set as default Repeatedly transmitting uplink signal by applying a changeable configuration among the uplink beam, transmit power, frequency, or panel Dropping some symbol of the first repeated transmission occasion or the first repeated transmission occasion and transmitting the uplink signal Here, the previous uplink signal means the most recently transmitted physical channel as the uplink signal (PUCCH, PUSCH, or SRS) to be transmitted. The base station and the UE may define default transmission information for each uplink signal (PUCCH, PUSCH, or SRS). Alternatively, the base station and the UE may define default transmission information commonly for the uplink signal.

Third Embodiment: Method for Triggering Power Headroom Reporting for PUSCH Repeated Transmission Considering Multiple TRPs and Configuring Reported Power Headroom Information According to the third embodiment of the disclosure, a method for triggering power headroom reporting (PHR) for PUSCH repeated transmission considering multiple TRPs and a method for configuring power headroom information reported to the base station through power headroom reporting triggered by the corresponding method are described. The power headroom report means measuring the difference (i.e., transmit power available to the UE) between the UE's nominal UE maximum transmit power and estimated power for uplink transmission by the UE and transmitting it to the base station. The power headroom report may be used to support power aware packet scheduling. The estimated power for uplink transmission may be, e.g., estimated power for UL-SCH (PUSCH) transmission per activated serving cell, estimated power for PUCCH transmission and UL-SCH in the SpCell of another MAC entity (e.g., E-UTRA MAC entity in EN-DC, NE-DC, and NGEN-DC cases in the 3GPP standard), or estimated power for SRS transmission per activated serving cell.

When the UE is able to perform PUSCH repeated transmission considering multiple TRPs, the UE performs UE capability reporting related thereto. The base station may configure, to the UE, higher layer parameters for the UE to repeatedly transmit the PUSCH considering multiple TRPs (e.g., higher layer parameters for configuring two or more SRS resource sets in which the usage is set to codebook or nonCodebook, configuring two or more transmit power parameter sets for PUSCH transmission, or configuring two or more TPMI areas (in the case of codebook-based PUSCH transmission) and SRI areas in DCI) as in the above-described embodiments. Additionally, the UE may perform UE capability reporting indicating that power headroom reporting considering multiple TRPs may be performed as the PUSCH is repeatedly transmitted considering multiple TRPs when reporting the UE capability. The base station may configure, to the UE through, e.g., higher layer signaling information (or configuration information) such as RRC information, the higher layer parameter for supporting an enhanced power headroom report based on the UE capability for power headroom reporting considering multiple TRPs reported from the UE. In this case, as an example of the higher layer parameter for power headroom report considering multiple TRPs, the base station may additionally configure, e.g., phr-Tx-PowerFactorChange, phr-Prohibit-Timer, mpe-Threshold for each TRP, to the UE considering the multiple TRPs. The description of an example of configuration information for power headroom reporting and each parameter is given in Tables 34 and 35 below.

TABLE 34

PHR-Config information element

```
-- ASN1START
-- TAG-PHR-CONFIG-START
PHR-Config ::=                SEQUENCE {
   phr-PeriodicTimer                ENUMERATED {sf10, sf20, sf50, sf100,
sf200, sf500, sf1000, infinity},
   phr-ProhibitTimer                ENUMERATED {sf0, sf10, sf20, sf50,
sf100,sf200, sf500, sf1000},
   phr-Tx-PowerFactorChange          ENUMERATED {dB1, dB3, dB6, infinity},
   multiplePHR                   BOOLEAN,
   dummy                      BOOLEAN,
   phr-Type2OtherCell               BOOLEAN,
   phr-ModeOtherCG                 ENUMERATED {real, virtual},
   ...,
   [[
   mpe-Reporting-FR2-r16             SetupRelease { MPE-Config-FR2-r16 }
OPTIONAL -- Need M
   ]]
}
MPE-Config-FR2-r16 ::=          SEQUENCE {
   mpe-ProhibitTimer-r16             ENUMERATED {sf0, sf10, sf20, sf50,
sf100, sf200, sf500, sf1000},
   mpe-Threshold-r16                ENUMERATED {dB3, dB6, dB9, dB12}
}
-- TAG-PHR-CONFIG-STOP
-- ASN1STOP
```

TABLE 35

| PHR-Config field descriptions |
|---|
| dummy<br>This field is not used in this version of the specificationand the UE ignores the resolved value. |
| mpe-ProhibitTimer<br>Value in number of subframes for MPE reporting, as specified in TS 38.321 [3]. Value sf10 corresponds to 10 subframes, and so on. |
| mpe-Reporting-FR2<br>Indicates whether the UE shall report MPE P-MPR in the PHR MAC control element, as specified in TS 38.321 [3]. |
| mpe-Threshold<br>Value of the P-MPR threshold in dB for reporting MPE P-MPR when FR2 is configured, as specified in TS 38.321 [3]. The same value applies for each serving cell (although the associated functionality is performed independently for each cell). |
| multiplePHR<br>Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases. |
| phr-ModeOtherCG<br>Indicates the mode (i.e. real or virtual) used for the PHR of the activated cells that are part of the other Cell Group (i.e. MCG or SCG), when DC is configured. If the UE is configured with only one cell group (no DC), it ignores the field. |
| phr-PeriodicTimer<br>Value in number of subframes for PHR reporting as specified in TS 38.321 [3]. Value sf10 corresponds to 10 subframes, value sf20 corresponds to 20 subframes, and so on. |
| phr-ProhibitTimer<br>Value in number of subframes for PHR reporting as specified in TS 38.321 [3]. Value sf0 corresponds to 0 subframe, value sf10 corresponds to 10 subframes, value sf20 corresponds to 20 subframes, and so on. |
| phr-Tx-PowerFactorChange<br>Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell). |
| phr-Type2OtherCell<br>If set to true, the UE shall report a PHR type 2 for the SpCell of the other MAC entity. See TS 38.321 [3], clause 5.4.6. Network sets this field to false if the UE is not configured with an E-UTRA MAC entity. |

In the 3-1th embodiment, an enhanced power headroom reporting method for supporting the PUSCH for each TRP with efficient transmit power when a higher layer parameter for power headroom reporting considering multiple TRPs configured based on the UE capability report is configured is described. In the 3-2th embodiment, a method for determining the TRP in which the power headroom information is reported to the base station when power headroom reporting is triggered in the 3-1th embodiment is described.

3-1th Embodiment: Enhanced Power Headroom Report Triggering Method for PUSCH Repeated Transmission Considering Multiple TRPs In the 3-1th embodiment as an embodiment of the disclosure, an enhanced power headroom report triggering method for performing power headroom reporting considering multiple TRPs when the UE (repeatedly) transmits the PUSCH considering multiple TRPs is described in detail.

The UE may identify various conditions to trigger whether to perform the power headroom reporting. In this case, if at least one of the several conditions is met, the UE triggers power headroom reporting, if the higher layer parameter multiplePHR is set to 'true' in the UE, power headroom reporting is performed through the MAC CE for power headroom reporting for multiple supporting cells, and if multiplePHR is not set to 'true,' type 1 power headroom (power headroom for PUSCH transmission) reporting on the PCell is performed through the MAC CE for power headroom reporting having a single entry. Conditions for triggering power headroom reporting in the disclosure are as follows:

[Trigger condition 1] The pathloss for at least one activated supporting cell in which the downlink bandwidth part activated when the MAC entity has uplink resources for new transmission and the higher layer parameter phr-PrhoibitTimer expires is not the dormant bandwidth part changes larger than the higher layer parameter phr-Tx-PowerFactorChange dB after the latest PHR transmission. In this case, the pathloss change on one cell is determined by comparing the pathloss currently measured for the current pathloss reference and the pathloss measured at a corresponding time for the pathloss reference at the latest PHR transmission time.

[Trigger condition 2] The higher layer parameter phr-PeriodicTimer expires.

[Trigger condition 3] Setting or resetting the power headroom reporting function by a higher layer, not setting or resetting not to support power headroom reporting, is performed.

[Trigger condition 4] Activate the SCell for a certain MAC entity having an uplink where firstActiveDownlinkBWP-Id is not set to the dormant bandwidth part. The firstActiveDownlinkBWP-Id means the identifier (when it is configured for the SpCell) of the DL BWP to be activated when RRC (re) setting is performed or the identifier (when it is configured for the SCell) of the DL BWP to be used when the SCell is activated.

[Trigger condition 5] Add PSCell (i.e., PSCell is newly added or changed)

[Trigger condition 6] Meet a) and b) below for certain activated supporting cells of a certain MAC entity having an uplink configured when the higher layer parameter phr-PrhoibitTimer expires, and the MAC entity has uplink resources for new transmission:

There are uplink resources allocated for transmission or PUCCH is transmitted to the cell.

When the MAC entity has uplink resources for transmission or PUCCH is transmitted to the corresponding cell, the power backoff required for power management on the corresponding cell is larger than the higher layer parameter phr-Tx-PowerFactorChange dB after the latest PHR transmission.

[Trigger condition 7] Change the activated bandwidth part of the SCell for a certain MAC entity having a configured uplink from the dormant bandwidth part to the non-dormant downlink bandwidth part.

[Trigger condition 8] When the higher layer parameter mpe-Reporting-FR2 for indicating whether to report the maximum allowed UE output power reduction (MPE P-MPR) to meet the maximum permissible exposure (MPE) in FR2 is configured in the UE, and power headroom reporting is referred to as 'MPE P-MPR report' when the mpe-ProhibitTimer does not operate, the measured P-MPR applied to meet the FR2 MPE requirement for at least one activated FR2 supporting cell after the latest power headroom reporting is equal to or larger than the higher layer parameter mpe-Threshold.

According to the above conditions, power headroom reporting may be triggered, and the UE may determine power headroom reporting according to the following additional conditions.

[Additional condition according to temporary required power backoff] When the required power backoff is temporarily (i.e., within a few tens of milliseconds) reduced due to power management, the MAC entity should not trigger power headroom reporting. When the required power backoff is temporarily reduced, and power headroom reporting is triggered by other trigger conditions, the value $P_{CMAX,f,c}$/PH which indicates the ratio between the maximum power and the remaining (available) power should not be temporarily reduced. In other words, the PHR should not be triggered due to temporary power backoff. For example, a condition is added so that when the PHR is triggered due to other PHR trigger conditions (e.g., expiration of periodictimer), the PH reflecting the temporary power reduction due to the required power backoff is not reported, but the PH without the influence of the required power backoff is reported.

[Power headroom report condition according to UE implementation] If one HARQ process is configured as cg-RetransmissionTimer, and the power headroom report is already included in the MAC PDU for transmission by the corresponding HARQ process, but transmission through a lower layer is not yet performed, a method for processing the content of the power headroom report is determined according to the UE implementation.

If the UE triggers power headroom reporting and reports the power headroom for the PUSCH to the base station, the UE may calculate the type 1 of power headroom based on the actual transmission for PUSCH transmission occasion i as in Equation 7 or calculate on the reference PUSCH transmission as in Equation 8 below.

$$PH_{type1,b,f,c}(i, j, q_d, I) = P_{CMAX,f,c}(i) - \{P_{O_{PUSCH},b,f,c}(j) + 10\log_{10}(2^{\mu} \cdot M^{PUSCH}_{RB,b,f,c}(i)) + \alpha_{b,f,c}(j) \cdot PL_{b,f,c}(q_d) + \Delta_{TF,b,f,c}(i) + f_{b,f,c}(i, l)\}[\text{dB}] \quad \text{[Equation 7]}$$

$$PH_{type1,b,f,c}(i,j,q_d,l) = P_{CMAX,f,c}(i) - \{P_{O_{PUSCH},b,c}(i) + \alpha_{b,f,c}(j) \cdot PL_{b,f,c}(q_d) + f_{b,f,c}(i,l)\} \quad \text{[Equation 8]}$$

[dB]

In Equation 7, power headroom information may be configured by calculating the difference in transmit power for PUSCH transmission occasion i to the maximum output power and, in Equation 8, power headroom information may be configured by calculating the difference in reference PUSCH transmit power using the default transmit power parameter (e.g., $P_{O\_NOMINAL\_PUSCH,f,c}(0)$, alpha and P0 of P0-PUSCH-AlpahSet where p0-PUSCH-AlphaSetId=0, $PL_{b,f,c}(q_d)$ corresponding to pushc-PathlossReferenceRS-Id=0, and closed loop power adjustment value where closed loop index I=0) and $\tilde{P}_{CMAX,f,c}(i)$ which is the maximum output power when the maximum power reduction (MPR)-related parameters (e.g., MPR, additional MPR (A-MPR), or power management MPR (P-MPR)) and $\Delta\tau_c$ are assumed to be 0. For the description of each variable in Equations 7 and 8, refer to the description of the variables in Equation 6. The A-MPR is an MPR that meets the additional emission requirement (e.g., if the additionalSpectrumEmission indicated by RRC and NR freq. band are combined (Table 6.2.3.1-1A in TS 38.101-1), the network signaling label is grasped, and the A-MPR value thereby is defined as Table 6.2.3.1-1 in TS 38.101-1) indicated by the base station by higher layer signaling. The P-MPR is an MPR that is maximum allowed UE output power reduction for serving cell c and meets the applicable electromagnetic energy absorption requirements. For the A-MPR and P-MPR, refer to 3GPP standard TS 38.101-1 section 6.2.

If PUSCH is transmitted considering a single TRP, the UE may determine whether to trigger power headroom reporting according to at least one of [trigger condition 1] to [trigger condition 8]. However, when transmitting PUSCH considering multiple TRPs, [trigger condition 1] to [trigger condition 8] do not determine whether to perform power headroom reporting considering multi-TRP-based PUSCH transmission and may thus have limitations in determining whether to perform power headroom reporting on multiple TRPs. For example, if power headroom reporting is performed on one serving cell, only one power headroom information is calculated and is reported to the base station through the MAC CE. If whether to perform power headroom reporting is triggered by [trigger condition 1], in the case of single. TRP-based PUSCH transmission, one pathloss value is defined between the base station and the UE at a previous power headroom reporting time, and one pathloss value is defined between the base station and the UE for the current PUSCH transmission, so that it is possible to grasp whether it is larger/smaller than phr-Tx-PowerFactorChange dB which is the threshold by comparing the two pathloss values.

If the UE transmits the PUSCH based on multiple TRPs, the UE individually calculates the transmit power according to the TRP to transmit the PUSCH, applies uplink spatial relation for each TRP, and transmits the PUSCH. More specifically, for the UE which repeatedly transmits the PUSCH based on multiple TRPs, the base station may configure higher layer parameters for transmitting the PUSCH through each TRP as described above in connection with the first embodiment (e.g., two or more SRS resource sets in which usage is ‘codebook’ or ‘nonCodebook’ are configured or two or more transmit power parameter sets are configured). Thereafter, two or more SRS resource indicators (hereinafter, SRI) fields may be indicated by scheduling DCI for repeatedly transmitting the PUSCH through multiple TRPs (or when the higher layer parameter for configured grant PUSCH considering multiple TRPs is configured, the higher layer parameter for transmitting the corresponding configured grant PUSCH is configured). The UE determines the spatial relation with the transmit power for the first TRP according to the first SRI field of the two SRI fields and determines the spatial relation with the transmit power for the second TRP according to the second SRI field of the two SRI fields. Accordingly, the transmit power of the PUSCH transmitted through each TRP may differ. This is because as the channels between the UE and each TRP differ, the pathloss values between the UE and each TRP differ, and PUSCH transmit power is determined based on the transmit power parameter for each TRP.

Figure 21:
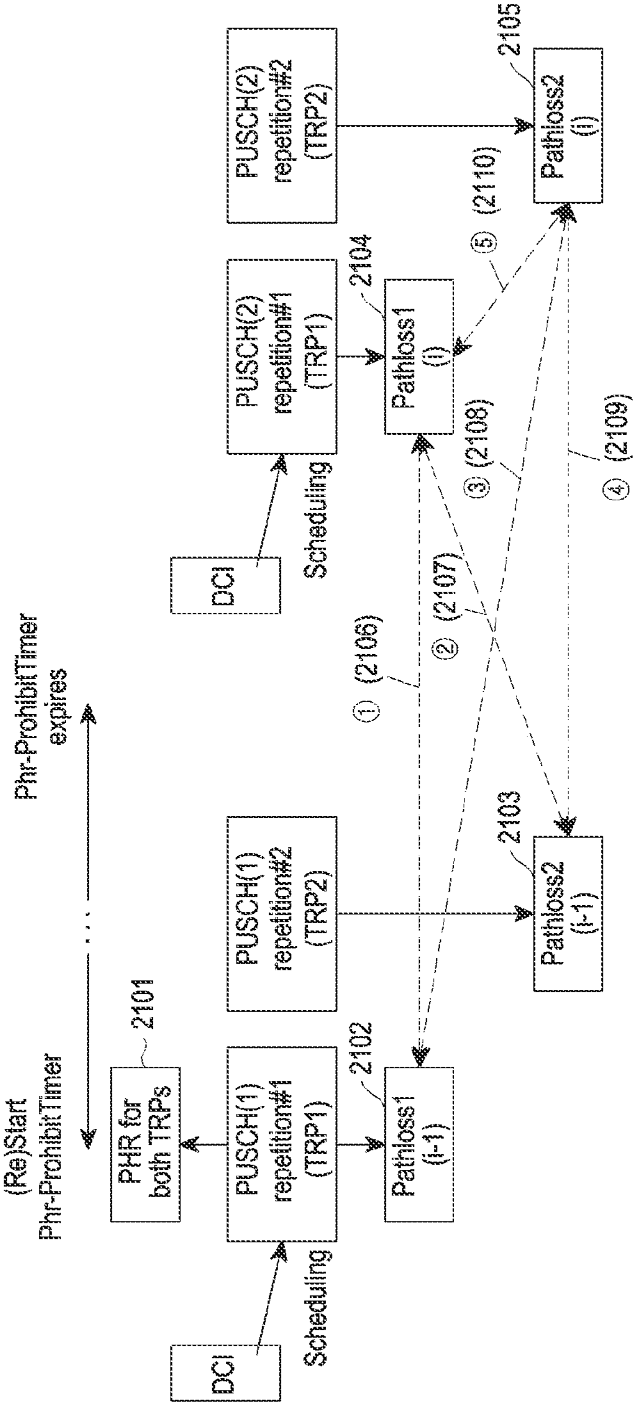
FIG. 21 is a view illustrating a method for comparing pathlosses upon PUSCH repeated transmission considering two TRPs scheduled based on a single DCI according to an embodiment of the disclosure.

FIG. 21 is a view illustrating a method for comparing pathlosses upon PUSCH repeated transmission considering multiple TRPs scheduled based on a single DCI according to an embodiment of the disclosure.

Referring to FIG. 21, in a method for comparing pathlosses upon PUSCH repeated transmission considering multiple TRPs (e.g., two TRPs) scheduled based on a single DCI, triggering power headroom reporting (e.g., two PHRs) based on a variation in pathloss using a plurality of pathlosses due to multiple links between the multiple TRPs and the UE may be performed according to methods 1 and 2 as follows. In this case, it may be assumed that if power headroom reporting is triggered, power headroom information about all TRPs is reported, and is transmitted through all PUSCHs repeatedly transmitted. A method for determining the TRP where power headroom is reported on the triggered power headroom report is described in detail in the following 3-2th embodiment.

[Method 1] Power headroom report trigger according to [trigger condition 1] described above: Upon multi-TRP-based PUSCH repeated transmission, the UE calculates the variation in pathloss based on the pathloss of the TRP for the PUSCH first repeatedly transmitted and phr-ProhibitTimer expires, and triggers power headroom reporting when the variation is phr-Tx-PowerFactorChange dB which is the threshold. In this case, it may be defined as a variation (①(2106) of FIG. 21) between a pathloss between the TRP and UE for the first PUSCH of the PUSCH repeated transmission to be currently transmitted (hereinafter, defined as 'current pathloss 1' 2104 of FIG. 21) and a pathloss between the TRP and UE for the first PUSCH of the PUSCH repeated transmission transmitted when reporting the latest reported power headroom report (hereinafter, defined as 'past pathloss 1', 2102 of FIG. 21). If current pathloss 1 and past pathloss 1 are pathlosses between TRP1 and the UE, the UE may not trigger power headroom report of 4 of FIG. 21 considering the pathloss between TRP2 and the UE. Unlike in the example of FIG. 21, if the first PUSCH of the PUSCH repeated transmission is transmitted through TRP2 (hereinafter, when PUSCH repetition #1 is transmitted through TRP2, and PUSCH repetition #2 is transmitted through TRP1, e.g., PUSCH repetition is performed in order of {TRP2, TRP1, TRP2, TRP1,T}) so that current pathloss 1 and past pathloss 1 are pathlosses between TRP2 and the UE, the UE may not trigger power headroom reporting considering TRP1. If current pathloss 1 is a pathloss between TRP1 and the UE, and past pathloss 1 is a pathloss between TRP2 and the UE, the UE may not perform power headroom report triggering comparing the previous and current pathlosses for TRP1 or comparing the previous and current pathlosses for TRP2. The above description is merely an example, and the definitions may be made in various manners depending on previously defined settings between the base station and the UE or the last PUSCH, rather than the first PUSCH of the repeated transmission. Even in such a case, it is possible to perform power headroom report triggering by comparing only some pathlosses rather than considering all pathlosses due to multiple TRPs.

[Method 2] Power headroom report trigger according to enhanced [trigger condition 1] considering pathloss for multiple TRPs Method 2 is a method for enhancing [trigger condition 1] using the pathloss used for a plurality of PUSCH transmissions transmitted through multiple TRPs, rather than one PUSCH transmission. Pathloss change-based power headroom report triggering may be performed considering all or some of the current pathlosses (hereinafter, defined as 'current pathloss 1' and 'current pathloss 2', 2104 and 2105 of FIG. 21) determined by two or more SRIs indicated from the DCI scheduling the PUSCH (or the higher layer parameter rrc-ConfiguredUplinkGrant in the case of configured grant (CG) PUSCH) and all pathlosses for PUSCH repeated transmission transmitted upon the latest reported power headroom report (hereinafter, defined as 'past pathloss 1' and 'past pathloss 2', 2102 and 2103 of FIG. 21). In this case, the method may be divided into a sub method that considers only the pathloss variation of the same TRP and a sub method that considers the pathloss variation between different TRPs as well as the pathloss variation for the same TRP. The GC PUSCH means a PUSCH that is transmitted according to the configured grant by RRC, rather than being based on the dynamic grant (DCI).

If power headroom report triggering is performed considering only the pathloss variation for the same TRP, the UE compares the pathloss variation corresponding to ①(2106) and ④(2109) of FIG. 21 with phr-Tx-PowerFactorChange dB which is the threshold and, if at least one pathloss variation is larger than the threshold, triggers power headroom reporting. Alternatively, if the two pathloss variations both are larger than the threshold, the UE may trigger power headroom reporting. In the case where PUSCH is repeatedly transmitted through two or more TRPs, if M or more pathloss variations previously defined between the base station and the UE among all the pathloss variations are larger than the threshold, the UE may trigger power headroom reporting. In this case, M ($M \in \{1, 2, \ldots, N\}$, which may be assumed to be M=1 unless set otherwise) may be set in the UE by the base station through a higher layer parameter. Such pathloss variation comparison may be performed on multiple activated supporting cells and, if M or more pathloss variations are larger than the threshold for at least one activated supporting cell, the UE triggers power headroom reporting. The threshold for comparing the per-TRP pathloss variations may be set for each TRP. Since the coverage of each TRP may differ, and some TRPs may be significantly influenced by pathloss variations while other TRPs may be less influenced by pathloss variations, a new threshold for considering the coverage characteristics of each TRP may be added as a higher layer parameter. As an example, a new higher layer parameter (e.g., phr-Tx-PowerFactorChange1-r17 to phr-Tx-PowerFactorChangeN-r17, hereinafter simply referred to as threshold1 to thresholdN) for indicating a new threshold considering multiple TRPs may be added in the PHR-Config of Table 34 exemplified as higher layer configuration information. Alternatively, a plurality of PHR-Config's may be configured each of which may be used as higher layer configuration information for triggering power headroom reporting for the TRP. Here, N means the total number of multiple TRPs supported by the UE. If threshold 1 and threshold 2 are added to support TRP1 and TRP2, the UE may compare the pathloss variation corresponding to ①(2106) of FIG. 21 with threshold 1 and compare the pathloss variation corresponding to ④(2109) of FIG. 21 with threshold 2 and perform power headroom report triggering. In the above-described 1-5th embodiment and 1-6th embodiment, if the above-described dynamic switching between the single TRP and multiple TRPs is supported, power headroom reporting triggering may be performed additionally considering the pathloss variation corresponding to ②(2107) or ③(2108) of FIG. 21. If the UE performs single-TRP-based PUSCH repeated transmission with TRP1 at the previous power headroom reporting time, schedules multi-TRP-based PUSCH repeated transmission with TRP1 and TRP2 at the current time, and determines whether to trigger power headroom reporting, the UE may compare the pathloss variations corresponding to ①(2106) and ③(2108) of FIG. 21 with the threshold. In this case, a new threshold for the pathloss variation between different TRPs may be further considered and, similar to considering a new threshold described above, the base station may configure a new higher layer parameter (e.g., phr-Tx-PowerFactorChangeXTRP-r17, hereinafter simply referred to as thresholdX) to the UE. In other words, the UE may compare ①(2106) of FIG. 21 with threshold 1 in the above example and compare ③(2108) with thresholdX and, if M or more pathloss variations are larger than the threshold, trigger power headroom reporting. Alternatively, the UE may determine to trigger power headroom reporting using only phr-Tx-PowerFactorChange without adding a new higher layer parameter for a new threshold although dynamic switching is supported. Alternatively, if thresholdX is added, the UE may use thresholdX only when comparing different inter-UE pathlosses due to dynamic switching and, in the other occasions, compare the pathloss variations using the existing threshold. Alternatively, if only threshold 1 and threshold 2 are added for the respective TRPs, the UE may use threshold 1 or threshold 2 according to the TRP of the current PUSCH used for calculating the pathloss variation. In other words, the UE may compare the pathloss variation of ①(2106) or ②(2107) of FIG. 21 with threshold 1 and compare the pathloss variation of ③(2108) or ④(2109) with threshold 2. In the above example, a method for determining whether to trigger power headroom reporting upon dynamic switching for switching a single TRP to multiple TRPs has been described. However, it is possible to perform power headroom report triggering by comparing at least one threshold with the pathloss variation by a similar method even during dynamic switching from multiple TRPs to a single TRP.

Or, if power headroom report triggering is performed considering pLCID values for different TRPs as well as the pathloss variation for the same TRP, the UE compares the pathloss variation corresponding to ① to ④(2106 to 2109) of FIG. 21 with phr-Tx-PowerFactorChange dB which is the threshold and, if M or more pathloss variations are larger than the threshold, triggers power headroom reporting. Such pathloss variation comparison may be performed on multiple activated supporting cells and, if one or more pathloss variations of at least one activated supporting cell are larger than the threshold, the UE triggers power headroom reporting. Similar to the example of comparing the pathloss variations for the same TRP, the UE may perform power headroom report triggering considering, e.g., a threshold for each TRP or a new threshold for pathloss variation between different TRPs. If a threshold for each TRP is added, the UE may compare the pathloss variation of ①(2106) and ②(2107) (when the current pathloss is a value for TRP1) and threshold 1 for TRP1 and compare the pathloss variation of ③(2108) and ④(2109) (when the current pathloss is a value for TRP2) and threshold 2 for TRP2. Or, as described above, if thresholdX is added, the UE may compare the pathloss variation of ②(2107) or ③(2108) of FIG. 21 with thresholdX.

Additionally, the UE may compare the pathloss variation of comparison between the pathlosses (⑤(2110) in FIG. 21) for the respective TRPs to transmit the current PUSCH with the threshold, triggering power headroom reporting. This allows the UE to report information that the pathloss difference between TRPs is large to the base station through power headroom reporting. Although this is not a trigger method for comparing the pathloss associated with the most recently reported power headroom report and the pathloss for the currently transmitted PUSCH, the UE may report, to the base station, power headroom information available for the base station to determine single-TRP or multi-TRP-based PUSCH repeated transmission through dynamic switching.

Method 1 and method 2 for triggering power headroom reporting based on the pathloss variation for multiple TRPs in the disclosure have been described under the assumption that when the UE triggers power headroom reporting, the UE reports power headroom information about all TRPs through all PUSCH repeated transmissions. However, the UE may report, to the base station, only power headroom information about some TRPs meeting trigger conditions, rather than reporting, to the base station, power headroom information about all TRPs, considering, e.g., overhead of power headroom report. In this case, if the UE determines whether to trigger power headroom by method 1 or method 2 for PUSCH repeated transmission considering multiple TRPs, the latest power headroom reporting time for each TRP may differ, so that the previous time of measuring pathloss may differ for each TRP.

Figure 22:
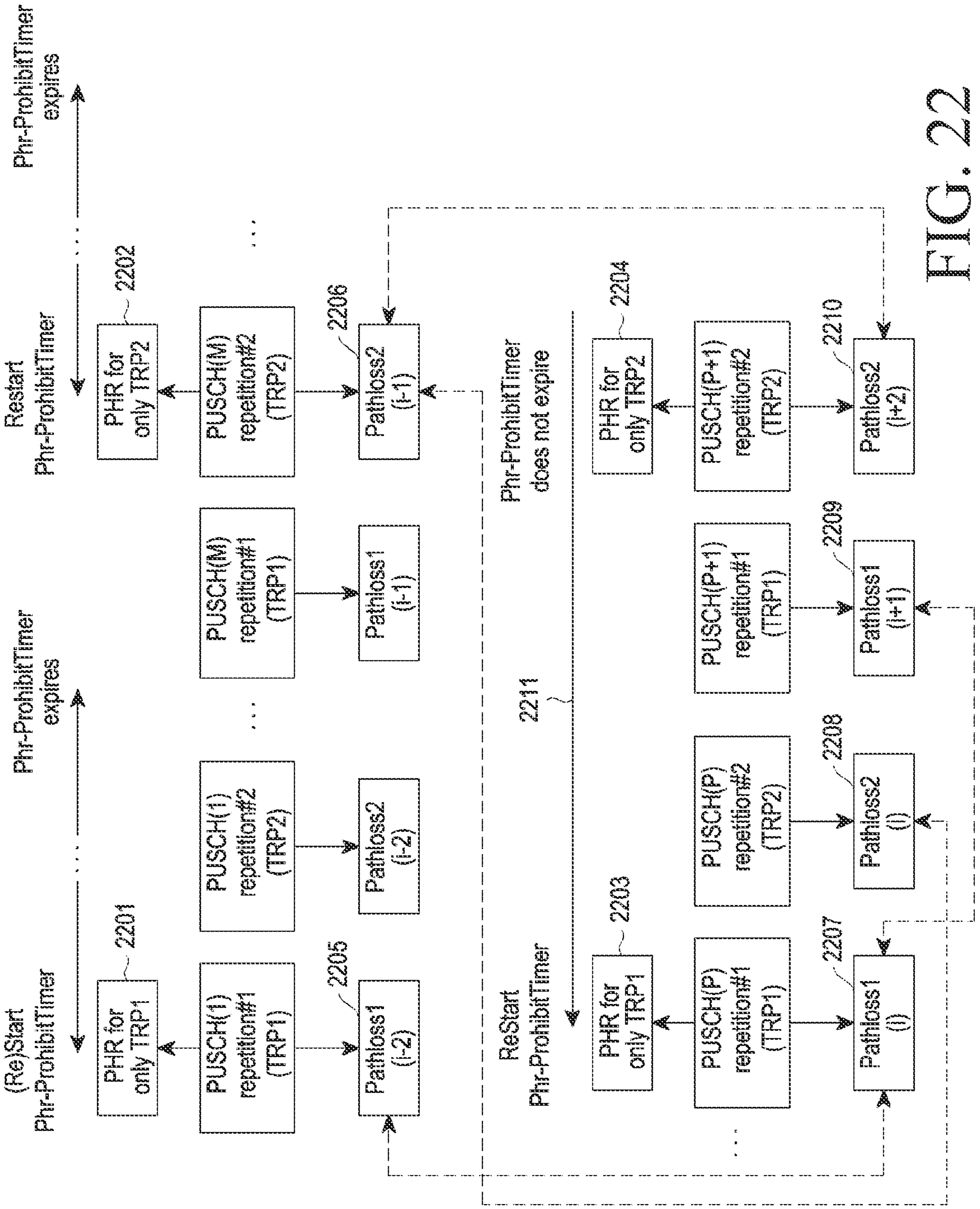
FIG. 22 is a view illustrating an example of triggering power headroom reporting by comparing pathlosses when there is one phr-ProhibitTimer when PUSCH repeated transmission is supported through multiple TRPs and the power headroom reporting time differs for each TRP according to an embodiment of the disclosure.

FIG. 22 is a view illustrating an example of triggering power headroom reporting by comparing pathlosses when there is one phr-ProhibitTimer when PUSCH repeated transmission is supported through multiple TRPs and the power headroom reporting time differs for each TRP according to an embodiment of the disclosure.

Referring to FIG. 22, e.g., when PUSCH repeated transmission through two TRPs is supported, and the power headroom reporting time differs for each TRP, the current pathlosses 2207 and 2208 for the respective current TRPs and the previous pathlosses 2205 and 2206 at the power headroom reporting times for the respective TRPs are shown to determine whether to trigger the current power headroom report 2203. As such, when the power headroom reporting for each TRP is separately performed, if power headroom reporting is triggered using one phr-ProhibitTimer, power headroom reporting 2204 for another TRP may not be performed due to the phr-ProhibitTimer 2211 that (re) starts after the power headroom reporting 2203 for one TRP. As shown in FIG. 22, if only pathlosses between corresponding TRPs are compared, the value of pathloss comparison (pathloss comparison between 2210 and 2206) for TRP2 is larger than the threshold and the value of pathloss comparison (pathloss comparison between 2209 and 2207) for TRP1 is smaller than the threshold, the UE may perform only power headroom reporting for TRP2. However, in the example of FIG. 22, since the phr-ProhibitTimer is restarted (2211) after the power headroom reporting for previous TRP1 and is not yet terminated, the UE may not trigger power headroom reporting for TRP2.

Figure 23:
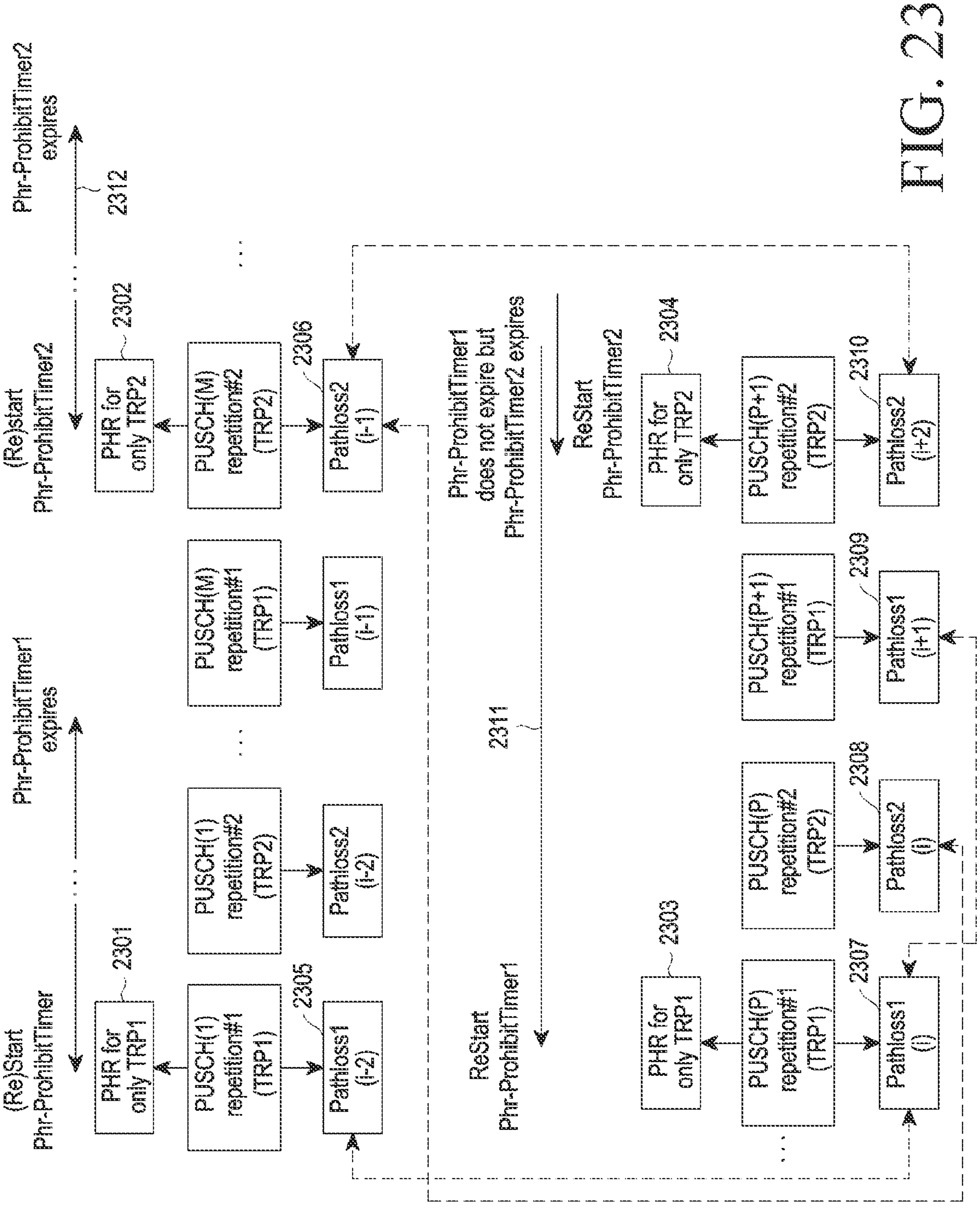
FIG. 23 is a view illustrating an example of triggering power headroom reporting by comparing pathlosses when a phr-ProhibitTimer is set for each TRP when PUSCH repeated transmission is supported through multiple TRPs and the power headroom reporting time differs for each TRP according to an embodiment of the disclosure.

FIG. 23 is a view illustrating an example of triggering power headroom reporting by comparing pathlosses when a phr-ProhibitTimer is set for each TRP when PUSCH repeated transmission is supported through multiple TRPs and the power headroom reporting time differs for each TRP according to an embodiment of the disclosure.

Referring to FIG. 23, when power headroom reporting is performed according to each pathloss variation for each TRP, as shown in FIG. 23, the base station may configure phr-ProhibitTimer for each TRP (hereinafter, phr-ProhibitTimer1 2311 for TRP1 and phr-ProhibitTimer2 2312 for TRP2) to the UE as shown in FIG. 23, and whether to trigger power headroom reporting for each TRP may be determined according to each phr-ProhibitTimerN (where N is 1 or 2 or N may increase according to the number of TRPs). In FIG. 23, when the value of pathloss comparison (pathloss comparison between 2310 and 2306) for TRP2 is larger than the threshold, and the value of pathloss comparison (pathloss comparison between 2309 and 2307) for TRP1 is smaller than the threshold, and phr-ProhibitTimer2 for TRP2 is terminated (2312), the UE may trigger power headroom reporting 2304 for TRP2. If the UE performs power headroom reporting for each TRP, the UE may restart only phr-ProhibitTimerN of the corresponding TRP that has reported the power headroom. When power headrooms for some TRPs are reported to the base station according to the trigger conditions or reporting conditions described below, rather than power headroom reporting being performed on all the TRPs as in the above-described example, the time of measuring the previous pathloss value for pathloss comparison may differ for each TRP but, similar to methods 1 and 2 described above, the UE may determine whether to trigger power headroom reporting by calculating pathloss variations using the current pathloss value and the previous pathloss value and comparing them with the threshold.

3-2th Embodiment: Method for Determining TRP where Power Headroom is Reported when Power Headroom Report for Repeatedly Transmitting PUSCH Considering Multiple TRPs is Triggered In the 3-2th embodiment, as an embodiment of the disclosure, a method for determining the TRP where power headroom is reported when the UE triggers power headroom reporting is described in detail.

The UE may determine the power headroom information to be reported when triggering the power headroom considering, e.g., higher layer configuration for power headroom reporting, power headroom reporting overhead, and trigger conditions for power headroom reporting and report the power headroom information to the base station through the MAC CE. As briefly described above in the 3-1th embodiment, the UE may report all the power headroom information for all the TRPs to the base station when power headroom reporting is triggered. Or, the UE may report only power headroom information for some TRPs that meet the trigger conditions to the base station. Or, the UE may determine the TRP to report power headroom information according to a defined rule between another base station and the UE and report only power headroom information about the determined TRP to the base station. In the 3-2th embodiment, various methods for determining the TRP to report power headroom information to the base station by the UE are described, and a method for determining a TRP according to each power headroom report trigger condition is described. [Power headroom (PH) information configuration method 1] to [PH information configuration method 6] below are methods for the UE to determine the TRP to report to the base station after power headroom report triggering.

[PH information configuration method 1] The UE may calculate the power headrooms (e.g., two PHRs) for all the TRPs (e.g., two TRPs) of the corresponding supporting cell and report it to the base station.

[PH information configuration method 2] The base station may configure a new higher layer parameter (e.g., phr-MaxNrofTRP), as, e.g., the K value, to the UE to indicate the maximum number of TRPs reporting the power headroom. The UE may report, to the base station, the power headrooms for K (where, K∈{1, 2, . . . ,N}) TRPs among all N TRPs according to the K value set in the new configured higher layer parameter (e.g., phr-MaxNrofTRP). Here, TRPs associated with the K lowest indexes among TRPs associated with the higher layer parameter (e.g., CORESETPoolIndex) among N TRPs may be defined, or TRPs indicated by the first K SRI fields among N SRI fields indicated by the DCI may be defined.

[PH information configuration method 3] Similar to the above-described [PH information configuration method 2], upon reporting power headrooms for K TRPs, the UE may report, to the base station, the power headrooms of K TRPs in which the current pathloss variation is small as compared with the previous pathloss. Or, similar to the above-described [PH information configuration method 2], upon reporting power headrooms for K TRPs, the UE may report, to the base station, the power headrooms of K TRPs in which the current pathloss variation is large as compared with the previous pathloss. Here, pathloss comparison may be determined by comparing only pathlosses for corresponding TRPs according to method 2 described above or also considering pathloss comparison between different TRPs. When pathloss variations between all of the N TRPs are compared, the smallest values among the plurality of pathloss variations for the corresponding TRPs (if all pathlosses are compared, the smaller value of ① and ②(2106 and 2107) for TRP1 of FIG. 21, or the smaller value of ③ and ④(2108 and 2109) for TRP2) may be selected and compared. Or, when pathloss variations between all of the N TRPs are compared, the largest values among the plurality of pathloss variations for the corresponding TRPs (if all pathlosses are compared, the larger value of ① and ②(2106 and 2107) for TRP1 of FIG. 21, or the larger value of ③ and ④(2108 and 2109) for TRP2) may be selected and compared. Or, when the pathloss variations between all of the N TRPs are compared, the averages of the plurality of pathloss variations for the corresponding TRPs may be compared. As another embodiment, the average of pathloss variations between all of the N TRPs may be obtained, and the power headrooms of K TRPs in which the pathloss variations are equal to or larger than the average may be reported to the base station.

[PH information configuration method 4] Similar to the above-described [PH information configuration method 2], upon reporting power headrooms for K TRPs, the UE may select K TRPs in which the calculated power headroom has a small value and report them to the base station. Or, upon power headroom reporting for K TRPs, the UE may select K TRPs in which the calculated power headroom has a large value and report them to the base station.

[PH information configuration method 5] The UE may report only the power headroom for the first TRP to the base station. In this case, the first TRP may be defined as the TRP associated with the lowest index among the TRPs associated with the higher layer parameter (e.g., CORESETPoolIndex) or as the TRP indicated by the first SRI field among the N SRI fields indicated by the DCI, similar to [PH information configuration method 2] described above.

[PH information configuration method 6] The UE may perform power headroom reporting to the base station for the TRPs meeting power headroom reporting trigger conditions. The power headroom reporting for TRPs not meeting the conditions may be omitted.

The UE may support at least one method among the above-described [PH information configuration method 1] to [PH information configuration method 6] according to the enhanced power headroom trigger condition considering multiple TRPs and the above-described power headroom trigger conditions. In this case, sub power headroom information configuration methods according to each power headroom report triggering method may be considered as follows.

[PH configuration combination 1] If the UE triggers power headroom reporting according to the above-described method 1 or 2, the UE may report, to the base station, the power headroom for the TRP in which the variation of the current pathloss relative to the previous pathloss is larger than the threshold according to [PH information configuration method 6].

[PH configuration combination 2] If the UE triggers power headroom reporting according to the [trigger condition 2], the UE may report, to the base station, the power headrooms for all N TRPs or K TRPs according to at least one of [PH information configuration method 1] to [PH information configuration method 4].

[PH configuration combination 3] If the UE triggers power headroom reporting according to the [trigger condition 3], the UE may report, to the base station, power headrooms for all TRPs for all supporting cells where configuration or reconfiguration for power headroom report has been performed according to the above-described [PH information configuration method 6]. For activated supporting cells where configuration or reconfiguration has not been performed, the UE may report, to the base station, the power headrooms for K TRPs according to at least one of [PH information configuration method 2] to [PH information configuration method 4].

[PH configuration combination 4] If the UE triggers power headroom reporting according to the [trigger condition 4], the UE may report, to the base station, the power headrooms for all TRPs of a newly activated SCell according to [PH information configuration method 6]. For other activated supporting cells, the UE may report, to the base station, power headrooms for K TRPs according to at least one of [PH information configuration method 2] to [PH information configuration method 4].

[PH configuration combination 5] If the UE triggers power headroom reporting according to the [trigger condition 5], the UE may report, to the base station, power headrooms for all TRPs for a newly added or changed PSCell according to [PH information configuration method 6] above. For other activated supporting cells, the UE may report, to the base station, power headrooms for K TRPs according to at least one of [PH information configuration method 2] to [PH information configuration method 4].

[PH configuration combination 6] If the UE triggers power headroom reporting according to the [trigger condition 6], the UE may report, to the base station, the power headrooms for TRPs in which the power backoff is larger than the threshold according to [PH information configuration method 6]. In this case, as the threshold, as described above in method 2, the threshold for each TRP may be set in the base station through a higher layer parameter, and each threshold (e.g., phr-Tx-PowerFactorChangeN-r17) and power backoff may be compared, or the existing threshold may be compared with the power backoff using all TRPs.

[PH configuration combination 7] If the UE triggers power headroom reporting according to the [trigger condition 7], the UE may report, to the base station, power headrooms for all TRPs of the SCell where BWP switching has been performed according to [PH information configuration method 6] above. For other activated supporting cells, the UE may report, to the base station, power headrooms for K TRPs according to at least one of [PH information configuration method 2] to [PH information configuration method 4].

[PH configuration combination 8] If the UE triggers power headroom reporting according to the [trigger condition 8], the UE may report, to the base station, power headrooms for TRPs in which the P-MPR is equal to or larger than the threshold according to [PH information configuration method 6] above. In this case, for the threshold, existing mpe-Threshold may be used for all TRPs or a new higher layer parameter mpe-ThresholdN (where N means a threshold for the Nth TRP) for each TRP may be set and, for each TRP, comparison may be made as to whether the P-MPR is larger than or equal to mpe-ThresholdN which is the threshold.

In the disclosure, methods for configuring power headroom information according to power headroom trigger conditions have been suggested as described above. However, without limitations to the embodiments, different combinations of the power headroom trigger conditions and power headroom information configuration methods may be made and used. Or, if power headroom reporting is triggered regardless of power headroom reporting trigger conditions, the UE may perform power headroom reporting according the same PH information configuration method (e.g., [PH information configuration method 1]).

Described below are operations of a UE and a base station for a method for triggering power headroom reporting considering multiple TRPs and a method for configuring power headroom information reported accordingly.

Figure 24:
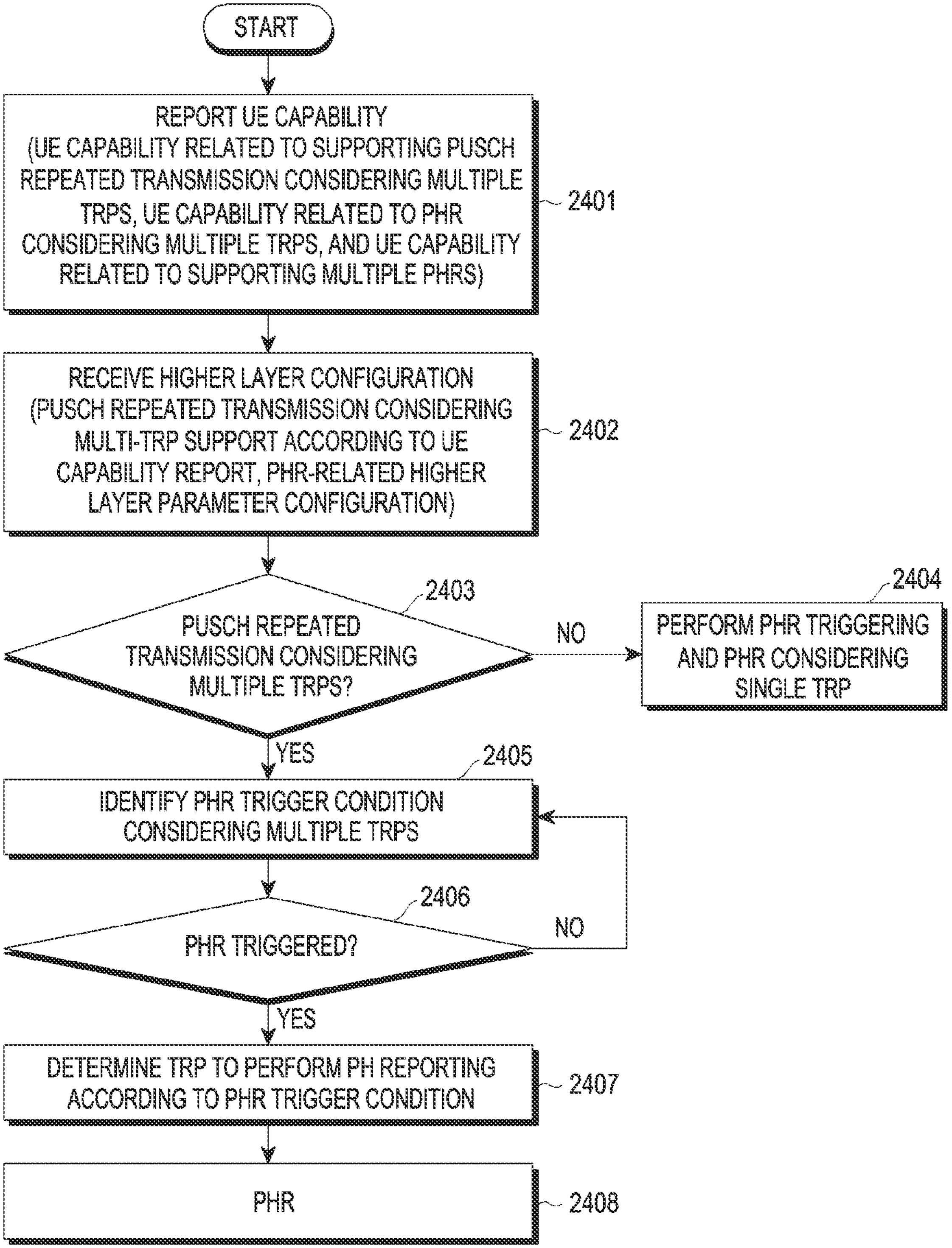
FIGS. 24 and 25, respectively, are views illustrating operations of a UE and a base station for a method for triggering power headroom reporting considering multiple TRPs and a method for configuring power headroom information reported accordingly.

FIG. 24 is a view illustrating operations in which a UE capable of performing power headroom reporting considering multiple TRPs according to an embodiment of the disclosure may trigger power headroom reporting and report the power headroom to a base station.

Referring to FIG. 24, if the UE supports PUSCH repeated transmission considering multiple TRPs and power headroom reporting considering the same, the UE reports information about the UE capability thereabout to the base station (2401). Thereafter, the UE may receive a higher layer parameter (configuration information) for transmitting/receiving a signal from the base station. The configuration information may be provided to the UE using at least one of the above-described higher layer signaling information and L1 signaling information. In this case, according to the UE capability report, a higher layer parameter for PUSCH repeated transmission considering multiple TRPs and a higher layer parameter for power headroom reporting considering multiple TRPs may be configured (2402). The UE identifies whether the PUSCH scheduled by the base station (or PUSCH transmitted in the configured grant manner) is transmitted considering multiple TRPs (2403). In this case, the UE may identify, e.g., the SRI field indicated by the DCI (or higher layer configured grant configuration) for scheduling the PUSCH to grasp whether PUSCH repeated transmission considering multiple TRPs is performed. If PUSCH (repeated) transmission considering a single TRP is performed, the UE determines whether to trigger power headroom reporting considering a single TRP and, if power headroom reporting is triggered, performs power headroom reporting according to the higher layer configuration information for power headroom reporting considering a single TRP (2404). If PUSCH repeated transmission considering multiple TRPs is performed, the UE identifies power headroom trigger conditions considering multiple TRPs (2405). In this case, the power headroom trigger conditions considering multiple TRPs may include at least one of the methods considering multiple TRPs as described above in the 3-1th embodiment and the 3-2th embodiment. If power headroom reporting is not triggered, the UE may transmit the PUSCH to the base station without power headroom reporting. If power headroom reporting is triggered according to the power headroom trigger conditions considering multiple TRPs (2406), the UE may determine the TRP to perform power headroom reporting as described above in the 3-2th embodiment according to the trigger conditions (2407). Thereafter, the UE performs power headroom reporting on the TRP(s) determined through the MAC CE (2408).

Figure 25:
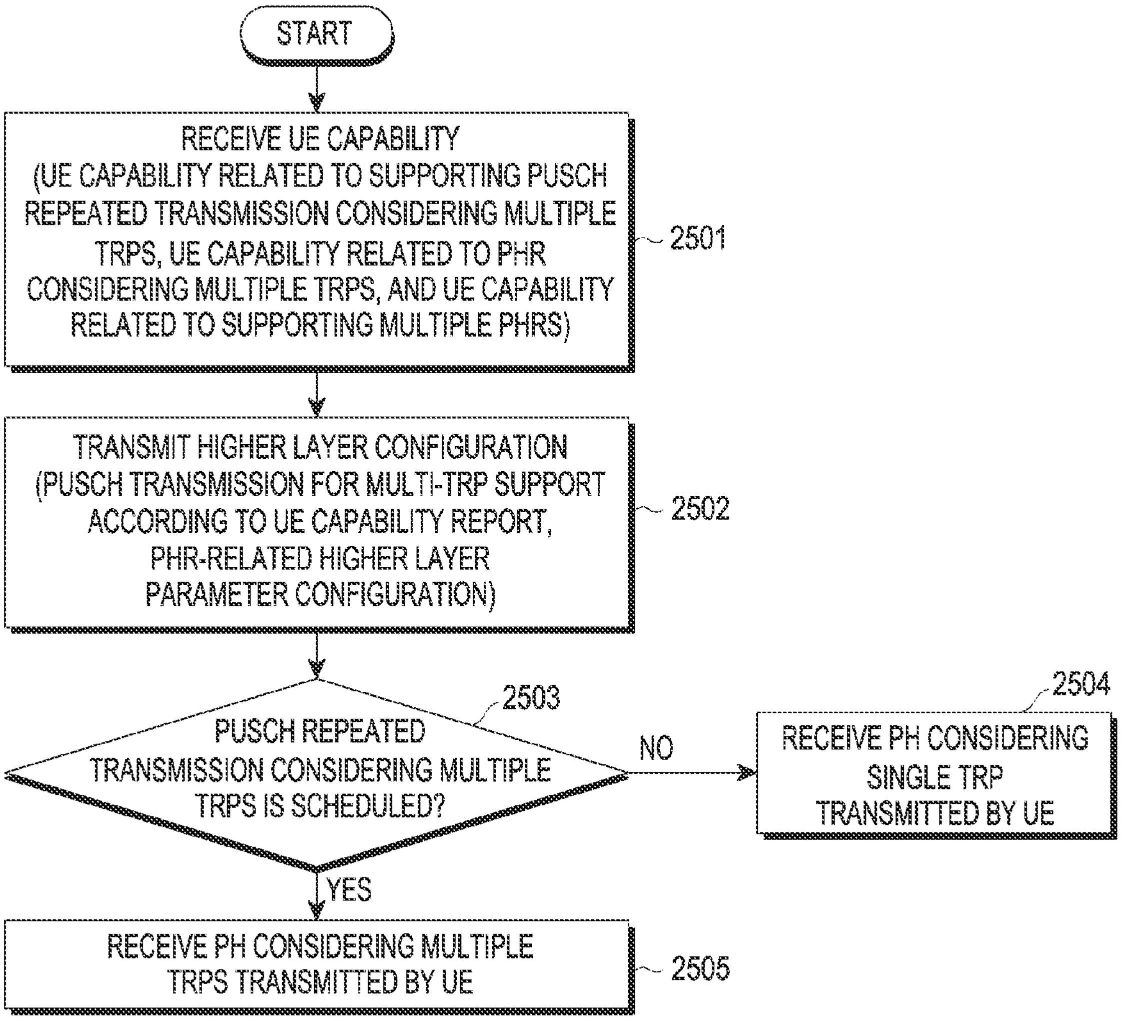

FIG. 25 is a view illustrating an operation in which a base station receives a power headroom from a UE capable of performing power headroom reporting considering multiple TRPs according to an embodiment of the disclosure.

Referring to FIG. 25, the base station receives information about UE capability reported from the UE (2511). In this case, the reported UE capability information may include information about the PUSCH repeated transmission considering multiple TRPs and/or power headroom-related UE capability. If the UE may perform PUSCH repeated transmission considering multiple TRPs and power headroom reporting, the base station may configure a related higher layer parameter to the UE and transmit the configuration information to the UE (2512). The configuration information may be provided to the UE using at least one of the above-described higher layer signaling information and L1 signaling information. If the UE triggers power headroom reporting based on the configuration information, and the base station schedules PUSCH repeated transmission considering multiple TRPs for the UE (or if the PUSCH is a PUSCH transmitted according to the configured grant configuration considering multiple TRPs) (2513), the base station receives the power headroom considering multiple TRPs, transmitted from the UE (2515). If the UE triggers power headroom reporting, and the base station schedules PUSCH (repeated) transmission considering a single TRP for the UE (or if the PUSCH is a PUSCH transmitted according to the configured grant configuration considering a single TRP), the base station receives the power headroom considering a single TRP, transmitted from the UE (2514).

Figure 26:
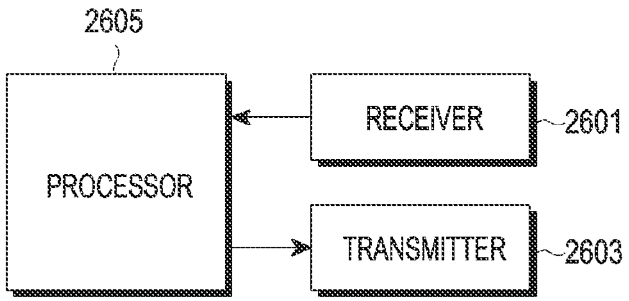
FIG. 26 is a view illustrating a structure of a UE in a wireless communication system according to an embodiment of the disclosure.

FIG. 26 is a view illustrating a structure of a UE in a wireless communication system according to an embodiment of the disclosure.

Referring to FIG. 26, a UE may include a transceiver that refers to a receiver 2601 and a transmitter 2603, memory (not shown), and a processor 2605. The processor 2605 may be at least one processor and may be referred to as a controller or a control unit. The processor 2605 may control the overall UE so that the UE operates according to each of the above-described embodiments of the disclosure as well as a combination of at least one embodiment. However, the components of the UE are not limited thereto. For example, the UE may include more or fewer components than the above-described components. Further, the transceiver, memory, and processor may be implemented in the form of at least one chip.

The transceiver may transmit/receive signals to/from the base station. The signal may include control information and data. To that end, the transceiver may include a radio frequency (RF) transmitter for frequency-up converting and amplifying signals transmitted and an RF receiver for low-noise amplifying signals received and frequency-down converting the frequency of the received signals. However, this is merely an example of the transceiver, and the components of the transceiver are not limited to the RF transmitter and the RF receiver.

The transceiver may receive signals via a radio channel, output the signals to the processor 2605, and transmit signals output from the processor 2605 via a radio channel.

The memory may store programs and data necessary for the operation of the UE. The memory may store control information or data that is included in the signal transmitted/received by the UE. The memory may include a storage medium, such as ROM, RAM, hard disk, CD-ROM, and DVD, or a combination of storage media. There may be provided a plurality of memories.

Further, the processor 2605 may control a series of processes for the UE to operate according to the above-described embodiments. For example, the processor 2605 may control a series of processes for triggering power headroom reporting considering multiple TRPs based on configuration information received from the base station, determining at least one TRP where the power headroom is reported, and performing power headroom reporting. Further, the processor 2605 may control the components of the UE to receive a DCI constituted of two layers and simultaneously receive multiple PDSCHs. There may be a plurality of processors 2605. The processor may perform control operations on the component(s) of the UE by executing a program stored in the memory.

Figure 27:
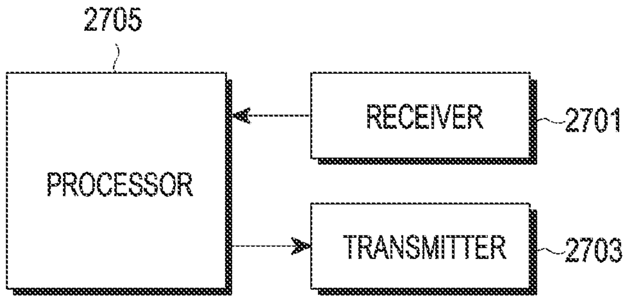
FIG. 27 is a view illustrating a structure of a base station in a wireless communication system according to an embodiment.

FIG. 27 is a view illustrating a structure of a base station in a wireless communication system according to an embodiment.

Referring to FIG. 27, a base station may include a transceiver that refers to a receiver 2701 and a transmitter 2703, memory (not shown), and a processor 2705. The base station may include a communication interface (not shown) for wired or wireless communication with another base station through a backhaul link. The processor 2705 may be at least one processor and may be referred to as a controller or a control unit. The processor 2705 may control the overall base station so that the base station operates according to each of the above-described embodiments of the disclosure as well as a combination of at least one embodiment. However, the components of the base station are not limited thereto. For example, the base station may include more or fewer components than the above-described components. Further, the transceiver, memory, and processor may be implemented in the form of at least one chip.

The transceiver may transmit/receive signals to/from the UE. The signal may include control information and data. To that end, the transceiver may include a radio frequency (RF) transmitter for frequency-up converting and amplifying signals transmitted and an RF receiver for low-noise amplifying signals received and frequency-down converting the frequency of the received signals. However, this is merely an example of the transceiver, and the components of the transceiver are not limited to the RF transmitter and the RF receiver.

The transceiver may receive signals via a radio channel, output the signals to the processor 2705, and transmit signals output from the processor 2705 via a radio channel.

The memory may store programs and data necessary for the operation of the base station. The memory may store control information or data that is included in the signal transmitted/received by the base station. The memory may include a storage medium, such as ROM, RAM, hard disk, CD-ROM, and DVD, or a combination of storage media. There may be provided a plurality of memories.

The processor 2705 may control a series of processes for the base station to operate according to the above-described embodiments. For example, the processor 2705 may control a series of processes for triggering power headroom reporting considering multiple TRPs, determining at least one TRP, transmitting configuration information for configuring an operation of a UE performing power headroom reporting, and receiving a power headroom report from the UE. The processor 2705 may control each component of the base station to configure DCIs of two layers including allocation information about multiple PDSCHs and transmitting the DCIs. There may be a plurality of processors 2705. The processor 2705 may perform control operations on the component(s) of the base station by executing a program stored in the memory.

The methods according to the embodiments described in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

The embodiments herein are provided merely for better understanding of the present invention, and the present invention should not be limited thereto or thereby. In other words, it is apparent to one of ordinary skill in the art that various changes may be made thereto without departing from the scope of the disclosure. Further, the embodiments may be practiced in combination. For example, the base station and the UE may be operated in a combination of parts of an embodiment and another embodiment. For example, some of the first and second embodiments of the disclosure may partially be combined and be operated by the base station and the UE. Further, although the above-described embodiments are suggested based on the FDD LTE system, other modifications based on the technical spirit of the above-described embodiments may be implemented in other systems, such as TDD LTE systems or 5G or NR systems.

In the drawings illustrating methods according to embodiments, the order of description is not necessarily identical to the order of execution, and some operations may be performed in a different order or simultaneously.

Some of the components shown in the drawings illustrating methods of the disclosure may be omitted in such an extent as not to impair the gist or essence of the disclosure.

The methods in the disclosure may be performed in a combination of all or some of the embodiments described herein in such an extent as not to impair the gist or essence of the disclosure.

Various embodiments of the disclosure have been described above. The foregoing description of the disclosure is merely an example, and embodiments of the disclosure are not limited thereto. It will be appreciated by one of ordinary skill in the art that the present disclosure may be implemented in other various specific forms without changing the essence or technical spirit of the present disclosure. It should be noted that the scope of the present invention is defined by the appended claims rather than the described description of the embodiments and include all modifications or changes made to the claims or equivalents of the claims.

The invention claimed is:

1. A method by a user equipment (UE) performing power headroom reporting (PHR) in a wireless communication system supporting multiple transmission and reception points (TRPs), the method comprising:

transmitting, to a base station, UE capability information indicating support of two PHRs for the multiple TRPs;

receiving, from the base station, radio resource control (RRC) information including configuration information for the two PHRs; and transmitting, to the base station, a medium access control (MAC) control element (CE) including information on two power headrooms if change of path loss is greater than a threshold value for at least one path loss reference signal.

2. The method of claim 1, wherein the configuration information for the two PHRs is set to a predefined parameter.

3. The method of claim 1, wherein the two PHRs are configured for physical uplink shared channel (PUSCH) repetition.

4. A user equipment (UE) performing power headroom reporting (PHR) in a wireless communication system supporting multiple transmission and reception points (TRPs), the UE comprising:

a transceiver; and a processor coupled to the transceiver, and configured to:

transmit, to a base station, UE capability information indicating support of two PHRs for the multiple TRPs, receive, from the base station, radio resource control (RRC) information including configuration information for the two PHRs, and transmit, to the base station, a medium access control (MAC) control element (CE) including information on two power headrooms if change of path loss is greater than a threshold value for at least one path loss reference signal.

5. The UE of claim 4, wherein the configuration information for the two PHRs is set to a predefined parameter.

6. The UE of claim 4, wherein the two PHRs are configured for physical uplink shared channel (PUSCH) repetition.

7. A method performed by a base station in a wireless communication system supporting multiple transmission and reception points (TRPs), the method comprising:

receiving, from a user equipment (UE), UE capability information indicating support of two power headroom reports (PHRs) for the multiple TRPs;

transmitting, to the UE, radio resource control (RRC) information including configuration information for two PHRs; and receiving, from the UE, a medium access control (MAC) control element (CE) including information on two power headrooms in case that change of path loss is greater than a threshold value for at least one path loss reference signal.

8. The method of claim 7, wherein the configuration information for the two PHRs is set to a predefined parameter.

9. The method of claim 7, wherein the two PHRs are configured for physical uplink shared channel (PUSCH) repetition.

10. A base station in a wireless communication system supporting multiple transmission and reception points (TRPs), the base station comprising:

a transceiver; and a processor coupled to the transceiver, and configured to:

receive, from a user equipment (UE), UE capability information indicating support of two power headroom reports (PHRs) for the multiple TRPs, transmit, to the UE, radio resource control (RRC) information including configuration information for the two PHRs, and receive, from the UE, a medium access control (MAC) control element (CE) including information on two power headrooms in case that change of path loss is greater than a threshold value for at least one path loss reference signal.

11. The base station of claim 10, wherein the configuration information for the two PHRs is set to a predefined parameter.

12. The base station of claim 10, wherein the two PHRs are configured for physical uplink shared channel (PUSCH) repetition.

* * * * *